US012695980B2

(12) United States Patent
Bian

(10) Patent No.: US 12,695,980 B2
(45) Date of Patent: Jul. 28, 2026

(54) SHOOTING RESTORATION METHOD AND ELECTRONIC DEVICE

(71) Applicant: Huawei Technologies Co., Ltd., Shenzhen (CN)

(72) Inventor: Chao Bian, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/764,879

(22) Filed: Jul. 5, 2024

(65) Prior Publication Data

US 2024/0364997 A1     Oct. 31, 2024

Related U.S. Application Data

(63) Continuation of application No. PCT/CN2022/136943, filed on Dec. 6, 2022.

(30) Foreign Application Priority Data

Jan. 25, 2022     (CN) .......................... 202210097428.7

(51) Int. Cl.
H04N 23/63          (2023.01)

(52) U.S. Cl.
CPC ......... H04N 23/632 (2023.01); H04N 23/633 (2023.01)

(58) Field of Classification Search
CPC .... H04N 23/632; H04N 23/633; H04N 5/222; H04N 23/60; H04N 23/63; H04N 23/64
See application file for complete search history.

(56) References Cited

U.S. PATENT DOCUMENTS

| | | | | |
|---|---|---|---|---|
| 6,954,894 | B1 * | 10/2005 | Balnaves | ............. G11B 27/034 715/202 |
| 11,676,316 | B1 * | 6/2023 | Lopez | ................... G06F 16/176 345/619 |
| 2007/0030363 | A1 * | 2/2007 | Cheatle | .................. H04N 23/64 348/E5.042 |
| 2023/0018557 | A1 | 1/2023 | Jiang | |
| 2023/0217098 | A1 | 7/2023 | Wang et al. | |
| 2024/0129620 | A1 | 4/2024 | Wang et al. | |

FOREIGN PATENT DOCUMENTS

| | | |
|---|---|---|
| CN | 109495684 A | 3/2019 |
| CN | 112532859 A | 3/2021 |
| CN | 113727012 A | 11/2021 |
| CN | 113727015 A | 11/2021 |
| CN | 113727017 A | 11/2021 |
| CN | 113727025 A | 11/2021 |
| CN | 113824878 A | 12/2021 |
| WO | 2020102978 A1 | 5/2020 |

* cited by examiner

*Primary Examiner* — Yogesh K Aggarwal
(74) *Attorney, Agent, or Firm* — Conley Rose, P.C.

(57)          ABSTRACT

A method includes, in a process of shooting a photo or recording a video by a user, a restoration template file that is generated and stored based on one or more shooting parameters. When the photo shot or the video recorded by the user is lost or mistakenly deleted, shooting restoration is implemented based on the restoration template file. The user restores a shooting process by using the restoration template file, re-shoots another different object, and restores a photo or a video having same effect. Alternatively, the user selects a same framing range, and restores a photo or a video having same effect and the same framing range.

20 Claims, 41 Drawing Sheets

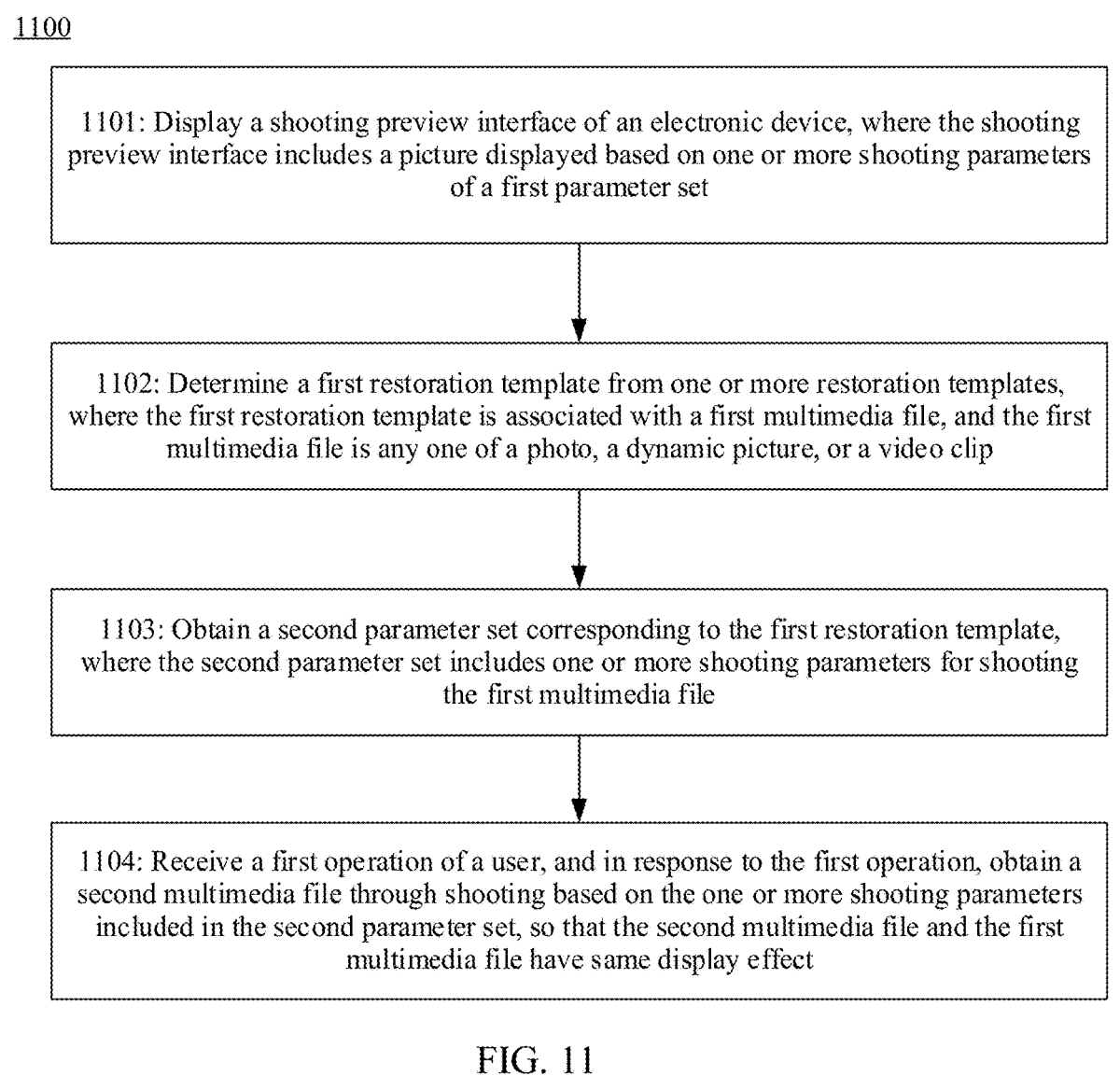

1100

1101: Display a shooting preview interface of an electronic device, where the shooting preview interface includes a picture displayed based on one or more shooting parameters of a first parameter set 1102: Determine a first restoration template from one or more restoration templates, where the first restoration template is associated with a first multimedia file, and the first multimedia file is any one of a photo, a dynamic picture, or a video clip 1103: Obtain a second parameter set corresponding to the first restoration template, where the second parameter set includes one or more shooting parameters for shooting the first multimedia file 1104: Receive a first operation of a user, and in response to the first operation, obtain a second multimedia file through shooting based on the one or more shooting parameters included in the second parameter set, so that the second multimedia file and the first multimedia file have same display effect

FIG. 11

SHOOTING RESTORATION METHOD AND ELECTRONIC DEVICE

CROSS-REFERENCE TO RELATED APPLICATIONS

This is a continuation of International Patent Application No. PCT/CN2022/136943 filed on Dec. 6, 2022, which claims priority to Chinese Patent Application No. 202210097428.7 filed on Jan. 25, 2022. The disclosures of the aforementioned applications are hereby incorporated by reference in their entirety.

TECHNICAL FIELD

This disclosure relates to the field of electronic technologies, and in particular, to a shooting restoration method and an electronic device.

BACKGROUND

With the explosive development and popularization of multimedia scenarios such as photographing, short video recording, and online live broadcast, a user uses a shooting function of an electronic device, for example, photographing and short video recording, in more scenarios.

For example, the user may use an electronic device, for example, a mobile phone or a tablet, to shoot a favorite object, or record a daily life interest. For example, the user may shoot, by using the electronic device, an interesting video, an audio photo, and a dynamic picture in a graphics interchange format (gif), and may share and publish the shot content to different media software and social platforms. In addition, the user may also like, forward, and save multimedia files, such as photos and videos shot by other users, on the media software and the social platforms.

When the user uses the electronic device, for example, the mobile phone or the tablet, to shot a photo or record a video, a finally shot multimedia file, for example, the photo or the video, may be stored in the mobile phone, and the user may view the multimedia file. However, once the original multimedia file, for example, the photo or the video is lost, it is difficult to restore and shoot a same or similar multimedia file, for example, a photo or a video.

In a possible implementation, the user may shoot a photo by using one or more shooting parameters such as a focal length, resolution, a beauty level, a color indicator, and a brightness parameter that are obtained through professional adjustment. If the shot photo is lost or is deleted due to a misoperation of the user, it is generally difficult to restore a same or similar photo. It is even more difficult to restore the photo due to shooting details, shooting parameters, and it is basically impossible to restore the lost photo.

When the photo shot by the user is lost, how to restore a shooting method and a shooting process of the lost photo, or restore a favorite photo for the user is a difficult problem that needs to be urgently resolved currently.

SUMMARY

This disclosure provides a shooting restoration method and an electronic device. According to the method, a user can re-shoot another different object based on one or more restoration templates stored in the electronic device, and restore a multimedia file, for example, a photo, a dynamic picture, or a video that has same effect and/or a same framing range. This can quickly restore a shooting process simplify a shooting operation, and improve user experience.

According to a first aspect, a shooting restoration method is provided, applied to an electronic device including a display. The electronic device stores one or more restoration templates. The method includes: displaying a shooting preview interface of the electronic device, where the shooting preview interface includes a picture displayed based on one or more shooting parameters of a first parameter set; determining a first restoration template from the one or more restoration templates, where the first restoration template is associated with a first multimedia file, and the first multimedia file is any one of a photo, a dynamic picture, or a video clip; obtaining a second parameter set corresponding to the first restoration template, where the second parameter set includes one or more shooting parameters for shooting the first multimedia file; and receiving a first operation of a user, and in response to the first operation, obtaining a second multimedia file through shooting based on one or more shooting parameters included in the second parameter set, so that the second multimedia file and the first multimedia file have same display effect, where the second multimedia file is any one of a photo, a dynamic picture, or a video clip.

Optionally, the "shooting parameter" in embodiments of this disclosure may include one or more of a focal length, a focusing mode, resolution, a camera, geographical location information, a beauty parameter, a filter color, flash effect, horizontal level effect, exposure, and photosensitivity.

It should be understood that, in embodiments of this disclosure, a multimedia file, for example, the "first multimedia file" or the "second multimedia file", may include any one of a photo, a dynamic picture, or a video clip. The multimedia file may be obtained by the user through shooting by using a camera application of the electronic device, or the like, or may be a multimedia file downloaded by the user from a network, a server, a social platform, or the like, or may be a received multimedia file that is sent by another device and stored locally on the electronic device.

A photo is used as an example. When the user downloads the photo and saves the photo to a local gallery of the electronic device, the electronic device may detect the photo, obtain shooting parameters corresponding to the photo, for example, a brightness level and a filter color of the photo, and generate a restoration template file of the photo. The restoration template file may also be used to guide the user to shoot another multimedia file, for example, a photo, a dynamic picture, or a video. Details are not described herein.

It should be further understood that, in embodiments of this disclosure, for different multimedia file types, the "first operation" may include one or more different user operations.

For example, when the second multimedia file is a photo, the "first operation" may include a shooting operation of tapping a shooting shutter control performed by the user. When the second multimedia file is a video clip, the "first operation" may include a video recording operation of tapping the shooting shutter control at least twice performed by the user. This is not limited in embodiments of this disclosure.

According to the foregoing solution, an embodiment of this disclosure provides a new shooting restoration solution for the user. When a multimedia file, for example, a photo shot by the user, a dynamic picture, or a recorded video clip is lost or mistakenly deleted, the method can quickly implement shooting restoration based on one or more restoration template files stored in the electronic device. Specifically, the user may use the restoration template file to restore a shooting process, that is, re-shoot another different object by using one or more shooting parameters included in the restoration template file, and restore a multimedia file, for example, a photo, a dynamic picture, or a recorded video clip with same display effect; or the user may select a same framing range, and restore a multimedia file, for example, a photo, a dynamic picture, or a recorded video clip with same effect and a same framing range. This method can satisfy different scenarios, and can quickly implement photo restoration. This simplifies a shooting operation, and improves user experience.

Optionally, a shooting restoration capability in embodiments of this disclosure may be a system capability of the electronic device. Correspondingly, the system capability may be invoked by a plurality of applications that have a shooting capability, for example, a camera application.

For example, the shooting restoration process may be implemented based on the camera application configured when the electronic device is delivered from a factory. The camera application may be run by the user by using the camera application of the electronic device, and the shooting preview interface may be displayed.

Alternatively, the shooting restoration process may be implemented based on any other application that can shoot a photo, for example, a beauty camera or Meipai downloaded and installed by the user.

Alternatively, the shooting restoration process may be applied to any application that has functions such as photo shooting and video recording, for example, a TikTok® application or a WeChat® application. This is not limited in embodiments of this disclosure.

Optionally, the "shooting restoration function" in embodiments of this disclosure may be enabled or disabled manually by the user by using a setting control, a shortcut control, or the like of the camera application. Alternatively, the shooting restoration function may be further configured as a default function of the electronic device, that is, a plurality of associated applications such as the camera application and a gallery application of the electronic device may be authorized to invoke the shooting restoration function. This is not limited in embodiments of this disclosure.

With reference to the first aspect, in some implementations of the first aspect, the one or more restoration templates include a preset restoration template; and/or the one or more restoration templates include a restoration template generated by the electronic device based on one or more shooting parameters of an associated multimedia file.

In a possible implementation, when the electronic device is delivered from a factory, several (n, for example, two) fixed restoration templates may be set by a developer. The restoration templates correspond to fixed shooting parameters. The shooting parameters may enable the electronic device to have high-quality shooting effect. Subsequently, the preset restoration template may be displayed regardless of whether the user restores to shoot a photo, records a video, or the like.

In another possible implementation, the user may use the camera application of the electronic device to shoot a photo and a dynamic picture, record a video, or the like. In a process of shooting a photo and a dynamic picture or recording a video, the electronic device may generate one or more restoration templates based on one or more shooting parameters and/or one or more editing parameters, and store the one or more restoration templates in the electronic device. In the shooting restoration process, the "first restoration template" is selected from the one or more restoration templates stored in the electronic device.

With reference to the first aspect and the foregoing implementations, in some implementations of the first aspect, the determining a first restoration template from the one or more restoration templates includes: receiving a second operation of the user, and in response to the second operation, selecting and determining the first restoration template from the one or more restoration templates; or automatically determining, as the first restoration template based on a shooting environment in which the electronic device is located, a restoration template with optimal shooting effect in the one or more restoration templates; or automatically determining, as the first restoration template based on the picture displayed on the shooting preview interface, a restoration template with optimal shooting effect in the one or more restoration templates; or automatically determining, as the first restoration template based on a use frequency of the user, a restoration template that is most frequently used by the user in the one or more restoration templates; or automatically determining, as the first restoration template based on a use record of the user, a restoration template that is last used by the user in the one or more restoration templates.

Optionally, the electronic device may intelligently detect the shooting environment, the shot object, and the like, and intelligently match different shooting templates for the user based on external factors such as the shooting environment and the shot object. For example, when the electronic device detects that the current shooting environment is a dark night shooting environment, one or more restoration templates displayed in a restoration template selection window may include a parameter suitable for night shooting, and the parameter may be included in the first restoration template.

Alternatively, the electronic device may intelligently display, to the user based on a use frequency, a shooting habit, and the like of the user, one or more restoration templates that are frequently used. For example, the first restoration template is most frequently used, and the first restoration template is preferentially displayed in the restoration template selection window. This is not limited in embodiments of this disclosure.

According to the foregoing solution, the user may manually select an expected restoration template based on the shooting habit and the shooting requirement of the user, or the electronic device may intelligently recommend a matched restoration template to the user based on the shooting environment, the shot object, or the like. This process meets use requirements of different users, especially for a non-professional who is not good at shooting, simplifies a shooting operation, and improves shooting experience of the user.

With reference to the first aspect and the foregoing implementations, in some implementations of the first aspect, after the obtaining a second parameter set corresponding to the first restoration template, the method further includes: displaying the one or more shooting parameters of the second parameter set; receiving a third operation of the user, modifying the one or more shooting parameters of the second parameter set in response to the third operation, and updating the first restoration template based on a modified second parameter set; and generating, based on the modified second parameter set, a second restoration template associated with the first multimedia file, and storing the second restoration template.

Optionally, "modifying the one or more parameters in the restoration template file" may include: The user performs an operation, for example, editing, deleting, adding, or adjusting on the one or more shooting parameters in the second parameter set.

Optionally, after the user modifies the one or more shooting parameters in the second parameter set, the electronic device may update the first restoration template based on a modified second parameter set, that is, overwrite the original restoration template file, and replace the original parameters in the first restoration template file with parameters obtained through modification by the user.

Alternatively, the electronic device may generate, based on the modified second parameter set, a second restoration template associated with the first multimedia file, and store the second restoration template. For example, with reference to the modified parameters and the one or more parameters in the original first restoration template file, the electronic device may generate a new restoration template file based on the operation of the user, and automatically store the new restoration template file. For example, the new second restoration template file is named by continuously adding a suffix after the name of the original restoration template file and is stored.

According to the foregoing solution, in a process in which the user selects the restoration template file, after the user selects the restoration template, the method supports the user in performing operations such as viewing, modifying, editing, or deleting on the one or more parameters in the restoration template, and may update the related parameters in the restoration template file based on the operations such as modifying, editing, and deleting performed by the user, or generate a new restoration template based on updated related parameters. This meets shooting requirements of the user in different scenarios.

With reference to the first aspect and the foregoing implementations, in some implementations of the first aspect, when it is detected that the first multimedia file associated with the first restoration template is lost or damaged, the method further includes: displaying prompt information in a shooting restoration mode, where the prompt information is used to prompt the user to restore the first multimedia file.

It should be understood that each multimedia file may correspond to a unique restoration template file. If a multimedia file is lost or mistakenly deleted, the electronic device may detect that a source file of the multimedia file is lost. The electronic device may automatically remind the user of the loss of the multimedia file, and the user selects whether to restore the photo.

Specifically, when it is detected that the first multimedia file associated with the first restoration template is lost or damaged, the electronic device may display prompt information in a shooting restoration mode, where the prompt information is used to remind the user to restore the first multimedia file. In this process, the user may be actively reminded to restore the multimedia file, and the user chooses to restore the lost multimedia file, so that integrity of the restoration template can be ensured. In addition, a photo restoration process is convenient, and a previous shooting process can be quickly restored. This improves user experience.

According to the foregoing solutions, if a multimedia file, for example, a photo, a dynamic picture a video clip shot by the user is lost or mistakenly deleted, when the user switches the current shooting mode to the restoration mode, the electronic device may automatically detect whether a corresponding multimedia file is lost in a plurality of stored restoration template files. When it is detected that a multimedia file corresponding to a restoration template file is lost, the lost multimedia file may be automatically prompted to the user, for the user to choose whether to restore the lost multimedia file, and the shooting restoration process of the electronic device is automatically triggered. This method can ensure integrity of a restoration template, and improve user experience.

With reference to the first aspect and the foregoing implementations, in some implementations of the first aspect, the second parameter set further includes framing information of the first multimedia file, and the method further includes: determining a framing range of the first multimedia file based on the framing information of the first multimedia file; and receiving a fourth operation of the user, and in response to the fourth operation, obtaining a third multimedia file through shooting based on the one or more shooting parameters included in the second parameter set, where the third multimedia file and the first multimedia file have same display effect and a same framing range.

According to the foregoing process, when the photo shot by the user is lost or is mistakenly deleted, the photo may be re-shoot based on the restoration template file corresponding to the lost or mistakenly deleted photo according to the shooting restoration method provided in embodiments of this disclosure, and the re-shot photo may have the same shooting parameter or the like as the lost or mistakenly deleted photo, and/or may have the substantially same framing range. In this way, the photo that is the same as or similar to the lost or mistakenly deleted photo is restored for the user. In this process, the shooting process and/or the framing range of the photo can be restored without a need for the user to manually reset the related shooting parameter or the like. This can quickly implement photo restoration, simplify a shooting operation, and improve user experience.

With reference to the first aspect and the foregoing implementations, in some implementations of the first aspect, the second parameter set further includes an operation parameter for performing editing processing on the first multimedia file by the user, and after the obtaining a second multimedia file through shooting, the method further includes: performing editing processing on the second multimedia file based on the operation parameter for editing processing, to obtain a processed second multimedia file, where editing processing includes one or more of ratio cropping, filter color adjustment, beauty parameter adjustment, or brightness level adjustment.

It should be understood that, a photo may include a shooting parameter before shooting, a shooting parameter during shooting, and an editing parameter after shooting. In addition, the shooting parameter before shooting, the shooting parameter during shooting, and the editing parameter after shooting may include a same parameter type.

In a possible implementation, when parameters corresponding to a photo include parameters of a same type, final parameters corresponding to display effect presented to the user may be used.

With reference to the first aspect and the foregoing implementations, in some implementations of the first aspect, after the obtaining a second parameter set corresponding to the first restoration template, the method further includes: automatically updating, based on the one or more shooting parameters included in the second parameter set, the picture displayed on the shooting preview interface of the electronic device.

In the foregoing process, provided that the user has selected the first restoration template, the related shooting parameters on the shooting preview interface may be automatically adjusted to the one or more parameters included in the first restoration template, for example, a zoom-in multiple, a beauty level, and another filter color that are displayed on the shooting preview interface are adjusted, to update display effect of a picture on the shooting preview interface.

With reference to the first aspect and the foregoing implementations, in some implementations of the first aspect, the shooting parameter includes one or more of the focal length, the focusing mode, the resolution, the camera, the geographical location information, the beauty parameter, the filter color, the flash effect, the horizontal level effect, the exposure, and the photosensitivity.

With reference to the first aspect and the foregoing implementations, in some implementations of the first aspect, the method further includes: receiving a fifth operation of the user, and enabling a shooting restoration function of the electronic device in response to the fifth operation; and receiving a sixth operation of the user, and in response to the sixth operation, enabling the electronic device to enter a shooting restoration mode.

In conclusion, according to the shooting restoration method provided in embodiments of this disclosure, a new shooting solution is provided for the user. When a multimedia file, for example, a photo shot by the user, a dynamic picture, or a recorded video clip is lost or mistakenly deleted, the method can quickly implement shooting restoration based on one or more restoration template files stored in the electronic device.

Specifically, the user may use the restoration template file to restore a shooting process, that is, re-shoot another different object by using one or more shooting parameters included in the restoration template file, and restore a multimedia file, for example, a photo, a dynamic picture, or a recorded video clip with same display effect; or the user may select a same framing range, and restore a multimedia file, for example, a photo, a dynamic picture, or a recorded video clip with same effect and a same framing range. This method can satisfy different scenarios, and can quickly implement photo restoration. This simplifies a shooting operation, and improves user experience.

In addition, in a process in which the user selects the restoration template file, after the user selects the restoration template, the method supports the user in performing operations such as viewing, modifying, editing, or deleting on the one or more parameters in the restoration template, and may update the related parameters in the restoration template file based on the operations such as modifying, editing, and deleting performed by the user, or generate and store a new restoration template based on updated related parameters. This meets shooting requirements of the user in different scenarios.

In addition, according to the foregoing solutions, if a multimedia file, for example, a photo, a dynamic picture, or a video clip shot by the user is lost or mistakenly deleted, when the user switches the current shooting mode to the restoration mode, the mobile phone may automatically detect whether a corresponding multimedia file is lost in a plurality of stored restoration template files. When it is detected that a multimedia file corresponding to a restoration template file is lost, the lost multimedia file may be automatically prompted to the user, for the user to choose whether to restore the lost multimedia file, and the shooting restoration process of the mobile phone is automatically triggered. This method can ensure integrity of a restoration template, and improve user experience.

According to a second aspect, an electronic device is provided, including a display, one or more processors, one or more memories, and a module on which a plurality of applications are installed. The memory stores one or more programs, and when the one or more programs are executed by the processor, the electronic device is enabled to perform the following steps: displaying a shooting preview interface, where the shooting preview interface includes a picture displayed based on one or more shooting parameters of a first parameter set; determining a first restoration template from the one or more restoration templates, where the first restoration template is associated with a first multimedia file, and the first multimedia file is any one of a photo, a dynamic picture, or a video clip; obtaining a second parameter set corresponding to the first restoration template, where the second parameter set includes one or more shooting parameters for shooting the first multimedia file; and receiving a first operation of a user, and in response to the first operation, obtaining a second multimedia file through shooting based on one or more shooting parameters included in the second parameter set, so that the second multimedia file and the first multimedia file have same display effect, where the second multimedia file is any one of a photo, a dynamic picture, or a video clip.

With reference to the second aspect, in some implementations of the second aspect, the one or more restoration templates include a preset restoration template; and/or the one or more restoration templates include a restoration template generated based on one or more shooting parameters of an associated multimedia file.

With reference to the second aspect and the foregoing implementations, in some implementations of the second aspect, when the one or more programs are executed by the processor, the electronic device performs the following steps: receiving a second operation of the user, and in response to the second operation, selecting and determining the first restoration template from the one or more restoration templates; or automatically determining, as the first restoration template based on a shooting environment, a restoration template with optimal shooting effect in the one or more restoration templates; or automatically determining, as the first restoration template based on the picture displayed on the shooting preview interface, a restoration template with optimal shooting effect in the one or more restoration templates; or automatically determining, as the first restoration template based on a use frequency of the user, a restoration template that is most frequently used by the user in the one or more restoration templates; or automatically determining, as the first restoration template based on a use record of the user, a restoration template that is last used by the user in the one or more restoration templates.

With reference to the second aspect and the foregoing implementations, in some implementations of the second aspect, after the second parameter set corresponding to the first restoration template is obtained, when the one or more programs are executed by the processor, the electronic device is enabled to perform the following steps: displaying the one or more shooting parameters of the second parameter set; receiving a third operation of the user, modifying the one or more shooting parameters of the second parameter set in response to the third operation, and updating the first restoration template based on a modified second parameter set; or generating, based on the modified second parameter set, a second restoration template associated with the first multimedia file, and storing the second restoration template.

With reference to the second aspect and the foregoing implementations, in some implementations of the second aspect, when the one or more programs are executed by the processor, when detecting that the first multimedia file associated with the first restoration template is lost or damaged, the electronic device is enabled to perform the following steps: displaying prompt information in a shooting restoration mode, where the prompt information is used to prompt the user to restore the first multimedia file.

With reference to the second aspect and the foregoing implementations, in some implementations of the second aspect, the second parameter set further includes framing information of the first multimedia file, and when the one or more programs are executed by the processor, the electronic device is enabled to perform the following steps: determining a framing range of the first multimedia file based on the framing information of the first multimedia file; and receiving a fourth operation of the user, and in response to the fourth operation, obtaining a third multimedia file through shooting based on the one or more shooting parameters included in the second parameter set, where the third multimedia file and the first multimedia file have same display effect and a same framing range.

With reference to the second aspect and the foregoing implementations, in some implementations of the second aspect, the second parameter set further includes an operation parameter for performing editing processing on the first multimedia file by the user, and after the second multimedia file is obtained through shooting, when the one or more programs are executed by the processor, the electronic device is enabled to perform the following steps: performing editing processing on the second multimedia file based on the operation parameter for editing processing, to obtain a processed second multimedia file, where editing processing includes one or more of ratio cropping, filter color adjustment, beauty parameter adjustment, or brightness level adjustment.

With reference to the second aspect and the foregoing implementations, in some implementations of the second aspect, after the second parameter set corresponding to the first restoration template is obtained, when the one or more programs are executed by the processor, the electronic device is enabled to perform the following steps: automatically updating, based on the one or more shooting parameters included in the second parameter set, the picture displayed on the shooting preview interface of the electronic device.

With reference to the second aspect and the foregoing implementations, in some implementations of the second aspect, the shooting parameter includes one or more of a focal length, a focusing mode, resolution, a camera, geographical location information, a beauty parameter, a filter color, flash effect, horizontal level effect, exposure, and photosensitivity.

With reference to the second aspect and the foregoing implementations, in some implementations of the second aspect, when the one or more programs are executed by the processor, the electronic device performs the following steps: receiving a fifth operation of the user, and enabling a shooting restoration function in response to the fifth operation; and receiving a sixth operation of the user, and entering a shooting restoration mode in response to the sixth operation.

According to a third aspect, a graphical user interface system on an electronic device is provided. The electronic device includes a display, one or more memories, and one or more processors. The one or more processors are configured to execute one or more computer programs stored in the one or more memories. The graphical user interface system includes a graphical user interface that is displayed when the electronic device performs the method according to any one of the first aspect and the implementations of the first aspect.

According to a fourth aspect, an apparatus is provided. The apparatus is included in an electronic device, and the apparatus has a function of implementing behavior of the electronic device in the method according to any one of the first aspect or the possible implementations of the first aspect. The function may be implemented by using hardware, or may be implemented by hardware executing corresponding software. The hardware or the software includes one or more modules or units corresponding to the foregoing function, for example, a display module or unit, a detection module or unit, or a processing module or unit.

According to a fifth aspect, a computer-readable storage medium is provided. The computer-readable storage medium stores computer instructions. When the computer instructions are run on an electronic device, the electronic device is enabled to perform the method according to any one of the first aspect and the possible implementations of the first aspect, and the restoring restoration method according to any one of the second aspect and the possible implementations of the second aspect.

According to a sixth aspect, a computer program product is provided. When the computer program product runs on an electronic device, the electronic device is enabled to perform the restoring restoration method according to any one of the first aspect and the possible implementations of the first aspect.

BRIEF DESCRIPTION OF DRAWINGS

FIG. 11 is a schematic flowchart of an example of a shooting restoration method according to an embodiment of this disclosure.

DESCRIPTION OF EMBODIMENTS

Figure 1:
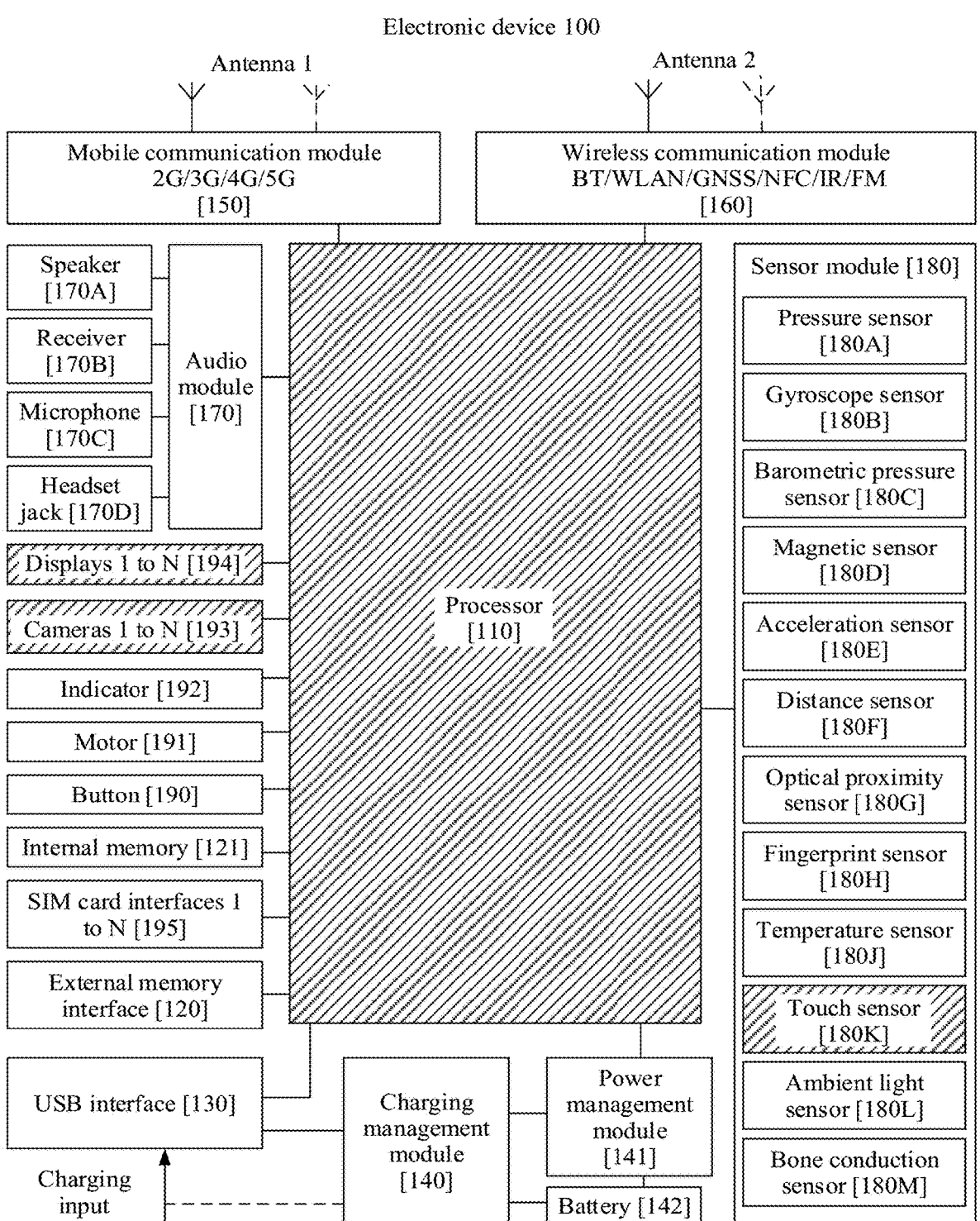
FIG. 1 is a schematic diagram of a structure of an electronic device according to an embodiment of this disclosure.

For a current mainstream electronic device, for example, a mobile phone, in a process in which a user uses the mobile phone to shoot a picture and record a video, a shooting process is one-time. After shooting is completed, the mobile phone presents only a shooting result to the user, that is, store a multimedia file, for example, a photo shot and a video recorded by the user to a local album. When the multimedia file, for example, the shot photo or the recorded video in the local album is lost, it is difficult for the user to restore the same or similar multimedia file, for example, the shot photo or the recorded video.

In a possible implementation, by using a log of the electronic device and shooting-related operation information that is recorded through marking, professional analysis is performed based on the log or the shooting-related operation information, to obtain information about one or more shooting parameters such as a focal length, resolution, a beauty level, a color indicator, and a brightness parameter that are used by the user to shoot the multimedia file, for example, the photo or the video, by using the mobile phone.

First, in the foregoing implementation, the user needs to actively set the electronic device to record the log or record the shooting-related operation information through marking, and when the user restores shooting to shoot a same or similar photo, the user needs to actively obtain and actively report the log or the shooting-related operation information.

Second, related log information or the shooting-related operation information that is recorded through marking may be understood as "file record information", needs to be implemented based on software code, and may not be completely in a one-to-one correspondence with an actual operation of the user.

In addition, the log needs to be reported and analyzed in a series, and a related implementation process needs participation of a developer or a professional technical person. A common user cannot directly obtain required operation information related to the lost multimedia file, for example, the photo or the video, by using the foregoing implementation.

Therefore, when the multimedia file, for example, the original photo or the video shot by the user is lost, the foregoing implementation cannot help the common user to restore shooting to shoot the same or similar multimedia file, for example, the photo or the video.

For the foregoing problem, an embodiment of this disclosure provides a shooting restoration method, so that the common user can restore shooting to shoot the same or similar multimedia file, for example, the photo or the video. The following describes the technical solutions in embodiments of this disclosure with reference to the accompanying drawings in embodiments of this disclosure.

The shooting restoration method provided in embodiments of this disclosure may be applied to any electronic device having a shooting function, for example, an electronic device, for example, a mobile phone, a tablet computer, a wearable device, an in-vehicle device, an augmented reality (AR) device/a virtual reality (VR) device, a notebook computer, an ultra-mobile personal computer (UMPC), a netbook, or a personal digital assistant (PDA). A specific type of the electronic device is not limited in the embodiments of this disclosure.

FIG. 1 is a schematic diagram of a structure of an electronic device according to an embodiment of this disclosure.

It should be understood that the electronic device in embodiments of this disclosure may include some or all structures of the electronic device 100 shown in FIG. 1, or may include more other structures that are not shown. This is not limited in embodiments of this disclosure.

For example, the electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a SIM card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of this disclosure does not constitute a specific limitation on the electronic device 100. In some other embodiments of this disclosure, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access and reduces waiting time of the processor 110, so that system efficiency is improved.

In embodiments of this disclosure, the processor 110 of the electronic device 100 stores a computer program or instructions corresponding to the method for implementing shooting restoration.

For example, the processor 110 of the electronic device 100 stores the method for implementing shooting restoration. The method may be a new shooting solution provided for a user. Specifically, in a process of shooting a photo, making a dynamic picture, recording a video, or the like by the user, the method may enable the electronic device to generate, based on one or more shooting parameters, one or more restoration template files corresponding to a multimedia file, for example, a photo, a dynamic picture, or a video clip. When the multimedia file, for example, the photo, the dynamic picture, or the video clip shot by the user is lost or mistakenly deleted, shooting restoration can be quickly implemented based on the associated restoration template file.

Specifically, the user may use the associated restoration template file to restore a shooting process, re-shoot another different object, and restore a multimedia file, for example, a photo, a dynamic picture, or a video clip with same effect; or the user may select a same or similar framing range based on basic information such as a framing of a multimedia file in the restoration template file, and restore a multimedia file, for example, a photo, a dynamic picture, or a video clip with same effect and a same framing range.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a USB interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. The PCM interface may also be used to perform audio communication, and sample, quantize, and encode an analog signal. The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 via the CSI, to implement a shooting function of the electronic device 100. The processor 110 communicates with the display 194 via the DSI interface, to implement a display function of the electronic device 100.

The GPIO interface may be configured by software. The USB interface 130 is an interface that conforms to a USB standard specification, and may be specifically a mini USB interface, a micro USB interface, a USB Type C interface, or the like. The USB interface 130 may be configured to connect to a charger to charge the electronic device 100, or may be configured to transmit data between the electronic device 100 and a peripheral device, or may be configured to connect to a headset, to play an audio by using the headset. The interface may be further configured to connect to another electronic device, for example, an AR device.

It can be understood that an interface connection relationship between modules illustrated in embodiments of this disclosure is merely an illustrative description, and does not constitute a limitation on a structure of the electronic device 100. In some other embodiments of this disclosure, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. The mobile communication module 150 may provide a solution, applied to the electronic device 100, to wireless communication including 2G, 3G, 4G, 5G, 6G, and the like.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor.

The application processor outputs a sound signal through an audio device (not limited to the speaker 170A, the receiver 170B, and the like), and displays an image or a video through the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that includes a wireless local area network (WLAN) (for example, a wireless fidelity (Wi-Fi) network, Bluetooth (BT), a global navigation satellite system (GNSS), frequency modulation (FM), a near field communication (NFC) technology, an infrared (IR) technology, or the like and that is applied to the electronic device 100.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology.

The electronic device 100 implements a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. In some embodiments, the electronic device 100 may include one or N displays 194, where N is a positive integer greater than 1.

For example, in embodiments of this disclosure, the electronic device 100 cooperates with modules such as the GPU, the display 194, and the application processor to display an image, an application interface, a control, an icon, a window, and the like on the display of the electronic device 100, to implement a display function of the electronic device 100.

The electronic device 100 may implement a shooting function through the camera 193, the ISP, the video codec, the GPU, the display 194, the application processor and the like.

For example, in embodiments of this disclosure, the electronic device 100 may run a camera application to enable a shooting function of the camera, and display a shooting preview interface on an interface of the camera application. An image collected by the camera and one or more controls such as a shooting shutter control may be displayed on the shooting preview interface. The user may tap the shooting shutter control to shoot a photo, record a video clip, and the like, and save the photo and the video clip in a local gallery application. Details are not described herein.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

For example, in embodiments of this disclosure, the electronic device 100 may adjust one or more shooting parameters by using the ISP, for example, one or more of a beauty parameter, a filter color, exposure, and photosensitivity. This is not limited in embodiments of this disclosure.

The camera 193 may be configured to capture a static image or a video. An optical image of an object is generated through the lens, and is projected onto the photosensitive element. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV In some embodiments, the electronic device 100 may include one or N cameras 193, where N is a positive integer greater than 1.

For example, in embodiments of this disclosure, the camera 193 may include a front-facing camera and a rear-facing camera, or include one or more types of cameras such as a wide-angle camera, a micro-distance camera, a depth of field camera, and a portrait camera. A quantity and types of the cameras 193 that may be included in the electronic device 100 are not limited in embodiments of this disclosure.

The digital signal processor is configured to process a digital signal, and in addition to a digital image signal, may further process another digital signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play or record videos in a plurality of encoding formats, for example, moving picture experts group (MPEG)-1, MPEG-2, MPEG-3, and MPEG-4.

The NPU is a neural-network (NN) computing processor, and simulates a biological neural network structure like a transmission mode between neurons in a human brain to perform rapid processing on input information, and can perform continuous self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (UFS).

The electronic device 100 may implement an audio function, for example, music playing and recording, through the audio module 170, the speaker 170A, the receiver 170B, the microphone 170C, the headset jack 170D, the application processor, and the like.

The pressure sensor 180A is configured to sense a pressure signal, and can convert the pressure signal into an electrical signal.

The gyroscope sensor 180B may be configured to determine a moving posture of the electronic device 100.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall effect sensor.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application, for example, switching between a landscape mode and a portrait mode or a pedometer.

The distance sensor 180F is configured to measure a distance. The electronic device 100 may measure the distance in an infrared manner or a laser manner. In some embodiments, in a shooting scenario, the electronic device 100 may measure a distance through the distance sensor 180F to implement quick focusing.

The optical proximity sensor 180G may include, for example, a light emitting diode (LED) and an optical detector such as a photodiode. The light emitting diode may be an infrared light emitting diode.

The ambient light sensor 180L is configured to sense ambient light brightness.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J.

The touch sensor 180K is also referred to as a touch panel. The touch sensor 180K may be disposed on the display 194, and a touchscreen, also referred to as a "touchscreen", is formed by the touch sensor 180K and the display 194. The touch sensor 180K is configured to detect a touch operation performed on or near the touch sensor. The touch sensor may transfer the detected touch operation to the application processor to determine a type of the touch event. A visual output related to the touch operation may be provided on the display 194. In some other embodiments, the touch sensor

180K may also be disposed on a surface of the electronic device 100 at a location different from that of the display 194.

Optionally, in embodiments of this disclosure, the touch sensor 180K may detect an operation of the user, for example, touching and tapping, generate an operation event, and transfer the operation event to the processor 110. The processor 110 determines that the operation event includes related parameters such as coordinates of a touch point and a touch status, and responds to the operation event. For example, the user taps the shooting shutter control to perform a shooting operation. The operation event may include information about the shooting shutter control, user touch operation information, and the like, and is transferred to the processor 110. The processor 110 completes the shooting operation based on the image collected by the camera, and obtains a photo.

The bone conduction sensor 180M may obtain a vibration signal.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1.

A software system of the electronic device 100 may use a layered architecture, an event-driven architecture, a micro-kernel architecture, a micro service architecture, or a cloud architecture. For example, in an embodiment of this disclosure, an Android® system with a layered architecture is used as an example to describe a software structure of the electronic device 100.

Figure 2:
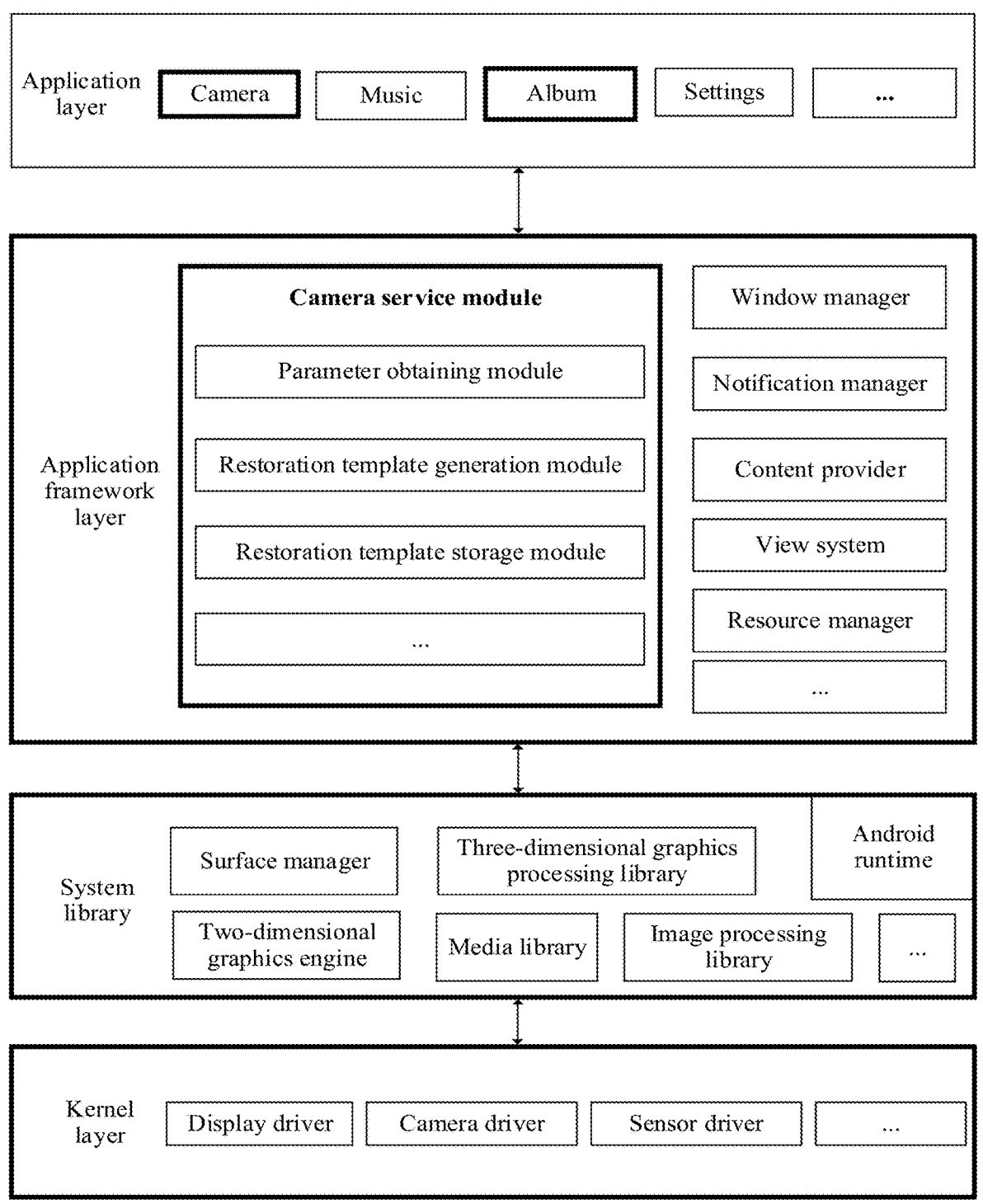
FIG. 2 is a block diagram of a software structure of an electronic device according to an embodiment of this disclosure.

FIG. 2 is a block diagram of a software structure of an electronic device according to an embodiment of this disclosure.

Optionally, a layered architecture of an Android® system shown in FIG. 2 may include several layers, each layer has a clear role and task, and the layers communicate with each other through a software interface.

In a hierarchical architecture, software is divided into several layers, and each layer has a clear role and task. The layers communicate with each other through a software interface. In some embodiments, an Android® system is divided into four layers: an application layer, an application framework layer, an Android® runtime and system library, and a kernel layer from top to bottom.

The application layer may include a series of application packages.

For example, as shown in FIG. 2, the application package may include applications such as Camera, Music, Album, and Settings. In embodiments of this disclosure, a user may shoot a photo, a dynamic picture, a video clip, or the like by using a camera application, and the shot photo, dynamic picture, video clip, or the like may be stored in an album (a gallery) application.

Optionally, the "camera application" in embodiments of this disclosure may be a camera application configured before delivery of the electronic device, and may include different shooting modes such as photographing, video recording, and dual-view video recording. This is not limited in embodiments of this disclosure.

It should be understood that the camera application, the album (gallery) application, and the like may be associated with a shooting restoration function in embodiments of this disclosure.

The application framework layer provides an application programming interface (API) and a programming framework for an application in the application layer. The application framework layer includes some predefined functions. As shown in FIG. 2, the application framework layer may include a window manager, a content provider, a view system, a resource manager, a notification manager, and the like, and may include a camera service module in embodiments of this disclosure.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, an audio, calls that are dialed and answered, a browsing history, a bookmark, a phone book, and the like.

The view system includes visual controls such as a control for displaying a text and a control for displaying a picture. The view system may be configured to construct an application program. A display interface may include one or more views. For example, a display interface including an icon of a camera application on an interface of a mobile phone may include a text display view and an image display view.

The resource manager provides various resources such as a localized character string, an icon, a picture, a layout file, and a video file for an application.

The notification manager enables an application to display notification information in the status bar, and may be configured to convey a notification message. The notification manager may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The camera service module in embodiments of this disclosure may specifically include submodules such as a parameter obtaining module, a restoration template generation module, and a restoration template storage module, to implement the shooting restoration function in embodiments of this disclosure.

Specifically, the parameter obtaining module may be configured to obtain one or more shooting parameters corresponding to any multimedia file, for example, a photo, a dynamic picture, or a video clip. For example, a photo is used as an example. When the user shoots a photo, the parameter obtaining module may obtain one or more of a focal length, a focusing mode, resolution, a camera, geographical location information, a beauty parameter, a filter color, flash effect, horizontal level effect, exposure, and photosensitivity, and/or obtain one or more editing parameters related to editing processing performed by the user, such as ratio cropping, filter color adjustment, beauty parameter adjustment, or brightness level adjustment. This is not limited in embodiments of this disclosure.

The restoration template generation module may generate, based on the one or more shooting parameters and/or the one or more editing parameters obtained by the parameter obtaining module, one or more restoration template files associated with each multimedia file, for example, a photo, a dynamic picture, or a video clip. In addition, the restoration template generation module may further automatically determine names of the one or more restoration template files according to a preset rule, and automatically save the one or more restoration template files to the restoration template storage module.

The restoration template storage module is configured to store the one or more restoration template files.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional graphics processing library (OpenGL) (for example, OpenGL for Embedded Systems (OpenGL ES)), and a two-dimensional graphics engine (for example, Standard General Ledger (SGL)).

The surface manager is configured to manage a display subsystem and provide fusion of two-dimensional and three-dimensional graphics layers for a plurality of applications.

The media library supports playing and recording of a plurality of common audio and video formats, a static image file, and the like. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The two-dimensional graphics engine is a drawing engine for two-dimensional drawing. The image processing library may provide analysis of various image data and provide a plurality of image processing algorithms, for example, may provide processing such as image cropping, image fusion, image blurring, and image sharpening. Details are not described herein.

For example, in embodiments of this disclosure, when an application interface is displayed on the display of the electronic device, image rendering, composition, layer processing, and the like of the application interface may be sequentially performed based on the view system, the two-dimensional graphics engine, the three-dimensional graphics processing library, the image processing library, and the like, and finally the application interface, for example, a shooting preview interface of the camera application, is displayed on the display.

The kernel layer is a layer between hardware and software. The kernel layer includes at least a display driver, a camera driver, an audio driver, and a sensor driver.

For example, in embodiments of this disclosure, in a process of using a camera application or in a process of restoring a photo by a user, through collaboration and cooperation of a plurality of software modules and hardware modules described above, for example, a shooting preview interface is displayed for the user, an operation of the user is detected, and interface display is adjusted or various operations are performed in response to different operations of the user. Details are not described herein.

For ease of understanding, in the following embodiments of this disclosure, a mobile phone having the structures shown in FIG. 1 and FIG. 2 is used as an example to describe in detail, with reference to the accompanying drawings and scenarios, the shooting restoration method provided in embodiments of this disclosure. Optionally, before performing shooting restoration, the user may enable a shooting restoration function of the electronic device.

FIG. 3A to FIG. 3D are a schematic diagram of examples of graphical user interfaces (GUIs) on which a user sets a shooting restoration function according to an embodiment of this disclosure.

Figure 3A:
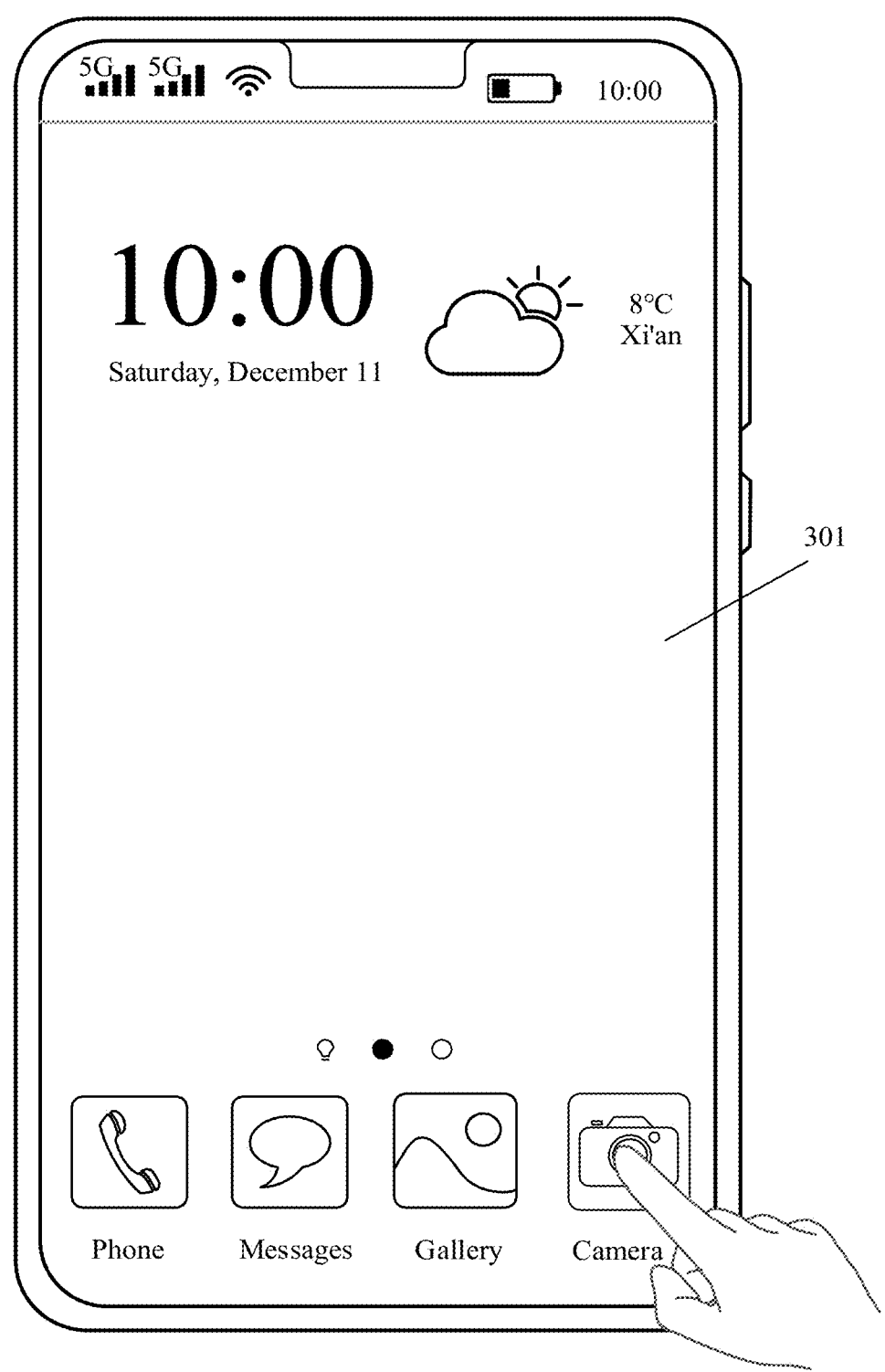
FIG. 3A to FIG. 3D are a schematic diagram of examples of graphical user interfaces on which a user sets a shooting restoration function according to an embodiment of this disclosure.

For example, FIG. 3A shows a home screen 301 displayed by a mobile phone in an unlock mode. The home screen 301 may include a top status bar area and an interface display area. One or more types of content such as an operator identifier, a signal identifier of a WLAN (for example, a Wi-Fi network), a battery level identifier of the mobile phone, and current time may be displayed in the top status bar area. A weather-and-clock widget and a plurality of applications (Apps) installed on the mobile phone are displayed in the interface display area. Optionally, the applications may include Phone, Messages, Gallery, Camera, and the like. It should be understood that the home screen 301 may further include more other content or may be used for display of more applications. Content displayed on the home screen of the mobile phone is not limited in embodiments of this disclosure.

In a possible manner, the user performs an operation shown in FIG. 3A of tapping an icon of the camera application. In response to the operation of the user, the mobile phone may display a main interface 302 of the camera application shown in FIG. 3B. In embodiments of this disclosure, the main interface 302 of the camera application may also be referred to as a "shooting preview interface". Different images and pictures may be presented on the shooting preview interface, and the presented images and pictures are referred to as "preview images" or "preview pictures".

Figure 3B:
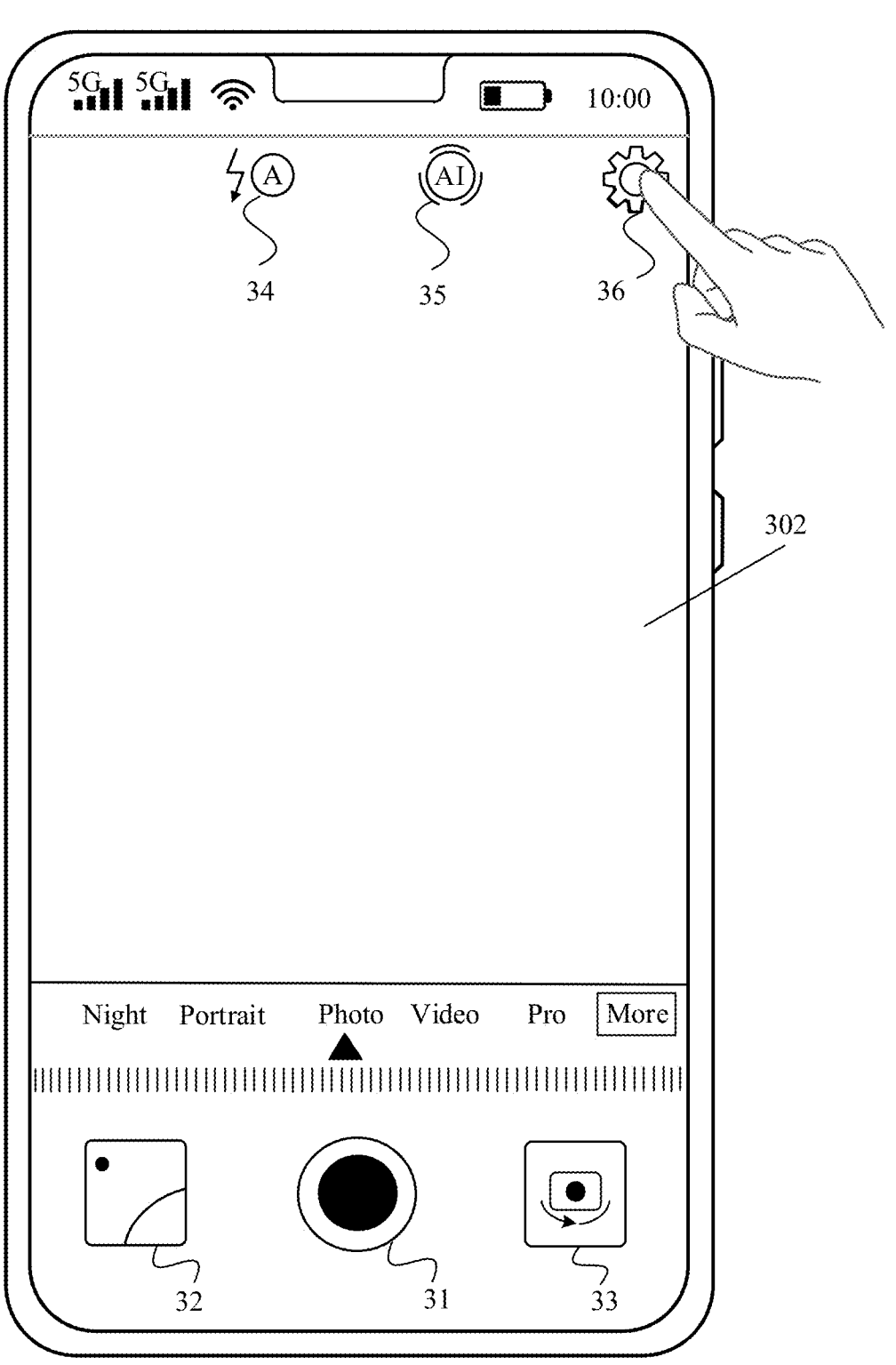

It should be understood that, as shown in FIG. 3B, the shooting preview interface 302 may include a bottom navigation area, a middle preview picture display area, and a top menu area. For example, as shown in FIG. 3B, on the shooting preview interface 302, a shooting shutter control 31, a local album control 32, and a camera switching control 33 are displayed in the bottom navigation area, and a plurality of shooting mode controls such as Night, Portrait, Photo, Video, and Pro are further displayed. The middle preview picture display area is used for display of an image or a picture currently captured by a camera of the mobile phone. One or more controls, for example, a flash automation control 34, an artificial intelligence (AI) shooting control 35, and a camera setting control 36, may be displayed in the top menu area. A quantity of controls or a type of a control displayed in each area is not limited in embodiments of this disclosure. For brevity, different functions of each control are not described in embodiments of this disclosure.

The user performs an operation shown in FIG. 3B of tapping the camera setting control 36. In response to the operation of the user, the mobile phone may display a camera setting interface 303 shown in FIG. 3C. Optionally, a plurality of setting options related to a shooting process, for example, setting options such as Aspect ratio (for example, an aspect ratio is set to [4:3]), Audio control, and Capture smiles related to photo shooting, setting options related to video recording, for example, Video resolution (for example, a video picture ratio is set to [16:9] and video resolution is set to 1080p) and Video frame rate, and general setting options such as Assistive grid and Timer, are displayed on the camera setting interface 303. This is not limited in embodiments of this disclosure.

In embodiments of this disclosure, a "Restoration template" option may be added to the general setting options for the user, and the user may manually enable, by using a switch corresponding to the "Restoration template" option, a shooting restoration function provided in embodiments of this disclosure. It should be understood that the "Restoration template" option may be further added to another possible option or menu. This is not limited in embodiments of this disclosure.

Figure 3C:
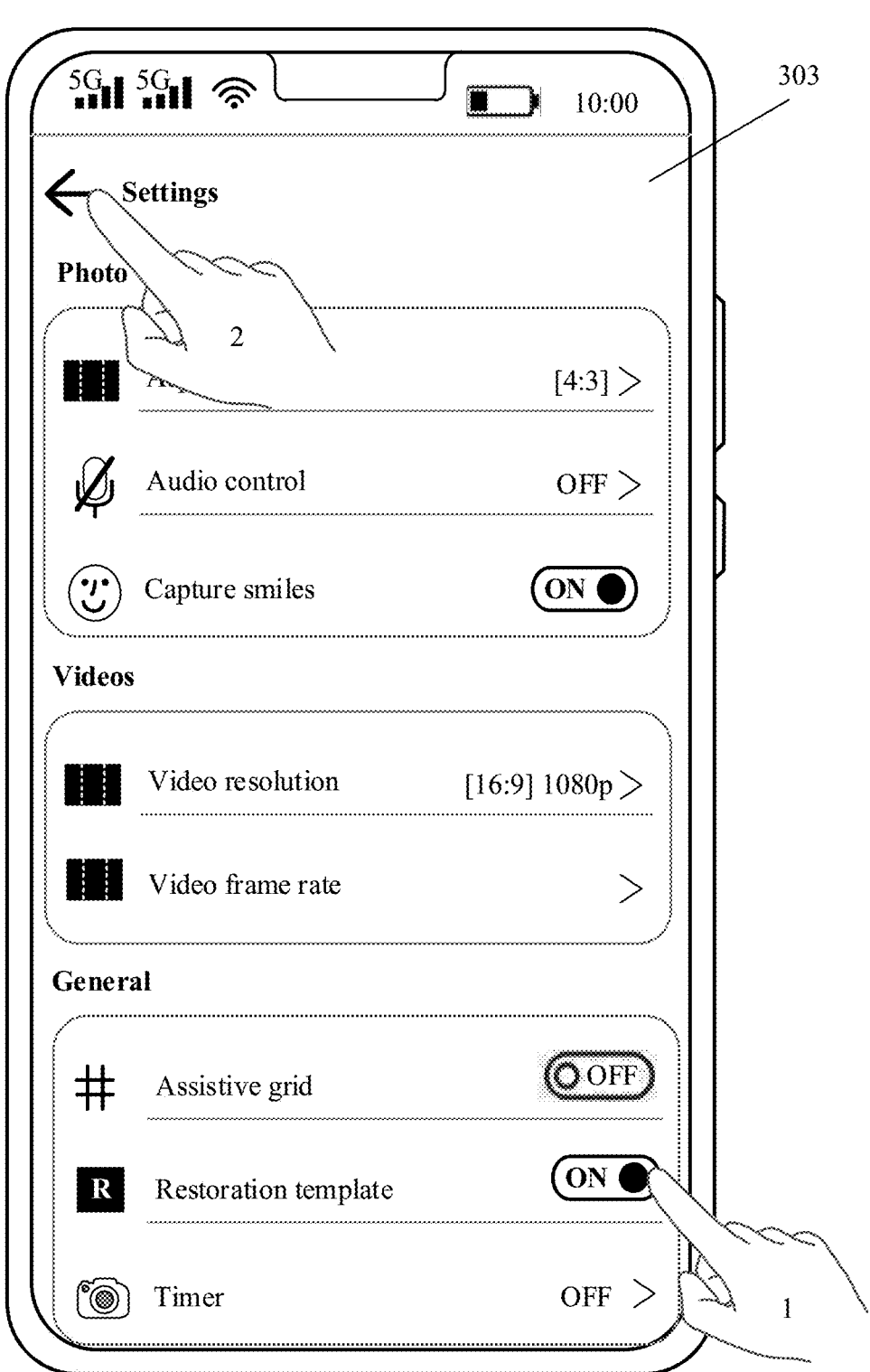

For example, the user performs an operation 1 shown in FIG. 3C of tapping the switch corresponding to the "Restoration template" option. In response to the operation of the user, the switch corresponding to the "Restoration template" option is switched to an on (ON) state, and the mobile phone enables the shooting restoration function. Then, the user performs an operation 2 shown in FIG. 3C of tapping a "Back" control. In response to the operation of the user, the mobile phone may back to the shooting preview interface, and display an interface 304 shown in FIG. 3D.

Figure 3D:
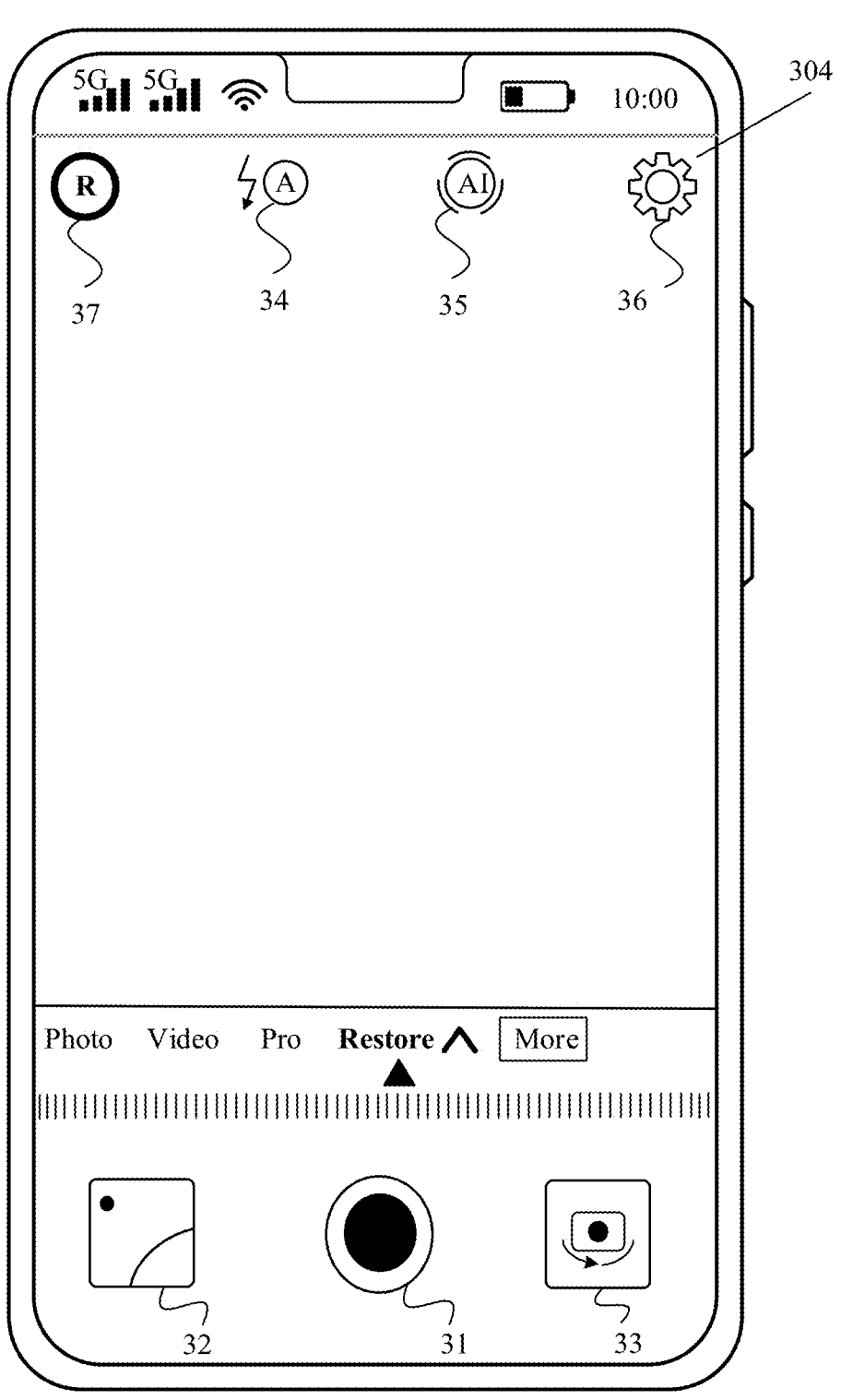

Correspondingly, compared with the shooting preview interface 302 shown in FIG. 3B, after the user enables the shooting restoration function, a restoration control 37 may be displayed in a top menu area of the shooting preview interface 304 shown in FIG. 3D. A display style of the restoration control 37 is not limited in embodiments of this disclosure.

In another possible manner, in a process of developing a photo restoration function of the camera application, the developer may configure the restoration control 37 to be always displayed on the shooting preview interface, and the shooting preview interface may always be presented as the interface 304 shown in FIG. 3D. The user may quickly enable the photo restoration function of the mobile phone by tapping the restoration control 37. This simplifies an operation process, and makes an operation of enabling the photo restoration function more convenient.

Optionally, the restoration control 37 may have different display states, for example, a non-working state displayed in gray or marked with an arrow, or a working state displayed in black or marked without an arrow. It should be understood that, for a display manner of the restoration control 37, refer to display of existing controls such as the flash automation control 34 and the AI shooting control 35. The user may tap the restoration control 37 to implement switching between different display states. Details are not described herein again.

In still another possible manner, in a process of developing a shooting guidance function of the camera application, the developer may configure the shooting restoration function to be in an on state by default.

Optionally, in the development process, the developer may configure the shooting restoration function as a preset function of a system of the mobile phone, a preset function of the camera application, or a preset function of an associated gallery application. This is not limited in embodiments of this disclosure. In this manner, the user does not need to perform an additional operation to enable the shooting restoration function. This can simplify an operation of the user.

It should be noted herein that when the shooting restoration function is configured as the preset function of the electronic device, the user may have authorized the shooting restoration function, that is, a plurality of associated applications such as the camera application and the gallery application may be authorized to invoke the shooting restoration function. This is not limited in embodiments of this disclosure.

In addition, when the user does not need to use the shooting restoration function, in embodiments of this disclosure, the user may be further supported in disabling the preset function by using a setting control of the camera application, or disabling the preset function by using a menu or a control of the gallery application, or disabling the preset function by using a menu related to a system-level setting application. This is not limited in embodiments of this disclosure.

After the shooting restoration function of the mobile phone is enabled, the user may shoot a photo, record a video, or the like by using the camera application. In the following embodiments, an example in which the user shoots a photo is used to describe a photo shooting process provided in embodiments of this disclosure, and a process in which the user restores a photo after the photo shot by the user is lost or mistakenly deleted.

In a possible scenario, in a photo shooting process, the user may manually adjust one or more shooting parameters based on a shooting requirement of the user. For example, the user may perform one or more operations such as focal length adjustment, camera switching, and a beauty level adjustment, to adjust corresponding shooting parameters.

For example, a plurality of possible user operations and shooting parameters that may be adjusted by the user operations are listed in Table 1. As shown in Table 1, the user may perform one or more operations, and each user operation may be performed on a different object, to modify actual shooting parameters of current shooting.

With reference to content in Table 1, for example, the user performs the focal length adjustment operation. The user may set a zoom mode in a photo shooting process based on a motion status and the like of a shot object. Optionally, the zoom mode may include an auto focus single (AF-S) mode, an auto focus continue (AF-C) mode, a manual focus (MF) mode, and the like. The AF-S mode may be used to shoot a static subject, the AF-C mode may be used to focus on a continuously moving subject, and the MF mode may be used to shoot an unpredictable moving subject. Specifically, the user may set different zoom modes with reference to a current shot object and shooting requirement, to shoot different objects by using different focal lengths in different zoom modes. Details are not described in embodiments of this disclosure.

Alternatively, for example, the user adjusts a beauty level in the shooting process. The user may enable a beauty processing function of the camera application in the shooting process, and adjust the beauty level based on a shooting requirement. For example, the mobile phone may provide different beauty levels 0 to 10 for the user, and different beauty levels may correspond to different beauty parameters such as a skin color, skin texture, and smoothness of a person. The user may swipe left or right on the shooting preview interface to adjust the beauty parameters. Details are not described herein.

It should be understood that the foregoing describes, with reference to Table 1, one or more operations that may be performed by the user. Any one or a combination of the plurality of user operations may be referred to as a "meta-operation of the user", and the "meta-operation of the user" may be actively initiated by the user. For example, the "meta-operation of the user" may include one or more of various operations related to shooting parameter modifying, such as resolution adjustment, focal length adjustment, camera switching, and a beauty level adjustment. A quantity and types of operations included in the "meta-operation of the user" are not limited in embodiments of this disclosure.

It should be noted that the "meta-operation of the user" described above may occur before shooting. For example, before shooting, the user sets resolution and an aspect ratio of a shot photo, a size of storage space occupied by the photo, and the like.

Alternatively, the one or more user operations may occur in the shooting process. For example, when the user performs shooting, a beauty function may be enabled to adjust a beauty level of current shooting.

TABLE 1

| Operation that may be performed by the user | Operation object | Corresponding actual shooting parameter |
| --- | --- | --- |
| Resolution adjustment operation | Camera resolution, photo pixel, ratio, and the like | 10 M 4160 × 3120 [4:3] |
| Focal length adjustment operation | Zoom mode, focal length, and the like | AF-S, AF-C, or MF, and focal length parameter |
| Camera switching operation | Front-facing camera/Rear-facing camera/Wide-angle camera/Macro camera/Depth of field camera/. . . | Camera parameter |
| Beauty adjustment operation | Skin color, skin texture, smoothness, and the like | Beauty parameter |
| Brightness adjustment operation | Aperture and the like | International Organization for Standardization (ISO) (photosensitivity) parameter |
| . . . | . . . | . . . |

Alternatively, in a video recording process, the user may switch between a plurality of cameras such as the front-facing camera and the rear-facing camera in the video recording process. An occurrence occasion of the "meta-operation of the user" is not limited in embodiments of this disclosure.

In another possible scenario, as an intelligent electronic device, the mobile phone may automatically adjust, with reference to a current shooting environment, and/or based on an intelligent software algorithm, one or more shooting parameters involved in a shooting process.

For example, in the shooting process, the mobile phone may automatically perform focusing on a shot object, or the mobile phone detects a shooting environment, and may automatically adjust shooting brightness in a night time period in a dark shooting environment, or various capability items such as AI recognition of the mobile phone may automatically adjust related parameters. A type of a parameter that can be automatically adjusted by the mobile phone is not limited in embodiments of this disclosure.

It should be understood that the foregoing described processes in which "the user adjusts one or more shooting parameters" and "the mobile phone automatically adjusts one or more shooting parameters" cause a change in display effect of a shot photo. In other words, each photo shot by the user, each video clip recorded by the user, and the like may have different display effect due to different shooting parameters.

In embodiments of this disclosure, all "objects that may cause a change in display effect of a shot photo" are referred to as "operation objects". The "operation objects" may be actively initiated by the user, or may be automatically adjusted by the mobile phone, and each operation object may cause a change in a shooting parameter, thereby causing different display effect of shot photos. In descriptions of subsequent embodiments, whether the "operation object" is actively initiated by the user or caused by an intelligent operation of the electronic device is no longer distinguished.

For example, related content that may be included in the "operation object" is listed in Table 2. Content such as a plurality of operation objects, display effect corresponding to each operation object, an applicable shooting mode, and an adjustment or modification occasion is listed in Table 2.

TABLE 2

| Object that causes a change in effect of a shot photo | Related descriptions |
| --- | --- |
| Resolution | (1) Resolution is used to adjust a size of a shooting interface; (2) Resolution can be used in all modes such as a photo shooting mode, a video recording mode, and a multi-view mode; and (3) Resolution can be adjusted before shooting, and cannot be adjusted during shooting. |
| Focal length | (1) Focal length is used to adjust a size of a viewfinder; (2) Focal length can be used in all modes such as a photo shooting mode, a video recording mode, and a multi-view mode; and (3) Focal length can be dynamically adjusted before shooting and during shooting. |
| Camera switching | (1) Camera switching is used to adjust a camera; (2) Camera switching can be used in all modes such as a photo shooting mode, a video recording mode, and a multi-view mode; and (3) Camera switching can be dynamically adjusted before shooting and during shooting. |
| Beauty | (1) Beauty is used to adjust beauty effect; (2) Beauty can be used in all modes such as a photo shooting mode, a video recording mode, and a multi-view mode; and (3) Beauty can be dynamically adjusted before shooting and during shooting. |
| Geographical location | (1) Geographical location is used to record geographical location information; (2) Geographical location can be used in all modes such as a photo shooting mode, a video recording mode, and a multi-view mode; and (3) Geographical location can be adjusted before shooting, and cannot be adjusted during shooting. |
| Filter color | (1) Filter color is used to adjust a shooting filter; (2) Filter color can be used in all modes such as a photo shooting mode, a video recording mode, and a multi-view mode; and (3) Filter color can be adjusted before shooting, and cannot be adjusted during shooting. |
| Flash | (1) Flash is used to control on or off of a flash; (2) Flash can be used in all modes such as a photo shooting mode, a video recording mode, and a multi-view mode; and (3) Flash can be dynamically adjusted before shooting and during shooting. |
| Horizontal level effect | (1) Horizontal level effect is a horizontal level function for assisting in shooting; (2) Horizontal level effect can be used in all modes such as a photo shooting mode, a video recording mode, and a multi-view mode; and (3) Horizontal level effect can be adjusted before shooting, and cannot be adjusted during shooting. |
| Exposure | (1) Exposure is used to adjust a magnitude of exposure; (2) Exposure can be used in a professional mode; and (3) Exposure can be adjusted before shooting and during shooting. |
| Photosensitivity | (1) Photosensitivity is used to adjust a magnitude of photosensitivity; (2) Photosensitivity can be used in a professional mode; and (3) Photosensitivity can be adjusted before shooting and during shooting. |
| Automatic focus | (1) Automatic focus is used to control an automatic focus function; (2) Automatic focus can be used in all modes such as a photo shooting mode, a video recording mode, and a multi-view mode; and (3) Automatic focus can be adjusted before shooting, and cannot be adjusted during shooting. |
| . . . | . . . |

Optionally, each operation object causes a change in effect of a shot photo may correspond to a different adjustment or modification occasion.

For example, for the resolution, the user may be supported in adjusting the resolution before shooting a photo, but not supported in adjusting the resolution in a shooting process. For the camera, the user may be supported in selecting the camera before shooting a photo, and may be supported in switching the camera in a shooting process. Details are not described herein.

With reference to one or more operation objects listed in Table 2, the following describes an implementation process of embodiments of this disclosure by using a process in which the user actually shoots a photo as an example.

FIG. 4A to FIG. 4D are a schematic diagram of examples of graphical user interfaces in a process of shooting a photo by the user according to an embodiment of this disclosure.

Figure 4A:
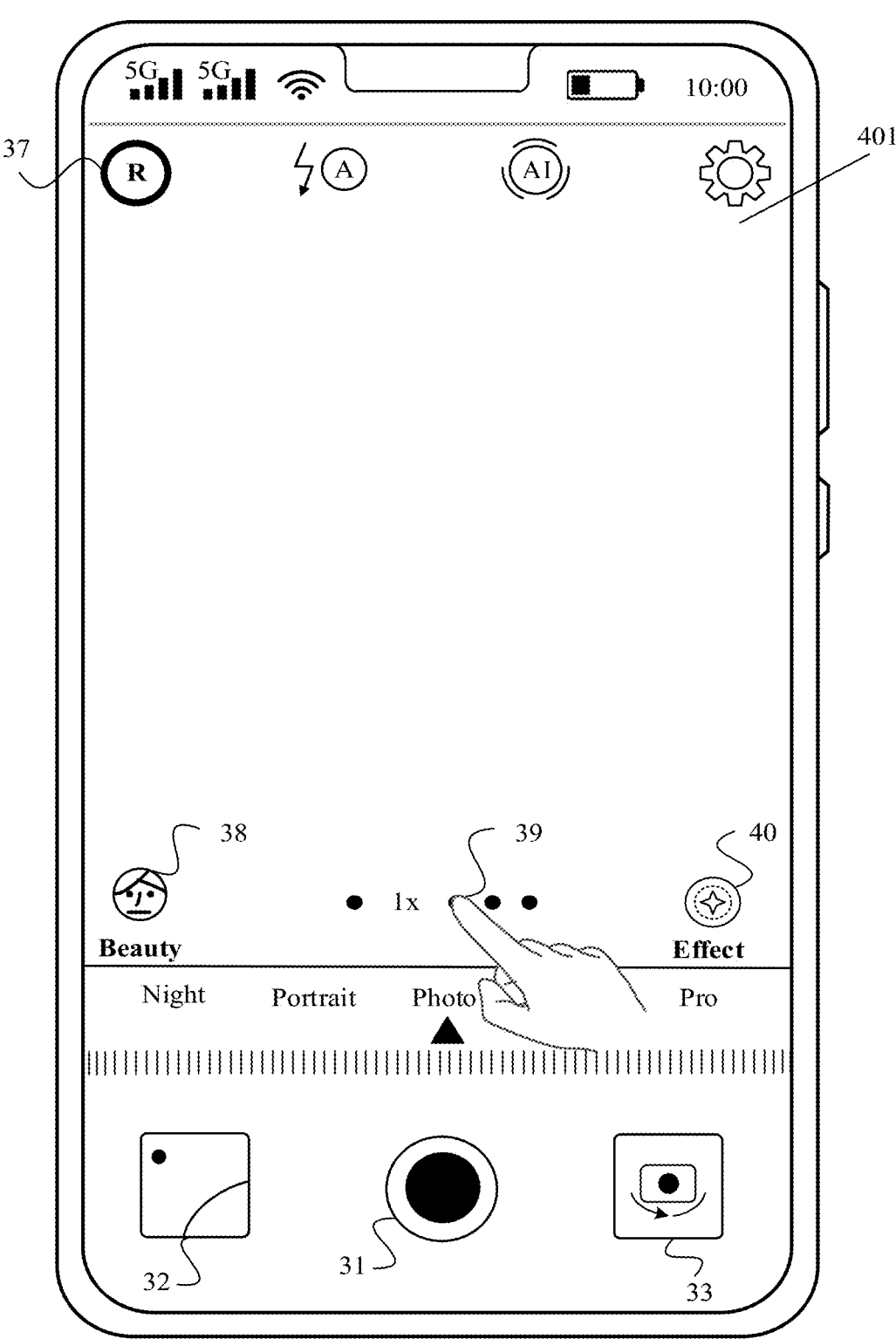
FIG. 4A to FIG. 4D are a schematic diagram of examples of graphical user interfaces in a process of shooting a photo by a user according to an embodiment of this disclosure.
Figure 4B:
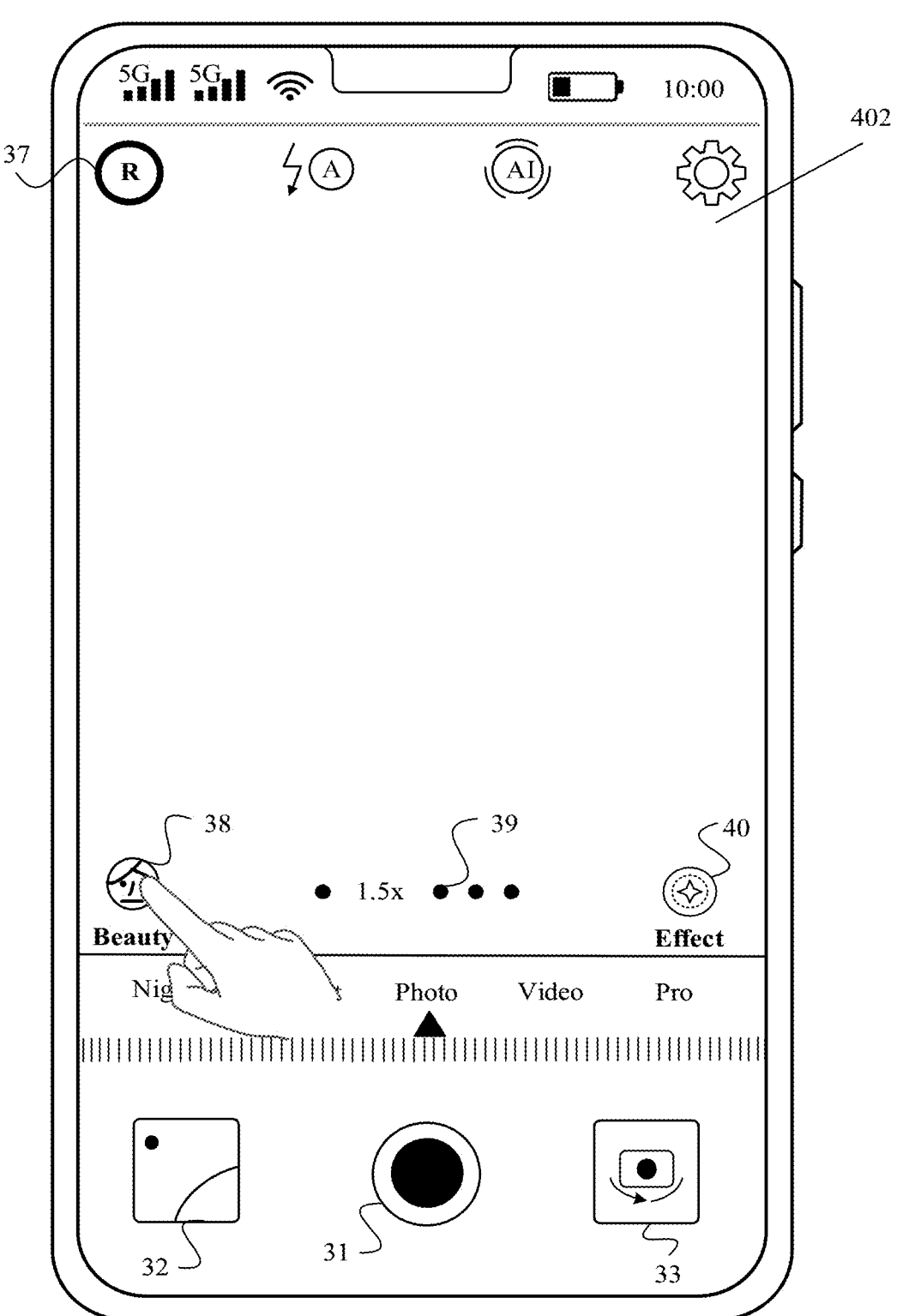
Figure 4C:
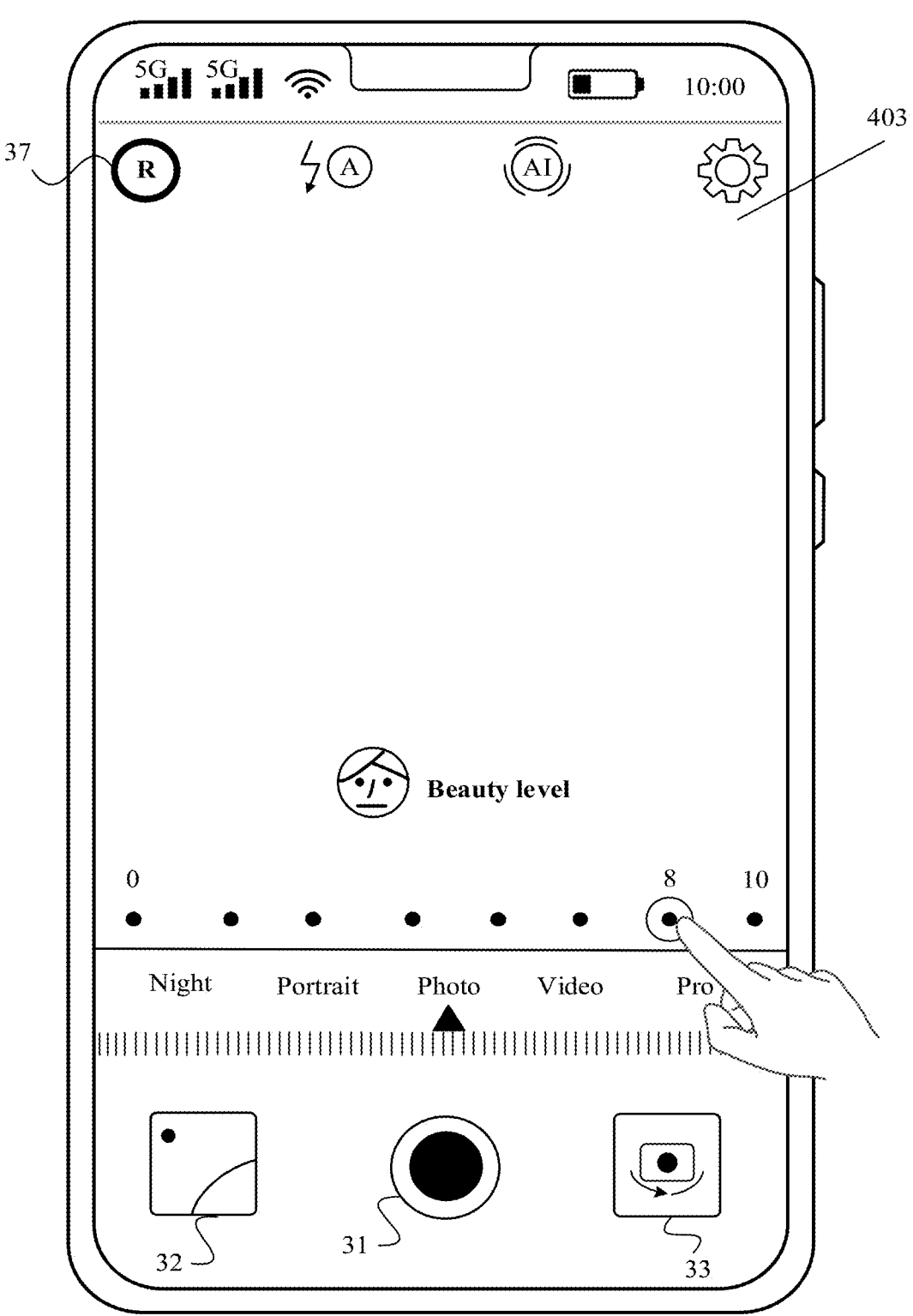

For example, on a shooting preview interface 401 of the camera application, the user performs an operation shown in FIG. 4A, that is, the user manually taps a zoom-in multiple control 39, and adjusts a zoom-in multiple of shooting from "1×" to "1.5×". In this case, the mobile phone may display an interface 402 shown in FIG. 4B. Then, the user performs an operation shown in FIG. 4B of tapping a beauty function control 38. In response to the operation of the user, the mobile phone enables a shooting-related beauty function, and displays an interface 403 shown in FIG. 4C. Different beauty levels 1 to 10 are displayed on the interface 403. The user may manually select a required beauty level. For example, the user selects a beauty level 8 corresponding to current photo shooting.

Figure 4D:
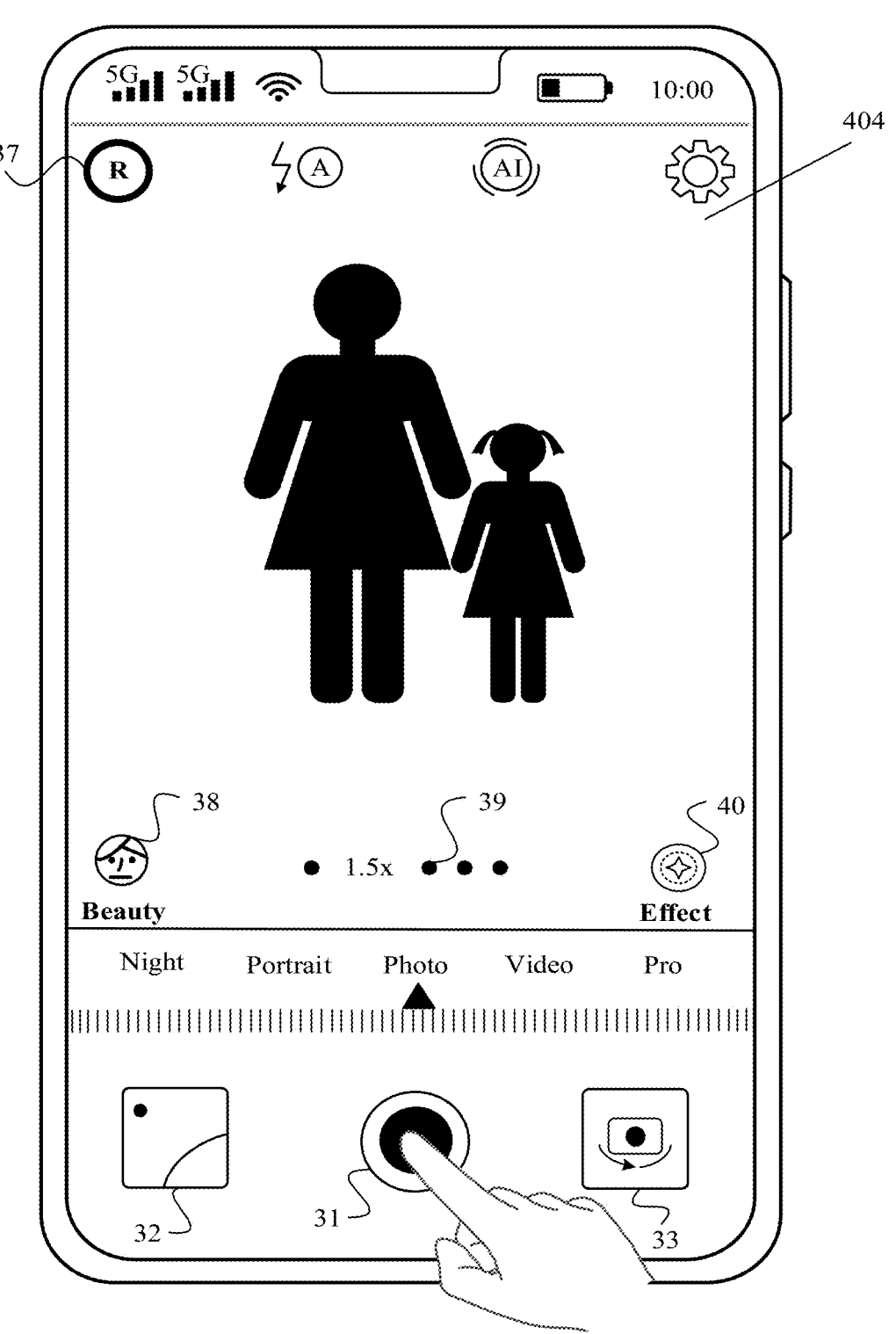

After completing related settings, the user returns to a shooting preview interface 404 shown in FIG. 4D. Based on the shooting parameter manually obtained through modification by the user, a preview image (a picture including "an adult and a child") displayed on the current shooting preview interface 404 has display effect obtained through "1.5×" zoom-in and 8-level beauty processing.

Optionally, the user may further manually set more display effect, for example, add different filters, add different widgets, and add different icons. This is not limited in embodiments of this disclosure.

The user performs an operation shown in FIG. 4D of tapping a shooting shutter control 31, and in response to the shooting operation of the user, the mobile phone obtains a preview image that is currently obtained through "1.5×" zoom-in and 8-level beauty processing, and stores the preview image as a shot photo in the local album. Optionally, the shot photo may be displayed in a local album control 32 in a form of a thumbnail. Details are not described herein.

It should be further understood that, in embodiments of this disclosure, a zoom-in multiple "1.0×", a zoom-in multiple "1.5×", and the like may be understood as display effect that is of the preview image on the shooting preview interface and that is described from a visual angle of the user. Specifically, different zoom-in multiples may correspond to different focal lengths. When photos are shot by using different focal lengths, different display effect may be presented to the user. Details are not described subsequently again.

In a possible implementation, in embodiments of this disclosure, if the user has enabled the shooting restoration function of the camera application in any manner described in FIG. 3A to FIG. 3D, after that, for each photo shot by the user according to the method shown in FIG. 4A to FIG. 4D, the camera application may record a process of shooting the photo by the user, and determine a shooting parameter involved in shooting the photo.

Optionally, in embodiments of this disclosure, the shooting parameter corresponding to each photo may include all related parameters that cause a change of display effect of the photo, such as one or more shooting parameters that are manually adjusted by the user, or one or more shooting parameters that are automatically adjusted by the mobile phone.

For the shooting scenario listed in FIG. 4A to FIG. 4D, assuming that the user obtains, through shooting, a photo 1 including "an adult and a child" based on the preview image shown in FIG. 4D, actual shooting parameters of the photo 1 obtained through recording by the camera application of the mobile phone in a process in which the user shots the photo 1 may be correspondingly listed in Table 3.

It should be understood that, with reference to different adjustment occasions corresponding to each operation object in Table 2, content listed in Table 3 may be classified into an "operation object before shooting" and an "operation object during shooting".

For example, for an operation object, for example, Focal length and Beauty, the user may be supported in adjusting the operation object before shooting, or may be supported in adjusting the operation object during shooting. Therefore, the operation object, for example, Focal length and Beauty, may be included in both the "operation object before shooting" and the "operation object during shooting", and may correspond to different actual shooting parameters.

TABLE 3

| | Operation object | Status | Corresponding actual shooting parameter |
|---|---|---|---|
| Before shooting (shooting parameter) | Resolution | N/A | 10 M 4160 × 3120 [4:3] |
| | Focal length | On | 7.9 |
| | Camera switching | On | Rear-facing camera and related parameter |
| | Beauty | On | Beauty level 8 |
| | Geographical location | On | XXX |
| | Horizontal level effect | On | N/A |
| | Automatic focus | Off | N/A |
| | . . . | . . . | . . . |

TABLE 3-continued

| Operation object | | Status | Corresponding actual shooting parameter |
|---|---|---|---|
| During shooting (shooting parameter) | Filter color | On | Leica smooth |
| | Focal length | On | 8.0 |
| | Flash | On | N/A |
| | Exposure | N/A | −2 |
| | Photosensitivity | N/A | ISO 100 |
| | Beauty | On | Beauty level 6 |
| | . . . | . . . | . . . |
| After shooting (editing parameter) | Beauty | On | Beauty level 6 |
| | Brightness | On | The brightness is increased to a level 3 |
| | Filter color | On | Pure |
| | . . . | . . . | . . . |

For an operation object, for example, Resolution and Geographical location, the user is only supported in performing adjustment before shooting, and the user is not supported in performing adjustment during shooting. Therefore, the operation object, for example, Resolution and Geographical location, may be included only in the "operation object before shooting". Details are not described herein.

Optionally, the camera application of the mobile phone may generate a corresponding "restoration template file" based on the shooting parameter of each photo.

Specifically, the camera application of the mobile phone may generate a corresponding "restoration template file" based on image data included in each photo and a shooting parameter of the photo. It should be understood that each photo shot by the user may include different image data and shooting parameters, and each photo corresponds to a unique "restoration template file". For example, the photo 1 obtained through shooting in FIG. 4D corresponds to a unique restoration template file 1.

Optionally, each photo may be associated with or bound to the "restoration template file" in a plurality of possible manners.

In a possible implementation, each photo may be associated with the "restoration template file" by using a file name; or a unique hash value is generated for each photo to be associated with the "restoration template file"; or a key value is preset for each photo to be associated with the "restoration template file". This is not limited in embodiments of this disclosure.

For example, manners of associating a plurality of photos with restoration template files are listed in Table 4. For each photo, when the user completes shooing the photo and automatically stores the photo locally, a unique photo name, for example, IMG-2021-12-R1, may be automatically generated for the photo, and a name of a restoration template file of the photo is automatically generated based on the name of the photo and a preset rule. For example, a suffix −11 is added to the name of the photo, a restoration template file IMG-2021-12-R1-11 corresponding to the photo is generated, and the photo and the associated restoration template file are stored.

TABLE 4

| Photo name | Shooting parameter | Restoration template file |
|---|---|---|
| IMG-2021-12-R1 | . . . | IMG-2021-12-R1-11 |
| IMG-2021-11-R3 | . . . | IMG-2021-11-R3-11 |
| IMG-2021-10-R5 | . . . | IMG-2021-10-R5-11 |
| Photo 1-R2 | . . . | Photo 1-R2-11 |
| Photo 2-R4 | . . . | Photo 2-R4-11 |

TABLE 4-continued

| Photo name | Shooting parameter | Restoration template file |
|---|---|---|
| Photo 3-R6 | . . . | Photo 3-R6-11 |
| . . . | . . . | . . . |

Optionally, for each photo, after the photo is shot and stored in the gallery application, the user may further edit the photo.

For example, the user may perform one or more editing operations such as cropping an aspect ratio, adjusting a filter color of the photo, and adjusting a beauty level. For example, after completing shooting, the user may modify a beauty level of the photo, and/or adjust brightness of the photo, and/or add a filter color to the photo, and the like.

It should be understood that when the user performs an editing operation on the photo, all parameters related to display effect of the photo, or parameters that may change display effect of the photo, are referred to as "editing parameters". For each photo edited by the user, the mobile phone may record all editing parameters involved in a process of editing the photo by the user, and may add the "editing parameters" to the restoration template file 1 corresponding to the photo 1.

Specifically, when the user completes shooting, the restoration template file 1 uniquely corresponding to the photo 1 may be generated and stored. After shooting is completed, when an editing operation performed by the user on the photo 1 is subsequently detected, an operation object of the editing operation performed by the user is recorded, and a related parameter (of the editing operation) of a photo effect change caused by the user operation is added to the restoration template file 1 corresponding to the photo 1.

For example, after shooting is completed, if the user modifies a beauty level of the photo 1, and/or adjusts brightness of the photo, and/or adds a filter color to the photo, the mobile phone may record editing parameters of one or more editing operations of the user, add the "editing parameters" to the "operation object after shooting" part in Table 3 in the restoration template file of the photo 1, and update and store the "editing parameters" in the restoration template file 1 of the photo 1.

According to the foregoing process, for each photo shot by the user on the mobile phone, a unique corresponding restoration template file may be generated after the user completes shooting.

When a photo (for example, the photo 1 shot in the foregoing embodiment) is lost, or is deleted due to a misoperation of the user, a restoration template file corresponding to the lost or deleted photo is not deleted, and is still stored in the mobile phone. According to the shooting restoration method in embodiments of this disclosure, the user may restore the photo based on the restoration template file corresponding to the lost or mistakenly deleted photo, to help the user re-shoot a photo that is the same as or similar to the lost or mistakenly deleted photo.

It should be noted herein that, in embodiments of this disclosure, "restoration" described in "photo restoration", the "shooting restoration method", the "restoration process", and the like may include the following meaning: further restoring a shooting process based on the restoration template file corresponding to the lost or mistakenly deleted photo, to re-shoot a photo having a same shooting parameter; and/or selecting a same viewfinder based on the restoration template file corresponding to the lost or mistakenly deleted photo, and shooting a photo having a same framing range.

In other words, in embodiments of this disclosure, if restoration is performed based on the lost or mistakenly deleted photo 1, an obtained "restored photo" may include at least the following possible cases:

(1) The "restored photo" and the lost or mistakenly deleted photo 1 may have only a same shooting parameter, and have different framing ranges.

(2) The "restored photo" and the lost or mistakenly deleted photo 1 may have only a same framing range, and have different shooting parameters.

(3) The "restored photo" and the lost or mistakenly deleted photo 1 may have a same shooting parameter and a same framing range.

It should be understood that the "restored photo" described in any one of the foregoing possible cases may be referred to as a "photo that is the same as or similar to the lost or mistakenly deleted photo 1", and this definition is not described again in subsequent embodiments.

It should be further understood that any possible "restored photo" obtained according to the method provided in embodiments of this disclosure, namely, "a same or similar photo" obtained through re-shooting based on the restoration template file 1 corresponding to the lost or mistakenly deleted photo 1 may fall within the protection scope of embodiments of this disclosure. Details are not described in subsequent embodiments.

With reference to the accompanying drawings, the following describes a process of obtaining the "restored photo" by the user according to the method provided in embodiments of this disclosure.

FIG. 5A to FIG. 5F are a schematic diagram of examples of graphical user interfaces in a shooting restoration process according to an embodiment of this disclosure.

For example, the photo 1 that is shot by the user and that includes "the adult and the child" in FIG. 4D is used as an example. Assuming that the photo 1 is lost or mistakenly deleted by the user, when the user needs to restore the photo 1, the user may enter the shooting preview interface of the camera application by using the camera application of the mobile phone, and restore the photo according to the method provided in embodiments of this disclosure.

Figure 5A:
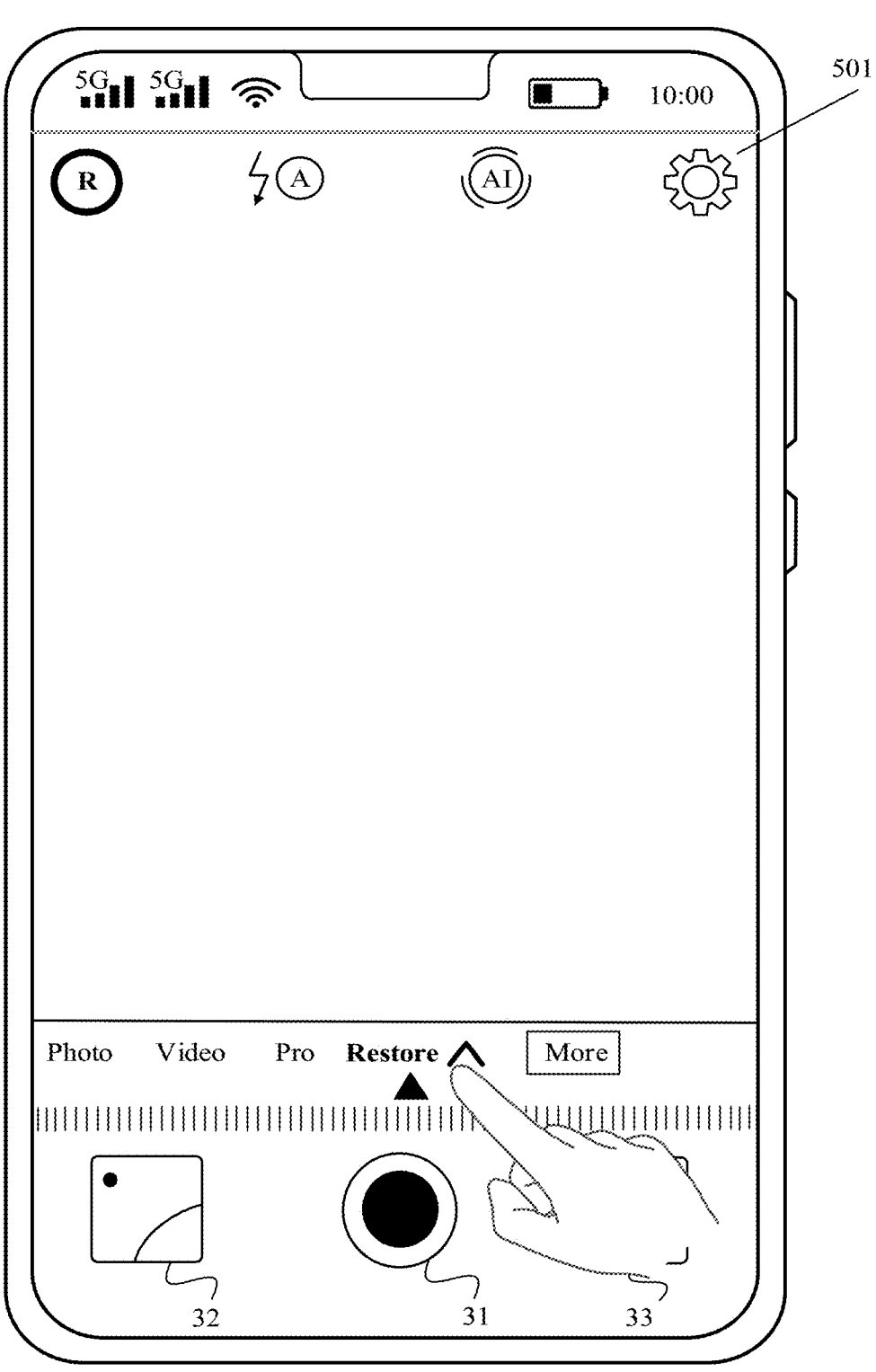
FIG. 5A to FIG. 5F are a schematic diagram of examples of graphical user interfaces in a shooting restoration process according to an embodiment of this disclosure.

Optionally, in embodiments of this disclosure, after the shooting restoration function of the mobile phone is enabled, in addition to a plurality of shooting mode controls such as Night, Portrait, Photo, Video, and Pro, a new shooting mode control, for example, a "Restoration" mode control shown in FIG. 5A, may be further added to the bottom navigation area of the shooting preview interface of the camera application.

Specifically, on a shooting preview interface 501, the user may perform an operation of swiping left or right on a shooting mode control display area in the bottom navigation area, to view more shooting modes or switch a current shooting mode. For example, the user switches the current shooting mode to a restoration mode. Correspondingly, a "black triangle icon" used to locate the current shooting mode may point to the "Restoration" mode control.

For example, the user performs an operation shown in FIG. 5A of tapping the "Restoration" mode control. In response to the operation of the user, the mobile phone displays an interface 502 shown in FIG. 5B. The interface 502 may be understood as a restoration template selection interface. On the restoration template selection interface 502, a restoration template selection window may be displayed in a floating manner, and one or more restoration templates (or one or more restoration template files) may be displayed in the restoration template selection window.

Optionally, thumbnails of one or more photos may be displayed in the restoration template selection window. The user may select, by tapping a thumbnail of a photo, an expected restoration template file corresponding to the photo.

Alternatively, names of one or more photos may be displayed in the restoration template selection window in a form of a list, and the user may select an expected restoration template file by tapping a name of a restoration template.

Alternatively, names of one or more restoration template files may be displayed in the restoration template selection window in a form of a list, and the user may select an expected restoration template file by tapping a name of a restoration template file. A display manner of the one or more restoration template files in the restoration template selection window is not limited in embodiments of this disclosure.

In a possible implementation, the one or more restoration templates displayed in the restoration template selection window may be sorted according to a preset rule. In other words, in different shooting scenarios, the one or more restoration templates displayed in the restoration template selection window displayed on the interface 502 shown in FIG. 5B may be the same, or may be different.

Optionally, the one or more restoration templates included in the restoration template selection window include a preset restoration template; and/or the one or more restoration templates included in the restoration template selection window include a restoration template generated by the electronic device based on one or more shooting parameters of an associated multimedia file, for example, a photo, a dynamic picture, and a video clip.

For example, two fixed restoration templates are set by a developer when the mobile phone is delivered from a factory. The restoration templates correspond to fixed shooting parameters. The shooting parameters may enable the mobile phone to have high-quality shooting effect.

Alternatively, the mobile phone may intelligently detect a shooting environment, a shot object, and the like, and intelligently match different shooting templates for the user based on external factors such as the shooting environment and the shot object. For example, when the mobile phone detects that the current shooting environment is a dark night shooting environment, the one or more restoration templates displayed in the restoration template selection window may include a parameter suitable for night shooting.

Alternatively, the mobile phone may intelligently display, to the user based on a use frequency, a shooting habit, and the like of the user, one or more restoration templates that are frequently used. For example, the restoration template file corresponding to the photo named "IMG-2021-12-R1" is most frequently used, and is preferentially displayed in the restoration template selection window. This is not limited in embodiments of this disclosure.

Figure 5B:
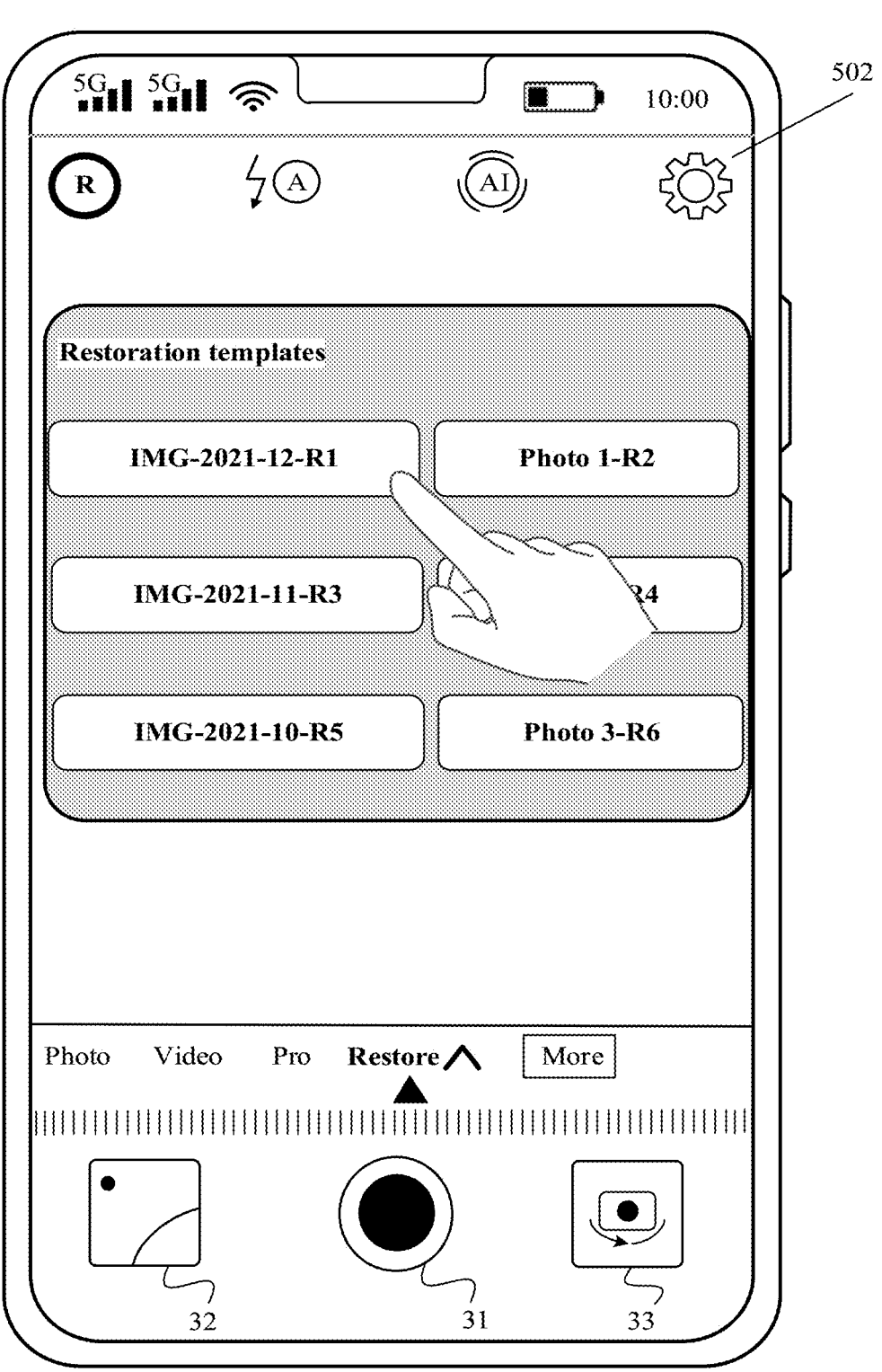

For example, as shown in FIG. 5B, the names of the plurality of photos that are shot by the user and that are listed in Table 4 may be displayed in the restoration template selection window on the interface 502. The user taps the photo whose name is "IMG-2021-12-R1". In response to an operation of the user, the mobile phone determines that the user currently selects the restoration template file corresponding to the photo named "IMG-2021-12-R1", and the mobile phone may further display an interface 503 shown in FIG. 5C.

Optionally, one or more types of parameter information in the restoration template file corresponding to the photo named is "IMG-2021-12-R1" may be presented on the interface 503 to the user in a form of a floating window.

Optionally, the one or more types of parameter information may include basic information such as the photo name, a photo thumbnail, and a storage location of the restoration template file. It should be understood that displaying a thumbnail of the photo 1 may help the user determine image content of the to-be-restored photo, help quickly locate the shot object, and improve efficiency of photo restoration.

Optionally, the one or more types of parameter information may further include one or more shooting parameters such as a focal length, resolution, a beauty level, and an AI color before shooting, and/or one or more shooting parameters such as a focal length and a beauty level during shooting, and/or one or more editing parameters related to editing operations such as cropping, a filter, and brightness after shooting. This is not limited in embodiments of this disclosure.

It should be understood that, due to the size of the screen of the mobile phone or a size of the floating window, some parameter content listed above may be displayed on the interface 503. The user may view more parameter content by performing a swipe operation, a page flip operation, a pull-down operation, or the like, or view more parameter content by tapping a preset control. This is not limited in embodiments of this disclosure.

Figure 5C:
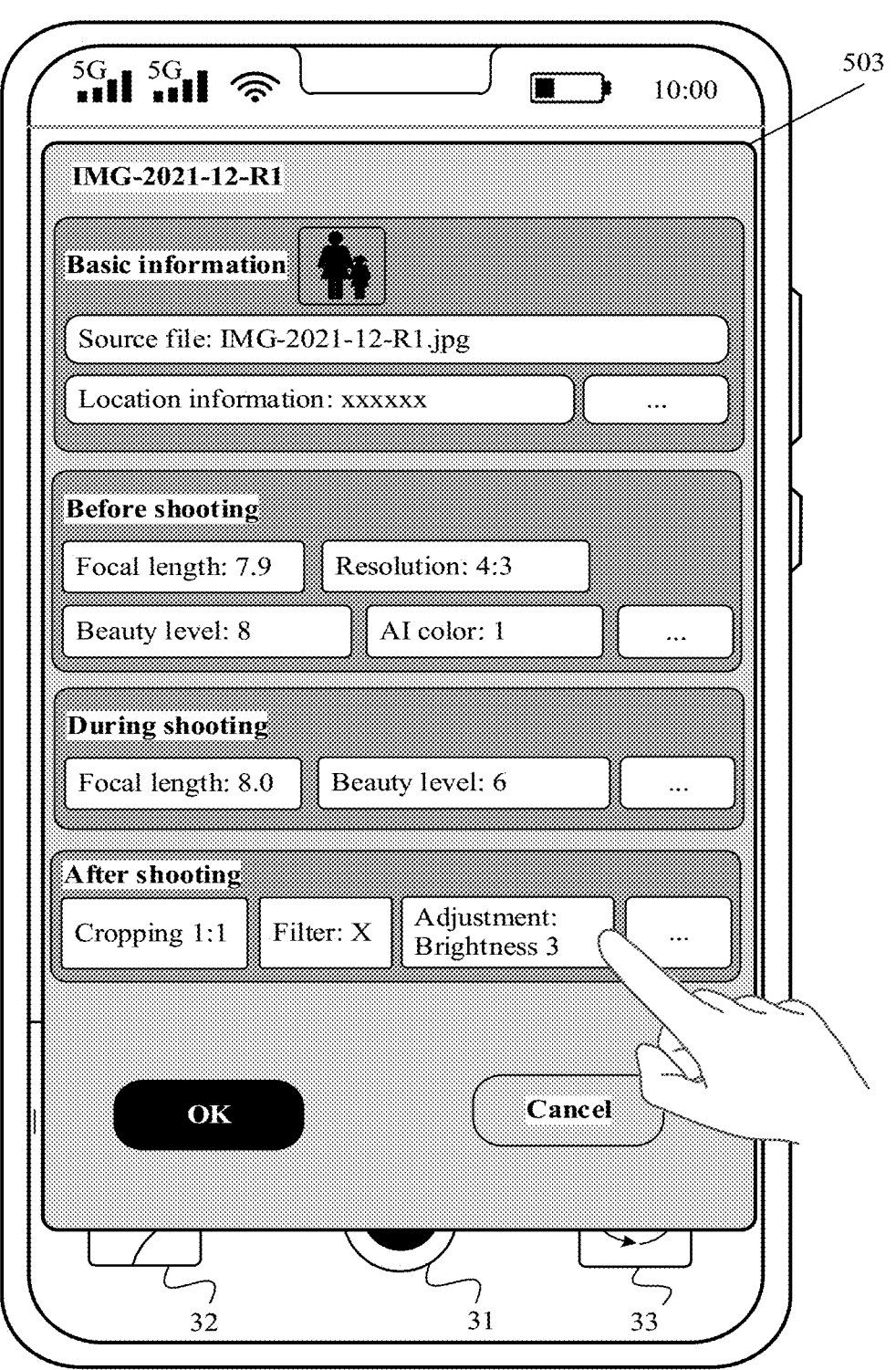

For example, as shown in FIG. 5C, on the interface 503, the basic information of the photo 1, the one or more parameters before shooting, the one or more parameters during shooting, and the one or more parameters after shooting that are listed in Table 3 may be displayed in the floating window by category. The basic information of the photo 1 may include the thumbnail of the photo 1, a name of the photo 1, a file format, storage location information, and the like.

It should be understood that, a photo may include the shooting parameter before shooting, the shooting parameter during shooting, and the editing parameter after shooting that are listed in Table 3. In addition, the shooting parameter before shooting, the shooting parameter during shooting, and the editing parameter after shooting may include a same parameter type.

In a possible implementation, when parameters corresponding to a photo include parameters of a same type, final parameters corresponding to display effect presented to the user may be used.

For example, the shooting parameter before shooting, the shooting parameter during shooting, and the editing parameter after shooting that are listed in Table 3 each include a "beauty level parameter". In this case, the beauty level may subject to a final beauty level corresponding to display effect presented to the user by superimposing the beauty level before shooting, the beauty level during shooting, and the beauty level after shooting, and is stored in the restoration template file.

Alternatively, when parameters corresponding to a photo include both a filter color during shooting and a filter color after shooting, the filter color parameter may subject to a filter color level corresponding to display effect that is finally presented to the user and that is of the photo, and is stored in the restoration template file. This is not limited in embodiments of this disclosure.

In a possible implementation, in a process of performing photo restoration based on the restoration template file corresponding to the lost or mistakenly deleted photo 1, after the user selects the restoration template file, the user may further modify one or more parameters in the restoration template file.

Optionally, "modifying one or more parameters in the restoration template file" may include: The user performs an operation, for example, editing, deleting, adding, or adjusting on the one or more parameters.

For example, the user may tap a control corresponding to a parameter that is expected to be modified, to trigger a process of modifying the parameter, and manually modify the parameter; or the user may touch and hold a control corresponding to a parameter, to trigger a process of deleting the parameter, and manually delete the parameter. This is not limited in embodiments of this disclosure.

As shown in FIG. 5C, one or more types of parameter information in the restoration template file corresponding to the photo named is "IMG-2021-12-R1" is presented to the user in the floating window of the interface 503. The user performs an operation shown in FIG. 5C of tapping a brightness adjustment control after shooting, and in response to the operation of the user, the mobile phone displays an interface 504 shown in FIG. 5D. A brightness progress bar of brightness levels from level 0 to level 10 may be displayed on the interface 504, and the user may swipe a finger on the brightness progress bar to adjust the brightness level. It is assumed that the user changes the brightness level of the photo 1 to a level 3 in the editing operation after shooting listed in Table 3, performs an operation 1 shown in FIG. 5D in a shooting process of restoring the photo in FIG. 5A to FIG. 5F, changes the brightness level to a level 7, then performs an operation 2, and taps an "OK" control. In response to the operation of the user, the mobile phone displays an interface 505 shown in FIG. 5E.

Alternatively, in FIG. 5C, if the user touches and holds the brightness adjustment control after shooting, in response to an operation of the user, the mobile phone may display a "Delete" option. The user may tap the "Delete" option, and determine to perform a delete operation, so that the brightness adjustment parameter after shooting included in the restoration template file of the photo 1 may be deleted. Details are not described herein.

Figure 5D:
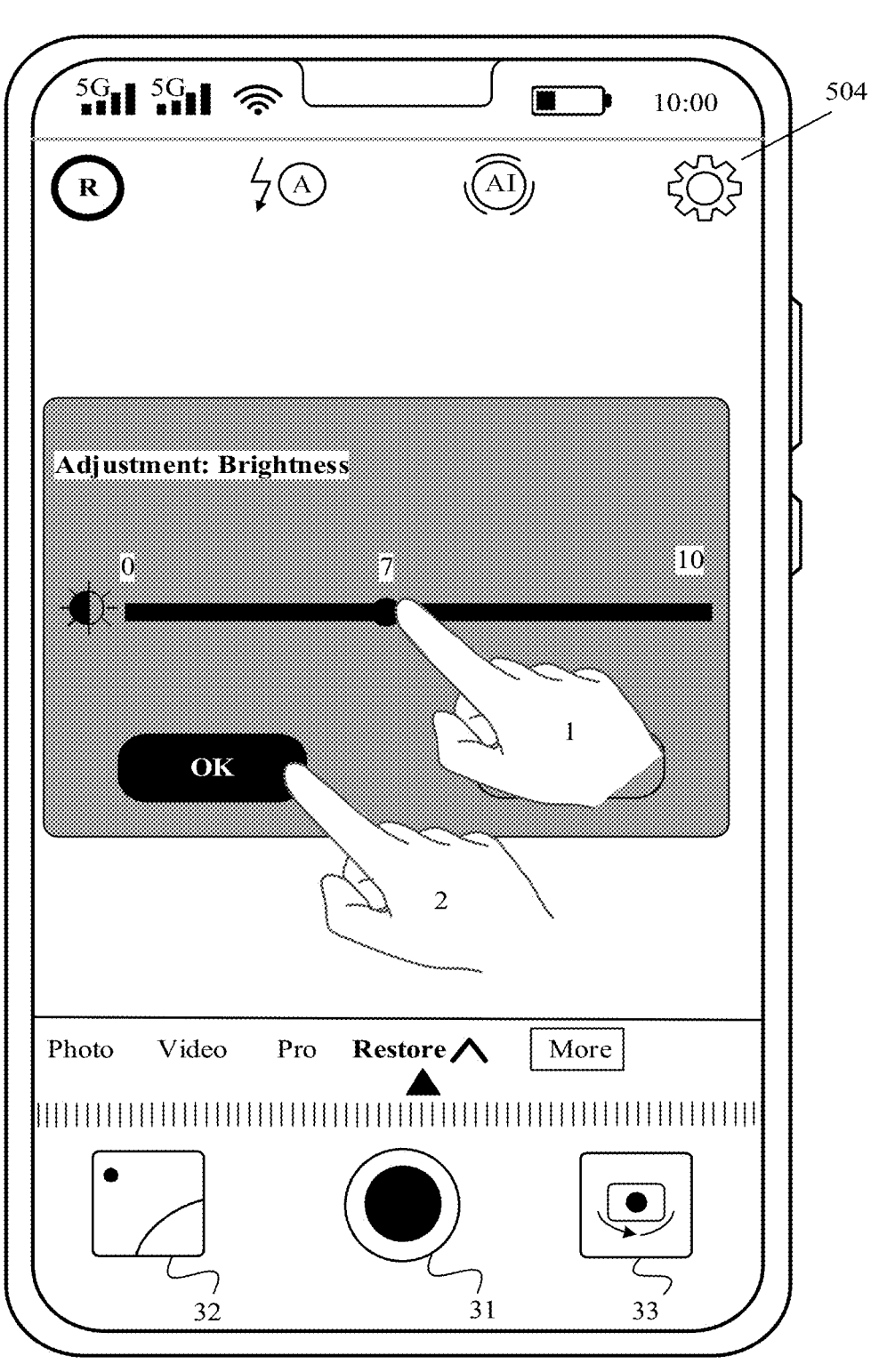
Figure 5E:
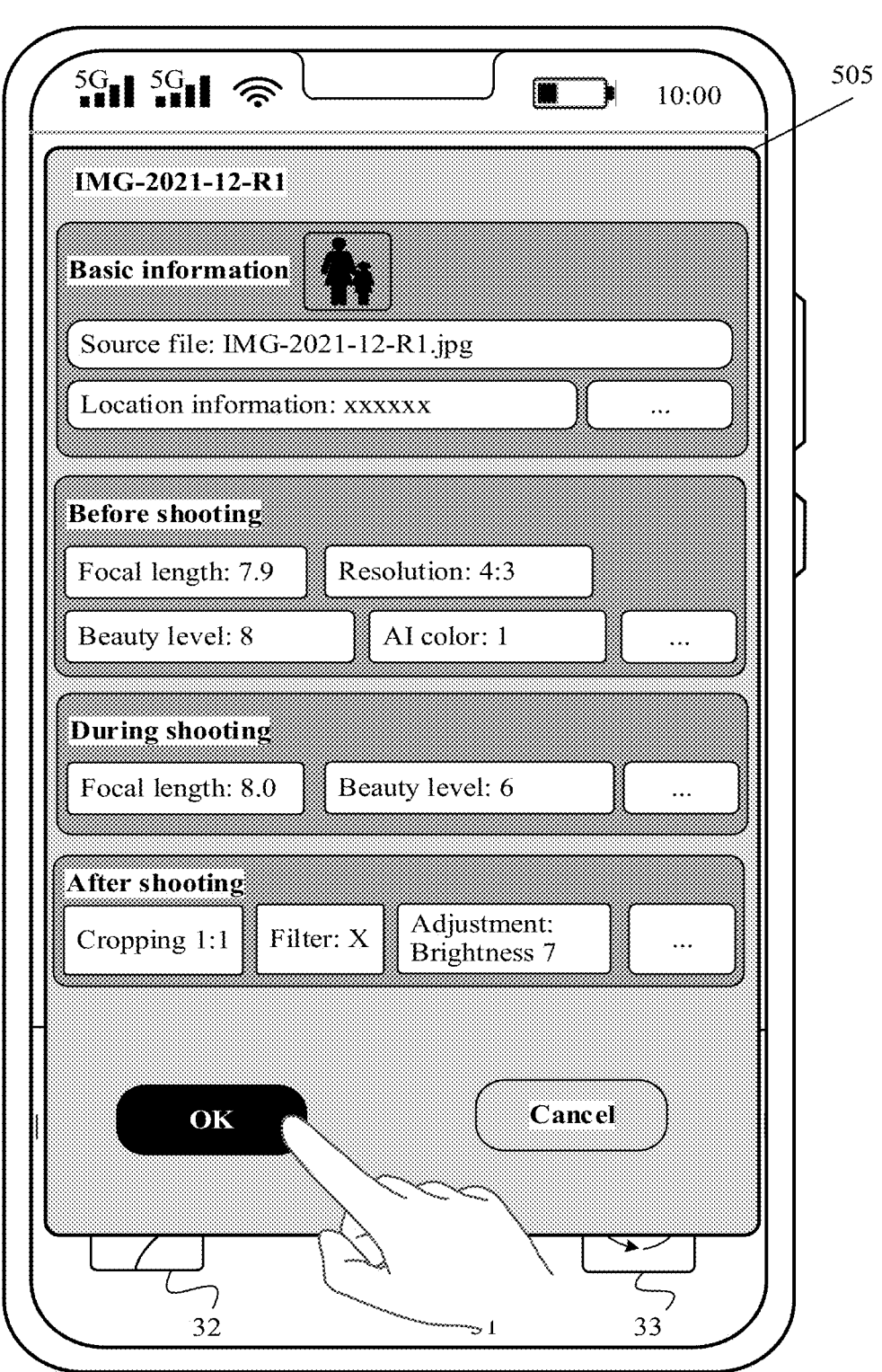

When determining that the one or more parameters included in the restoration template file of the photo 1 no longer need to be modified, the user may perform an operation shown in FIG. 5E, and tap an "OK" control in the floating window. In response to the operation of the user, the mobile phone displays a shooting preview interface 506 shown in FIG. 5F.

Figure 5F:
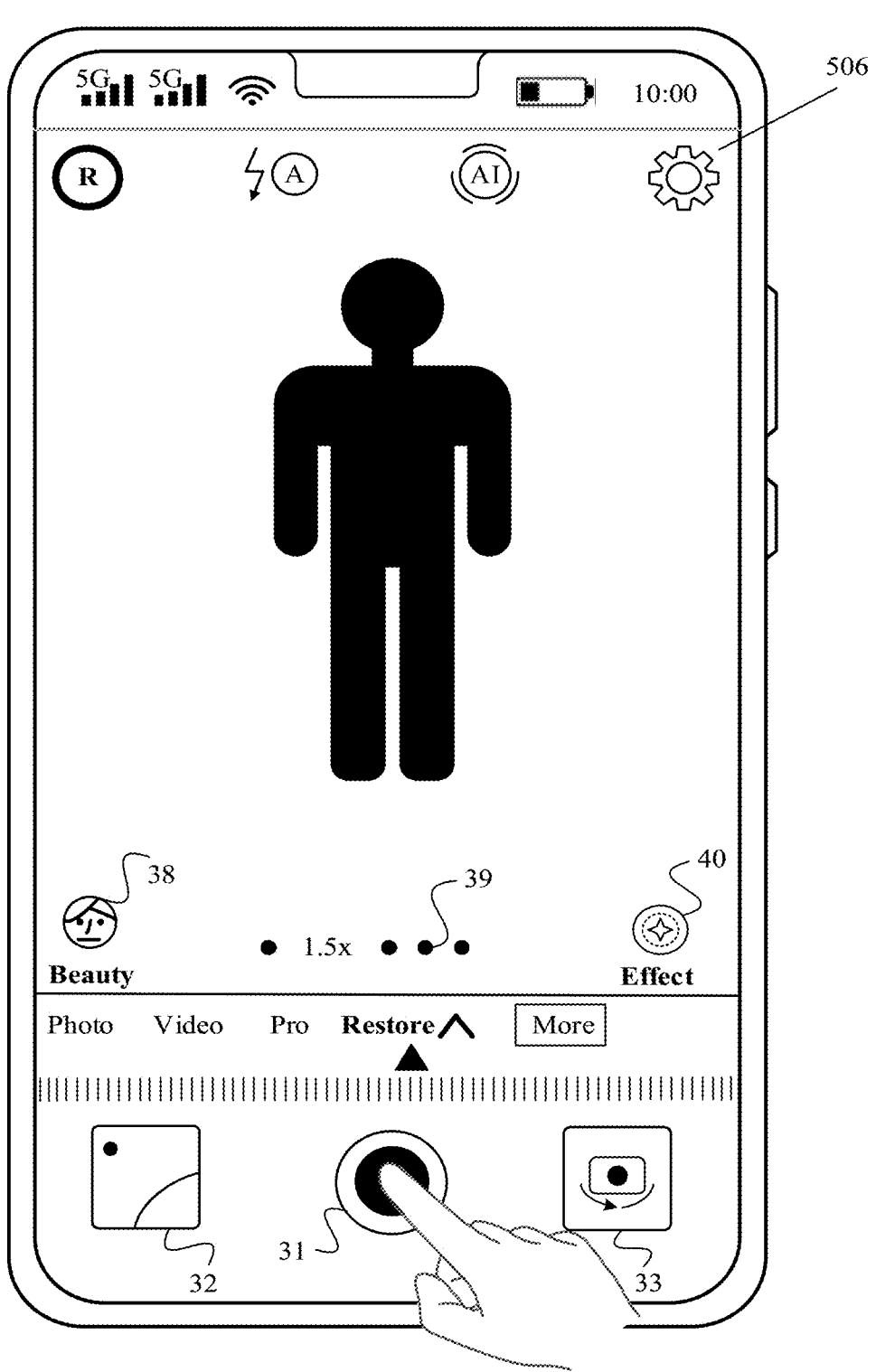

The shooting preview interface 501 shown in FIG. 5A and the shooting preview interface 506 shown in FIG. 5F are compared. On the shooting preview interface 501 shown in FIG. 5A, although the user has switched the current shooting mode to the restoration mode, because no restoration template file is selected, a related shooting parameter may be a default shooting parameter of the current camera by default, for example, having the zoom-in multiple "1.0×", and no enabling of the beauty level and other effect such as the filter color.

On the shooting preview interface 506 shown in FIG. 5F, because the user has selected the restoration template file by using the process shown in FIG. 5B-FIG. 5C-FIG. 5D, related shooting parameters may be automatically adjusted to the one or more parameters included in the restoration template file. For example, the zoom-in multiple "1.5×" is displayed on the shooting preview interface 506, and the beauty level (beauty level 6) and other effect such as the filter color are enabled.

In another possible implementation, after the user modifies the one or more parameters in the restoration template file, the user taps the "OK" control in the floating window. In response to an operation of the user, the mobile phone may automatically update modified parameters to the restoration template file based on the operation of the user, that is, overwrite the original restoration template file, and replace the original parameters of the restoration template file with the parameters obtained through modification by the user.

Alternatively, in response to the operation of the user, with reference to the modified parameters and the one or more parameters in the original restoration template file, the mobile phone may generate a new restoration template file based on the operation of the user, and automatically store the new restoration template file. For example, the new restoration template file is named by continuously adding a suffix after the name of the original restoration template file and is stored.

Alternatively, in response to the operation of the user, the mobile phone may display a window, and the user selects whether to automatically update or overwrite the original restoration template file. The mobile phone responds based on user selection. This is not limited in embodiments of this disclosure.

For example, in FIG. 5D, the user modifies the brightness to the level 7. When the user taps the "OK" control on the interface 505, the mobile phone may automatically display a window for the user to choose whether to save the parameter to the restoration template file. If the user chooses to store the parameter to the restoration template file, correspondingly, the brightness after shooting in the restoration template file corresponding to the photo named "IMG-2021-12-R1" changes from the original level 3 to the level 7 and is stored.

It may be understood that, in this case, the mobile phone automatically adjusts, based on the restoration template file selected by the user, the current shooting parameters to the one or more parameters included in the restoration template file. The user shoots a photo based on the one or more parameters obtained through automatic adjustment, that is, may obtain the photo that is the same as or similar to the lost or mistakenly deleted photo 1.

In the foregoing implementations, the user is supported in performing an operation, for example, viewing, modifying, editing, or deleting on the one or more parameters in the restoration template file, and the related parameter in the restoration template file may be updated based on the operation, for example, modifying, editing, or deleting performed by the user. This meets shooting requirements of the user in different scenarios.

In a possible manner, the user may accurately find an approximate framing range based on the basic information of the photo included in the restoration template file, and enable a same viewfinder to be displayed in a preview image in the shooting preview interface of the camera application, to restore the same or similar photo.

For example, the thumbnail, the geographical location, and other basic information of the lost or mistakenly deleted photo 1 are displayed in the floating window on the interface 503 or the interface 505. The user may locate a same viewfinder based on the information such as the thumbnail and the geographical location of the lost or mistakenly deleted photo 1, and perform an operation shown in FIG. 5F of tapping a shooting shutter control 31. In response to the user operation, the mobile phone completes shooting, and stores a shot photo in the local album.

According to the foregoing process, when the photo shot by the user is lost or is mistakenly deleted, the photo may be re-shoot based on the restoration template file corresponding to the lost or mistakenly deleted photo according to the shooting restoration method provided in embodiments of this disclosure, and the re-shot photo may have the same shooting parameter, editing parameter, and the like as the lost or mistakenly deleted photo, and/or may have the substantially same framing range. In this way, the photo that is the same as or similar to the lost or mistakenly deleted photo is restored for the user. In this process, the shooting process and/or the framing range of the photo can be restored without a need for the user to manually reset the related shooting parameter, editing parameter, or the like. This can quickly implement photo restoration, simplify a shooting operation, and improve user experience.

In another possible implementation, if the photo taken by the user is lost or is mistakenly deleted, when the user switches the current shooting mode to the restoration mode, the mobile phone may automatically remind the user of the loss of the original photo, and automatically trigger a shooting restoration process of the mobile phone.

It should be understood that, based on the content in Table 4, each photo taken by the user corresponds to a unique restoration template file. If a photo is lost or mistakenly deleted, the mobile phone may detect that a source file of the photo is lost, or a photo file corresponding to a restoration template file is lost. Therefore, the mobile phone may automatically remind the user of the loss of the photo, and the user selects whether to restore the photo.

FIG. 6A to FIG. 6D are a schematic diagram of other examples of graphical user interfaces in a shooting restoration process according to an embodiment of this disclosure.

Figure 6A:
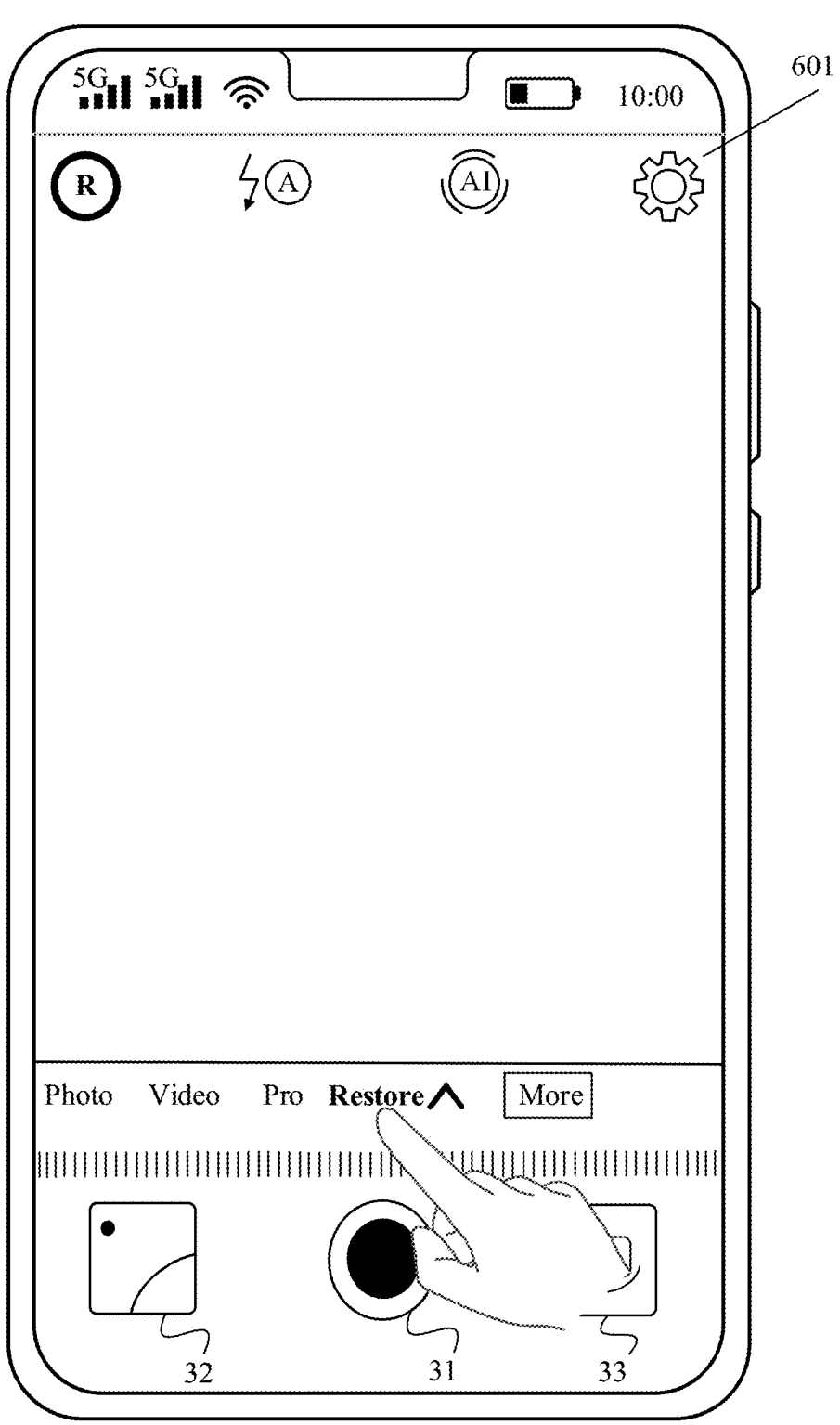
FIG. 6A to FIG. 6D are a schematic diagram of other examples of graphical user interfaces in a shooting restoration process according to an embodiment of this disclosure.

For example, as shown in FIG. 6A, on a shooting preview interface 601, when the user switches a current shooting mode to a restoration mode. In response to an operation of the user, the mobile phone detects that one or more photos shot by the user are lost, and may automatically display an interface 602 shown in FIG. 6B. The interface 602 includes a prompt window, the prompt window includes prompt information, and the prompt information is used to prompt the user: Source files of the following photos are lost or damaged. Do you want to restore the photos? In addition, names of one or more lost or damaged photos are further displayed in the prompt window, for example, the photo named "IMG-2021-12-R1", the photo named "IMG-2021-11-R3", and the photo named "IMG-2021-10-R5".

Figure 6B:
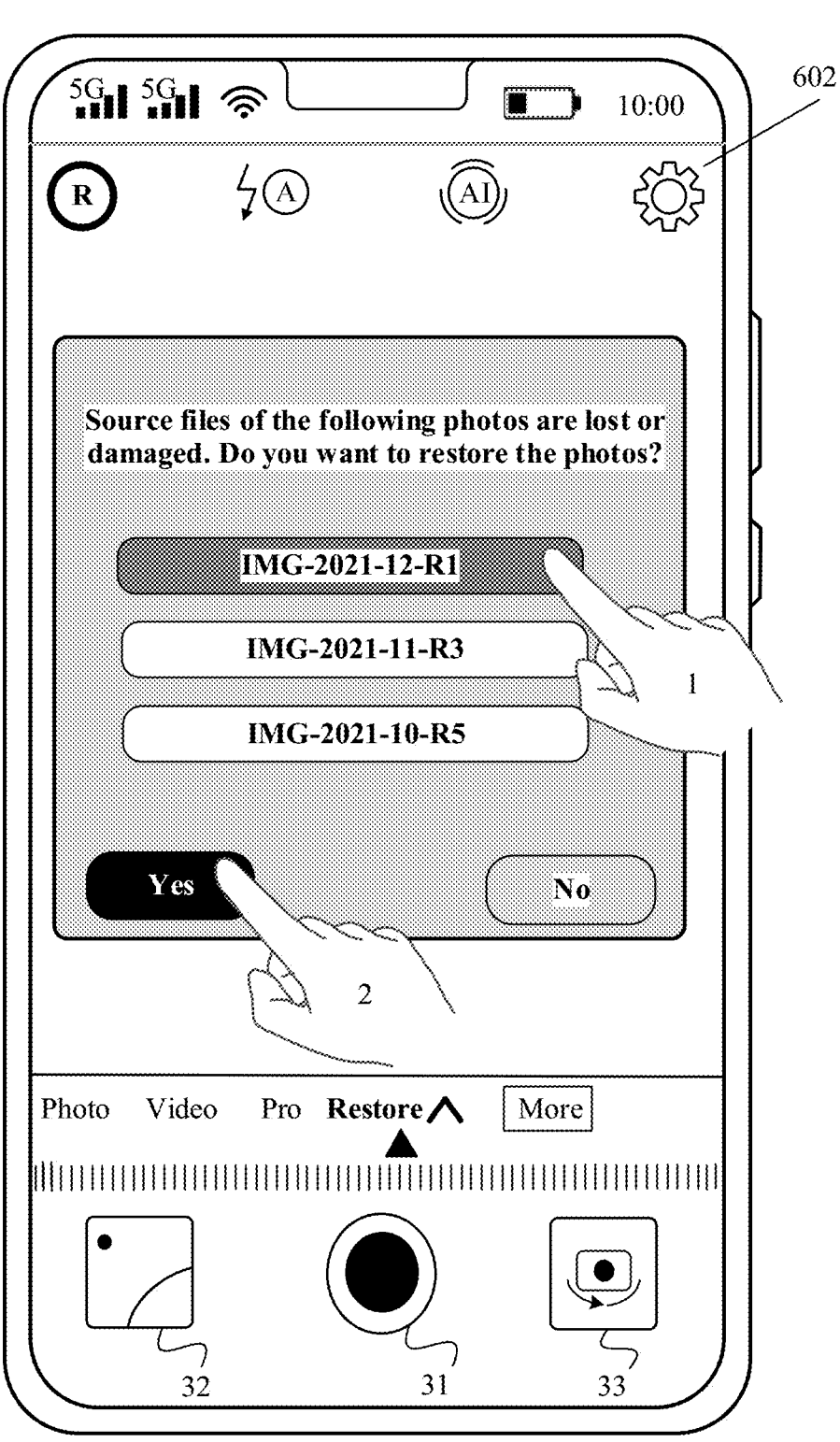

The user may perform an operation 1 shown in FIG. 6B of tapping a control in which the name of the photo "IMG-2021-12-R1" is located, and then perform an operation 2 of tapping a "Yes" control. In response to the operations of the user, the mobile phone displays an interface 603 shown in FIG. 6C. One or more types of parameter information in a restoration template file corresponding to the photo named "IMG-2021-12-R1" may be presented on the interface 603 to the user in a form of a prompt window. For specific descriptions, refer to related descriptions of the foregoing interface 503. For brevity, details are not described herein again.

Figure 6C:
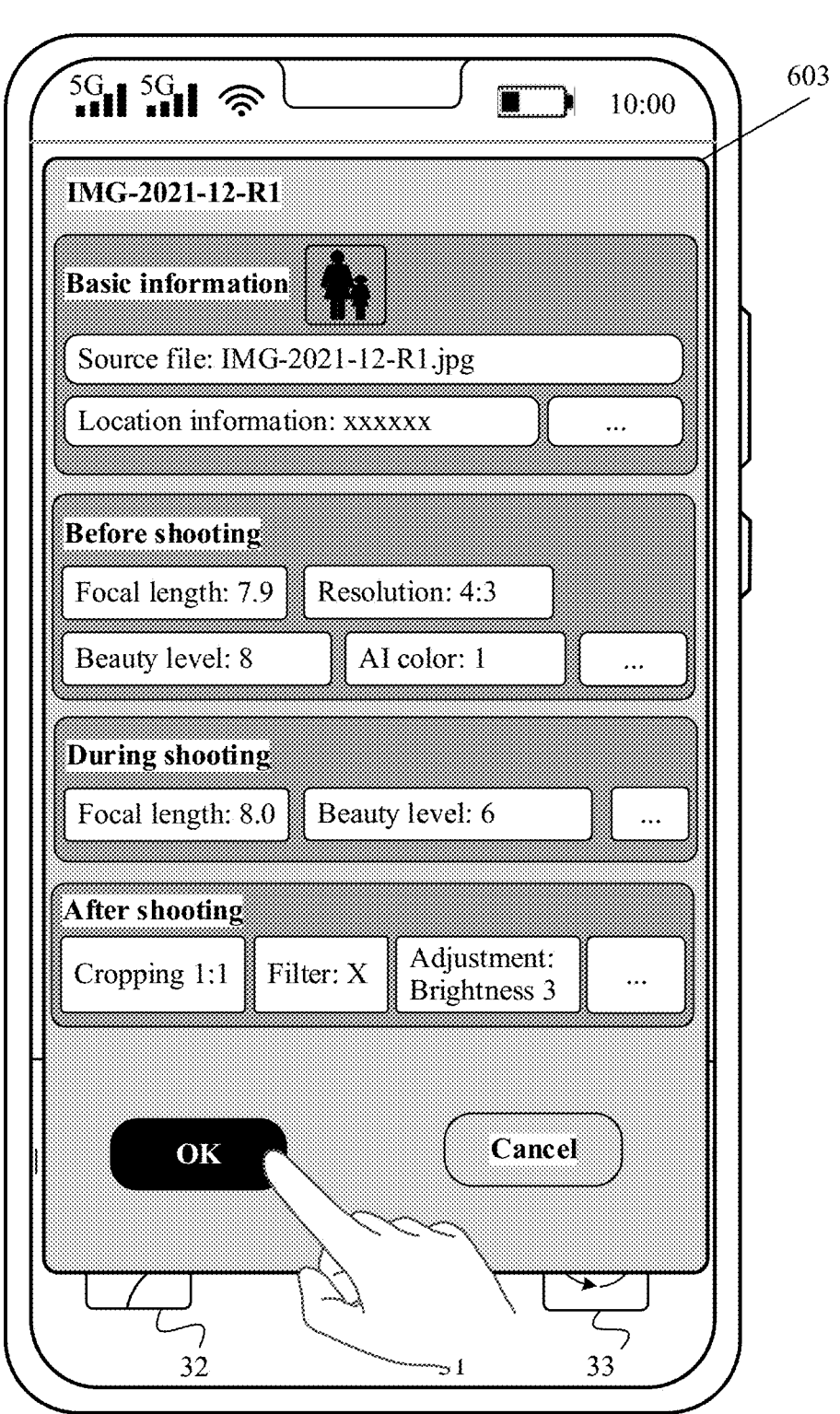

When determining that the one or more parameters included in the restoration template file of the photo "IMG-2021-12-R1" do not need to be modified, the user may perform an operation shown in FIG. 6C of tapping an "OK" control in the prompt window. In response to the operation of the user, the mobile phone displays a shooting preview interface 604 shown in FIG. 6D. The user may accurately find an approximate framing range of the photo "IMG-2021-12-R1", and tap the shooting shutter control 31, to shoot a same or similar photo. For this process, refer to the foregoing related descriptions. For brevity, details are not described herein again.

Figure 6D:
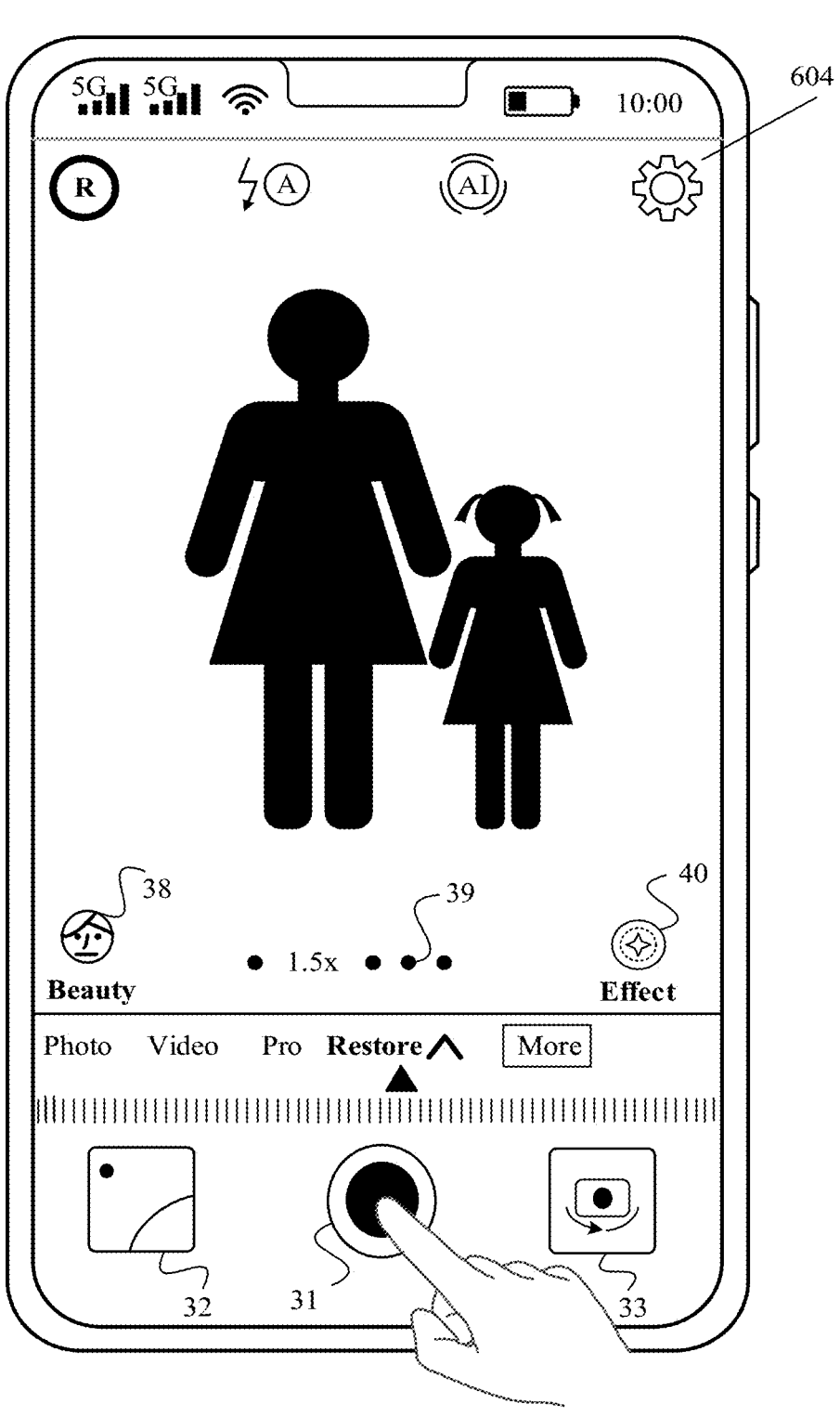

It should be understood that, after the user performs an operation shown in FIG. 6D, and completes shooting of the photo, the re-shot photo may have a same shooting parameter, editing parameter, and the like and/or may have an approximate same framing range as the lost photo. Optionally, the mobile phone may automatically store the re-shot photo, name the re-shot photo as "IMG-2021-12-R1", establish a correspondence between the photo "IMG-2021-12-R1" and the restoration template file, and complete a one-to-one correspondence between the plurality of photos listed in Table 4 and the restoration template files of the photos. This avoids a photo loss.

Compared the photo restoration process in FIG. 5A to FIG. 5F with that in FIG. 6A to FIG. 6D, the process described in FIG. 5A to FIG. 5F may be understood as a process that is actively initiated by the user to restore a photo when the photo is lost or mistakenly deleted, and the process described in FIG. 6A to FIG. 6D may be understood as follows: when the camera application is switched to the restoration mode, automatically detecting whether a photo in photos corresponding to a plurality of restoration template files stored in the mobile phone is lost. When it is detected that a photo corresponding to a restoration template file is lost, the lost photo may be automatically prompted to the user to choose whether to restore the lost photo, and a shooting restoration process of the mobile phone is automatically triggered, to ensure integrity of a restoration template.

Scenarios of this disclosure are enriched by using FIG. 5A to FIG. 5F, and FIG. 6A to FIG. 6D. In different scenarios, a manner of actively restoring a lost photo may be provided for the user, or the user may be prompted to select a lost photo to be restored. This can ensure integrity of a restoration template, and a photo restoration process is convenient, so that a previous shooting process can be quickly restored. This improves user experience.

In another possible implementation, in the prompt window shown in FIG. 6B, if a plurality of lost or damaged photos are displayed, the user may tap one of the lost or damaged photos, for example, "IMG-2021-12-R1", to perform restoration in the foregoing manner. After the user performs the operations shown in FIG. 6B to complete restoration of the photo "IMG-2021-12-R1", the mobile phone may further return to display the interface 602 shown in FIG. 6B, and display another lost or damaged photo in the prompt window. The user may continue to restore the another lost or damaged photo. Details are not described herein again.

Alternatively, in the prompt window shown in FIG. 6B, if a plurality of lost or damaged photos are displayed, the user may directly tap the "Yes" control in the prompt window, and the mobile phone selects all the photos by default for restoration. This improves photo restoration efficiency. This is not limited in embodiments of this disclosure.

In another possible scenario, when it is detected that a photo corresponding to a restoration template file is lost, the mobile phone may automatically prompt the user of the lost photo, so that the user can choose whether to restore the lost photo, or the user may choose to refuse to restore the lost photo.

FIG. 7A to FIG. 7E are a schematic diagram of still other examples of graphical user interfaces in a shooting restoration process according to an embodiment of this disclosure.

Figure 7A:
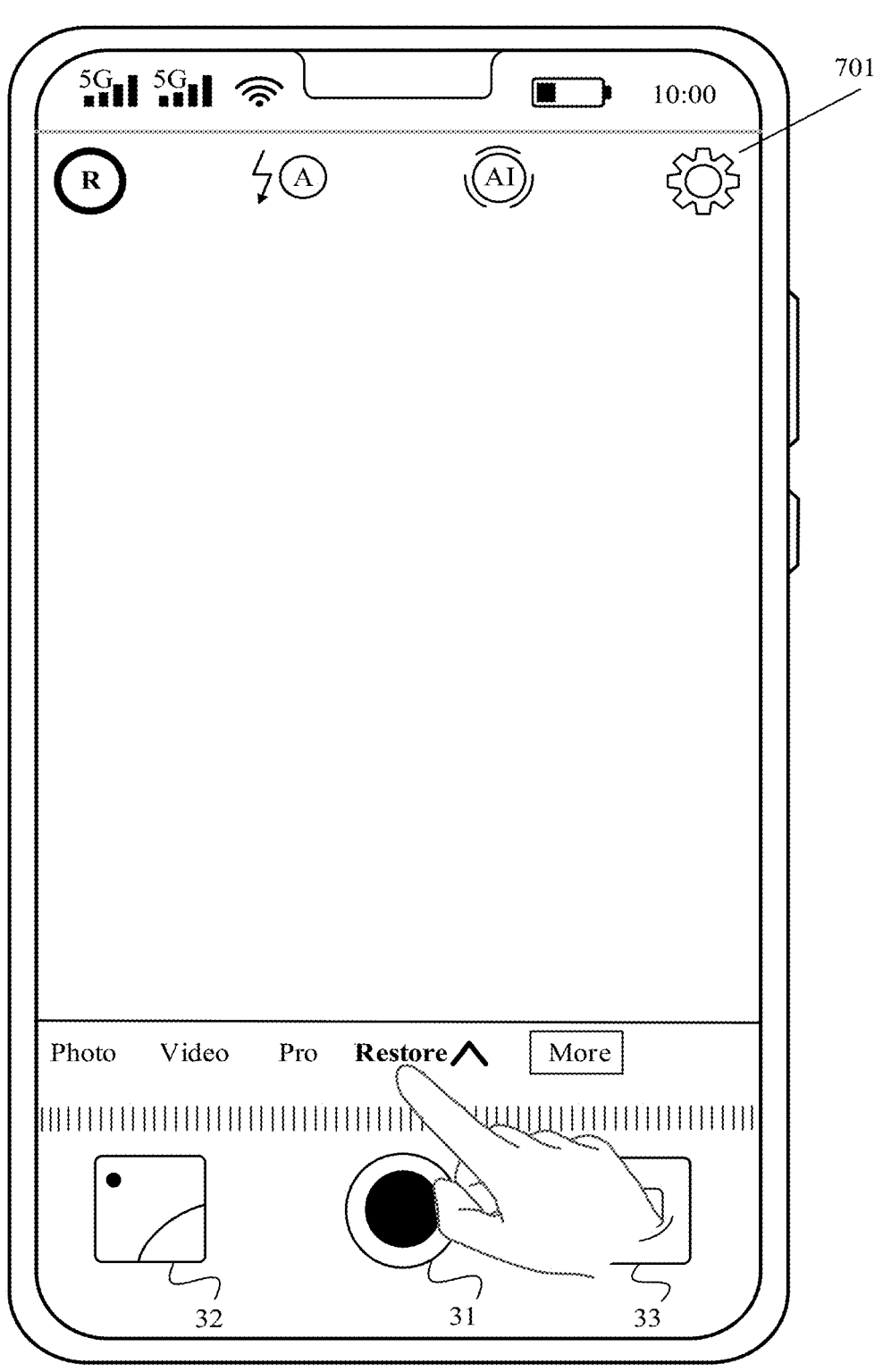
FIG. 7A to FIG. 7E are a schematic diagram of still other examples of graphical user interfaces in a shooting restoration process according to an embodiment of this disclosure.
Figure 7B:
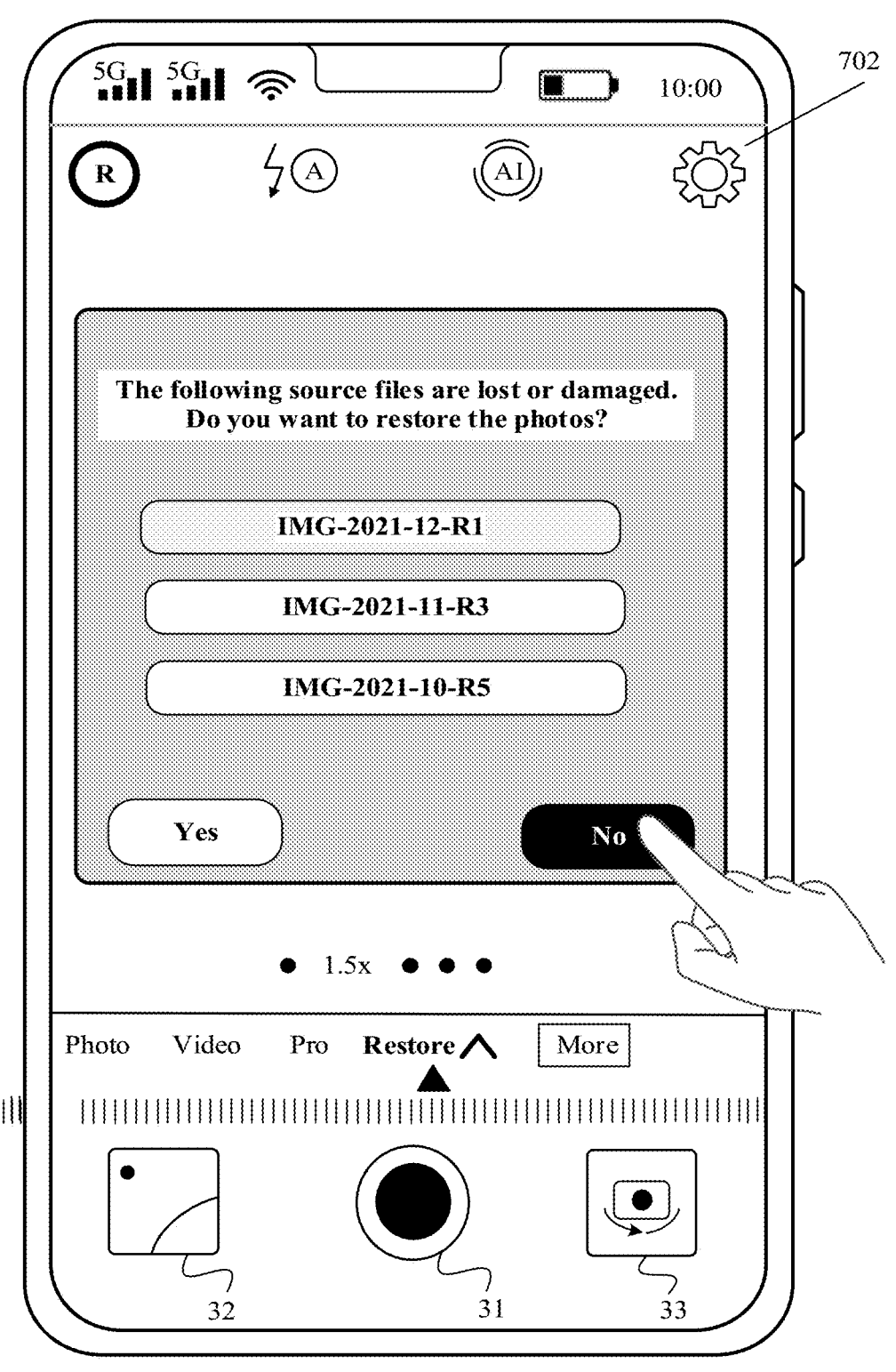

For example, on a shooting preview interface 701 shown in FIG. 7A, when the user switches a current shooting mode to a restoration mode, the mobile phone automatically displays an interface 702 and a prompt window shown in FIG. 7B. When the user taps a "No" control in the prompt window, in response to an operation of the user, the mobile phone displays an interface 703 shown in FIG. 7C, and a floating window may be displayed in the interface 703. In addition, the floating window is used by the user to reselect, from one or more restoration template files, a restoration template that the user expects to use.

It should be understood that, when the user refuses to restore one or more lost photos of the mobile phone, the one or more lost photos may be photos that are actively deleted by the user and do not need to be restored.

Optionally, if the user chooses, within a preset time period (for example, a time period of one month), to refuse to restore one or more lost photos, the mobile phone may automatically delete a restoration template file corresponding to each of the one or more lost photos. This is not limited in embodiments of this disclosure.

Figure 7C:
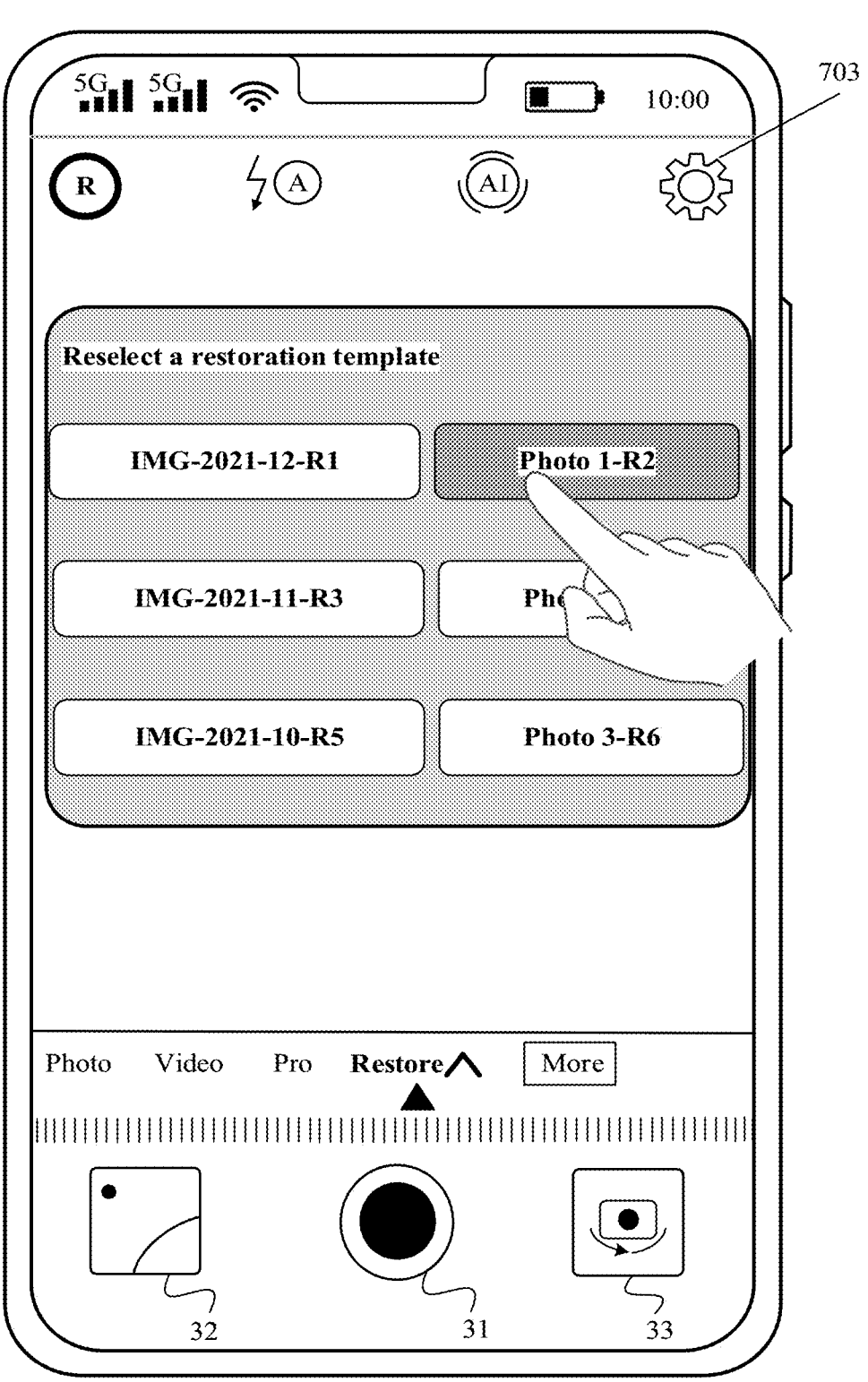

For example, the user performs an operation shown in FIG. 7C, and reselects, in the floating window of the interface 703, a restoration template file corresponding to a photo named "Photo 1-R2". In response to the operation of the user, the mobile phone displays an interface 704 shown in FIG. 7D, and one or more types of parameter information in the restoration template file corresponding to the photo named "Photo 1-R2" may be presented to the user on the interface 704. For specific descriptions, refer to related descriptions in the foregoing embodiment. Details are not described herein again.

Figure 7D:
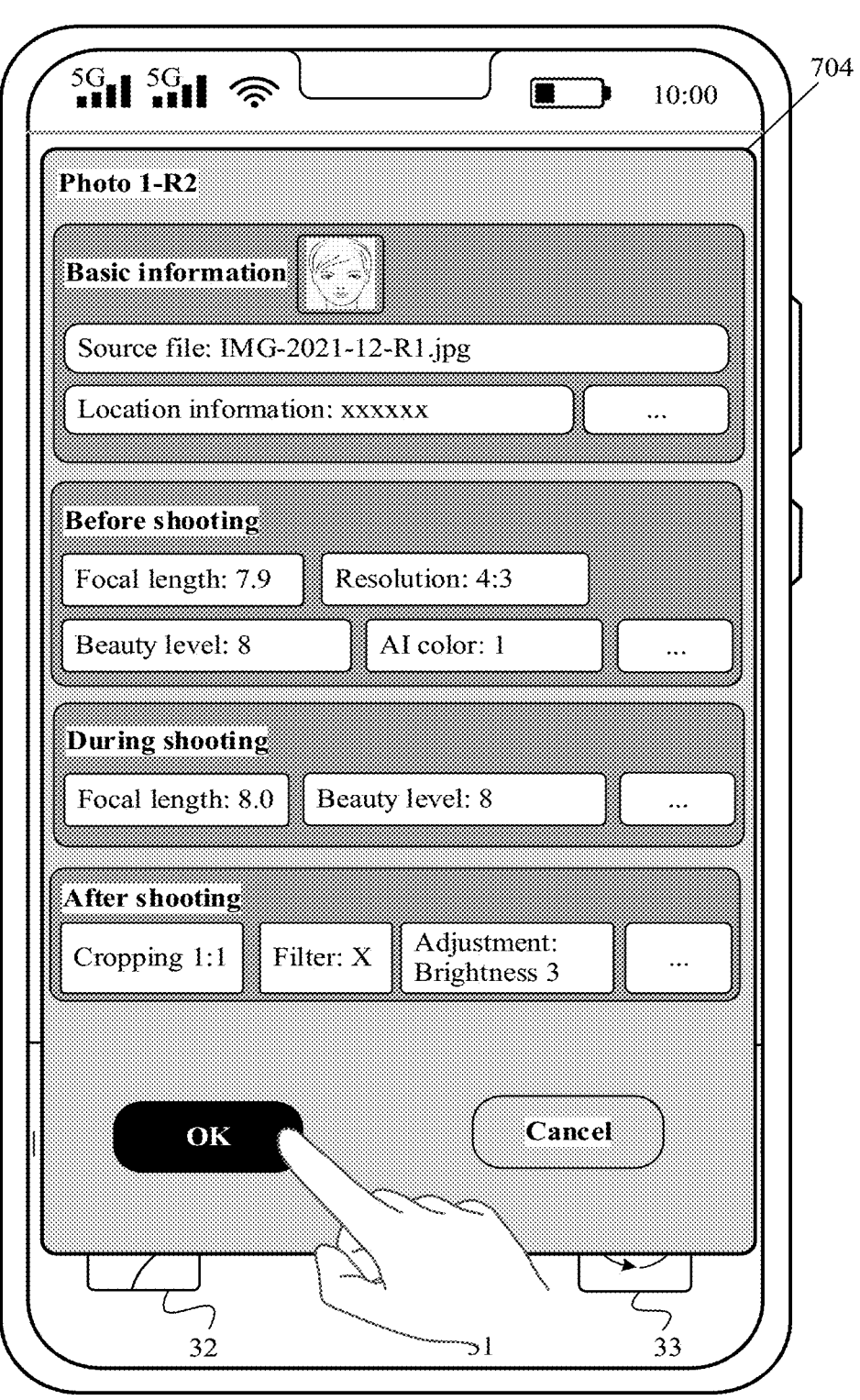
Figure 7E:
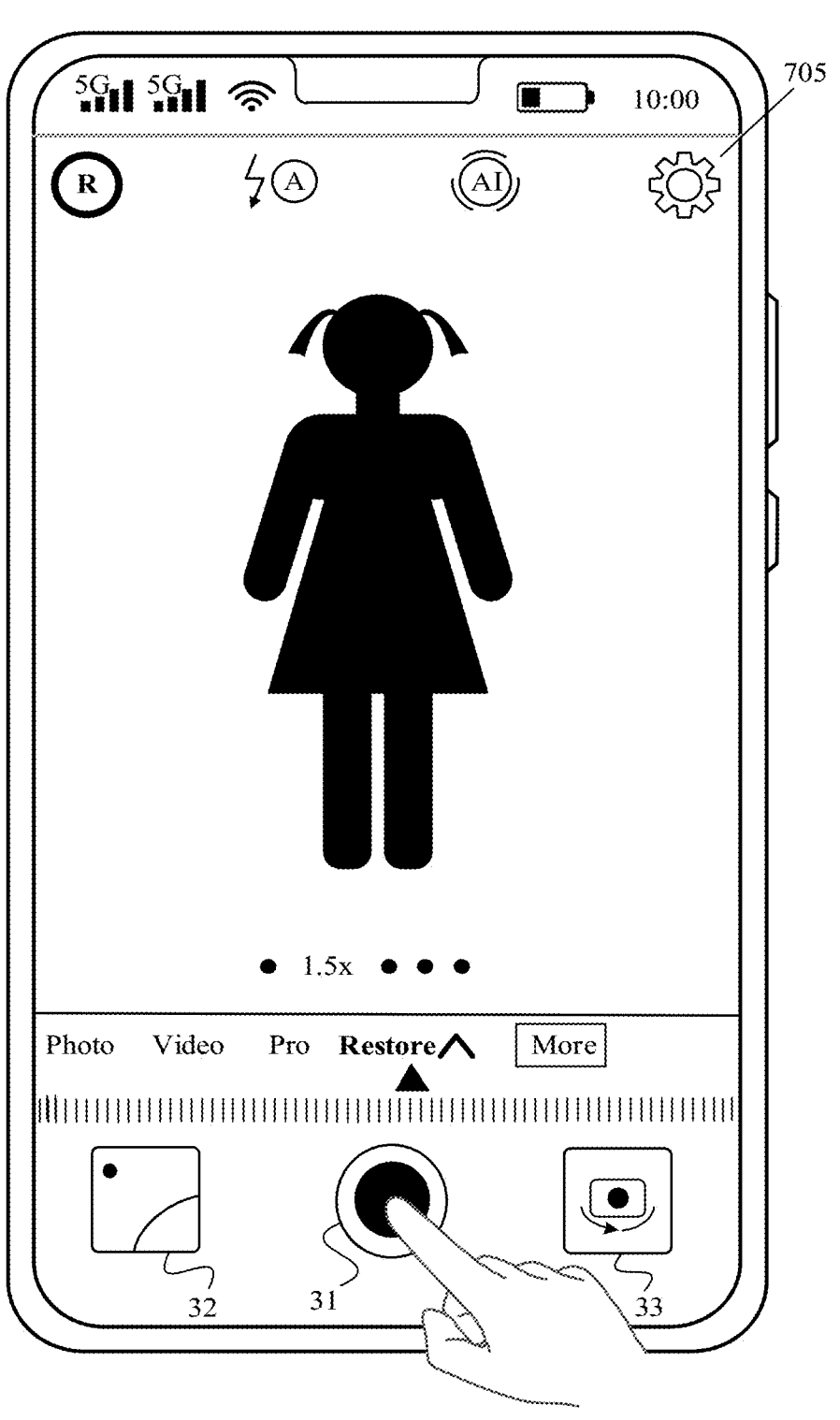

When determining that the one or more parameters included in the restoration template file of the photo "Photo 1-R2" do not need to be modified, the user may perform an operation shown in FIG. 7D of tapping an "OK" control in the prompt window. In response to the operation of the user, the mobile phone displays a shooting preview interface 705 shown in FIG. 7E. The user may accurately find an approximate framing range of the photo "Photo 1-R2", and tap the shooting shutter control 31, to shoot a same or similar photo. For this process, refer to the foregoing related descriptions. For brevity, details are not described herein again.

In the foregoing process, when detecting that a photo corresponding to a restoration template file is lost, the mobile phone may automatically prompt the user with the lost photo for the user to choose whether to restore the lost photo. Assuming that the user chooses to refuse to restore the lost photo, a restoration template file corresponding to another available photo may be provided for the user, and the user may select an appropriate restoration template file based on a shooting requirement of the user, to quickly perform shooting restoration.

After shooting of the photo is completed based on the restoration template file selected by the user, a re-shot photo may have a same shooting parameter, editing parameter, and the like and/or may have an approximate same framing range as the photo corresponding to the restoration template file selected by the user.

FIG. 8A to FIG. 8F are a schematic diagram of yet other examples of graphical user interfaces in a shooting restoration process according to an embodiment of this disclosure.

Figure 8A:
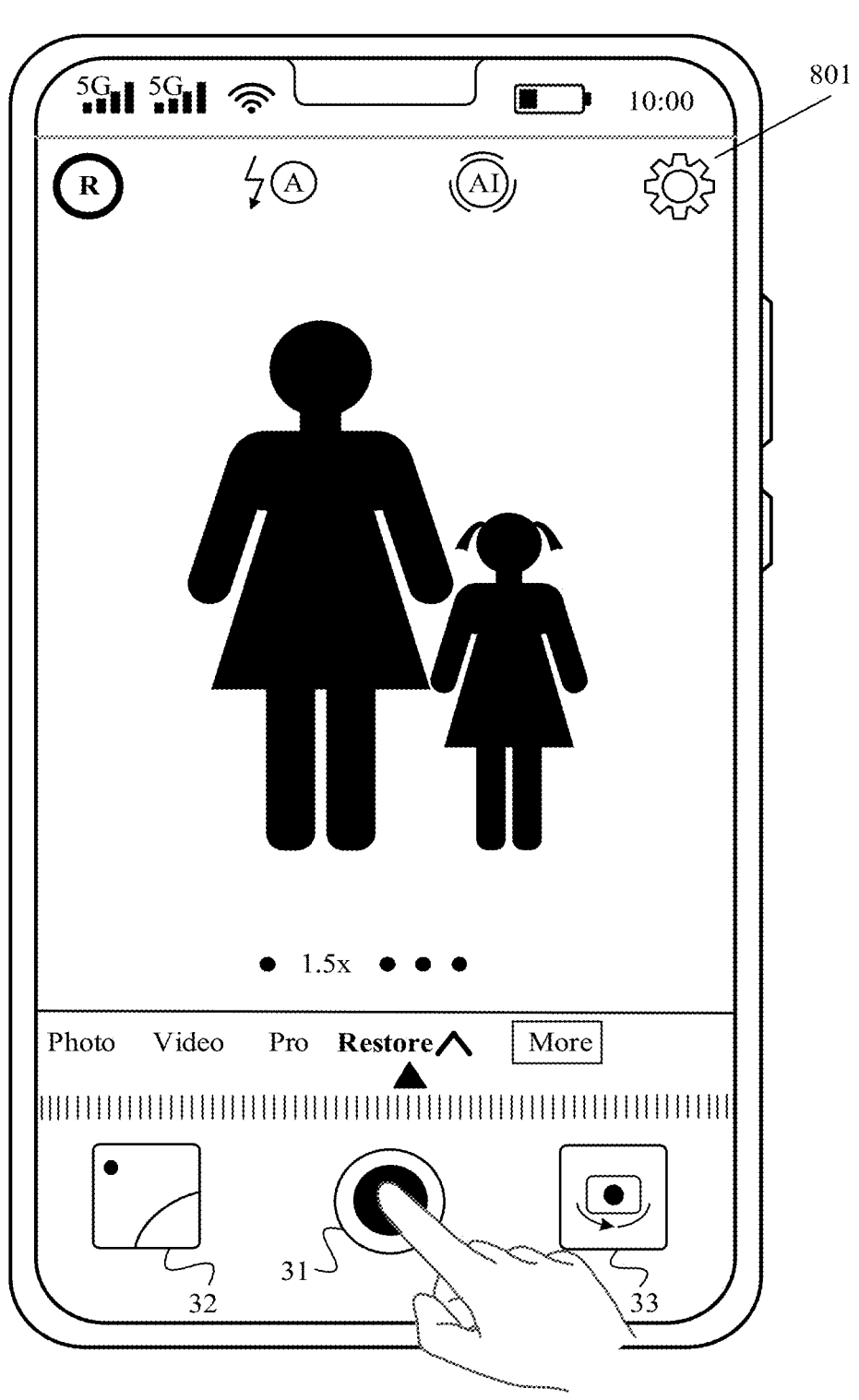
FIG. 8A to FIG. 8F are a schematic diagram of yet other examples of graphical user interfaces in a shooting restoration process according to an embodiment of this disclosure.
Figure 8B:
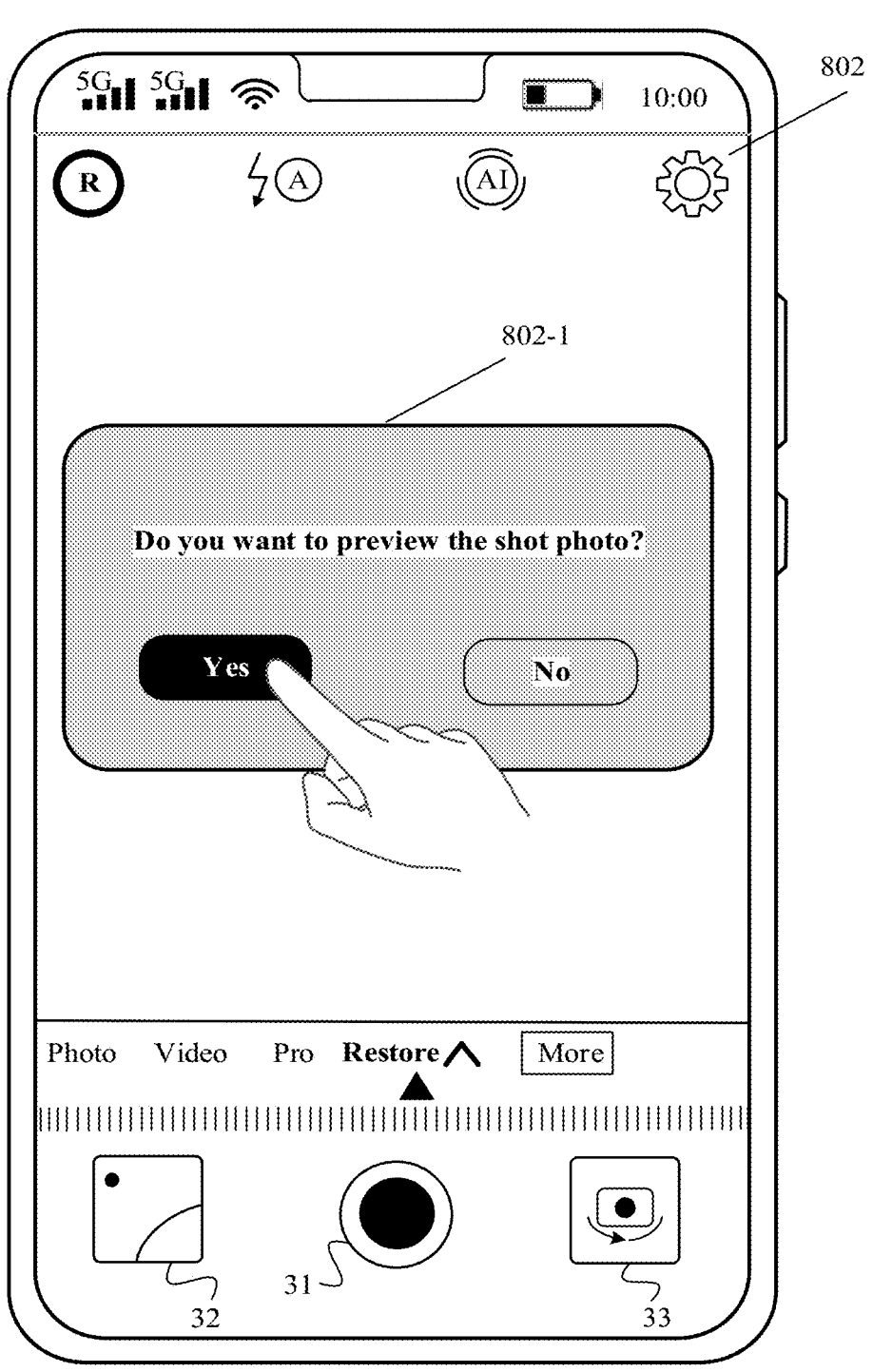

For example, the user performs an operation shown in FIG. 8A of tapping a shooting shutter control 31 on a shooting preview interface 801. In response to the tapping operation of the user, the mobile phone automatically pops up a prompt window 802-1, and displays an interface 802 shown in FIG. 8B. Prompt information "Do you want to preview the shot photo?" is displayed in the prompt window 802-1 of the interface 802. The user taps a "Yes" control, and in response to a tapping operation of the user, the mobile phone displays an interface 803 shown in FIG. 8C. A photo that is just shot and the prompt information "Do you want to save the shot photo?" may be displayed on the interface 803.

Figure 8C:
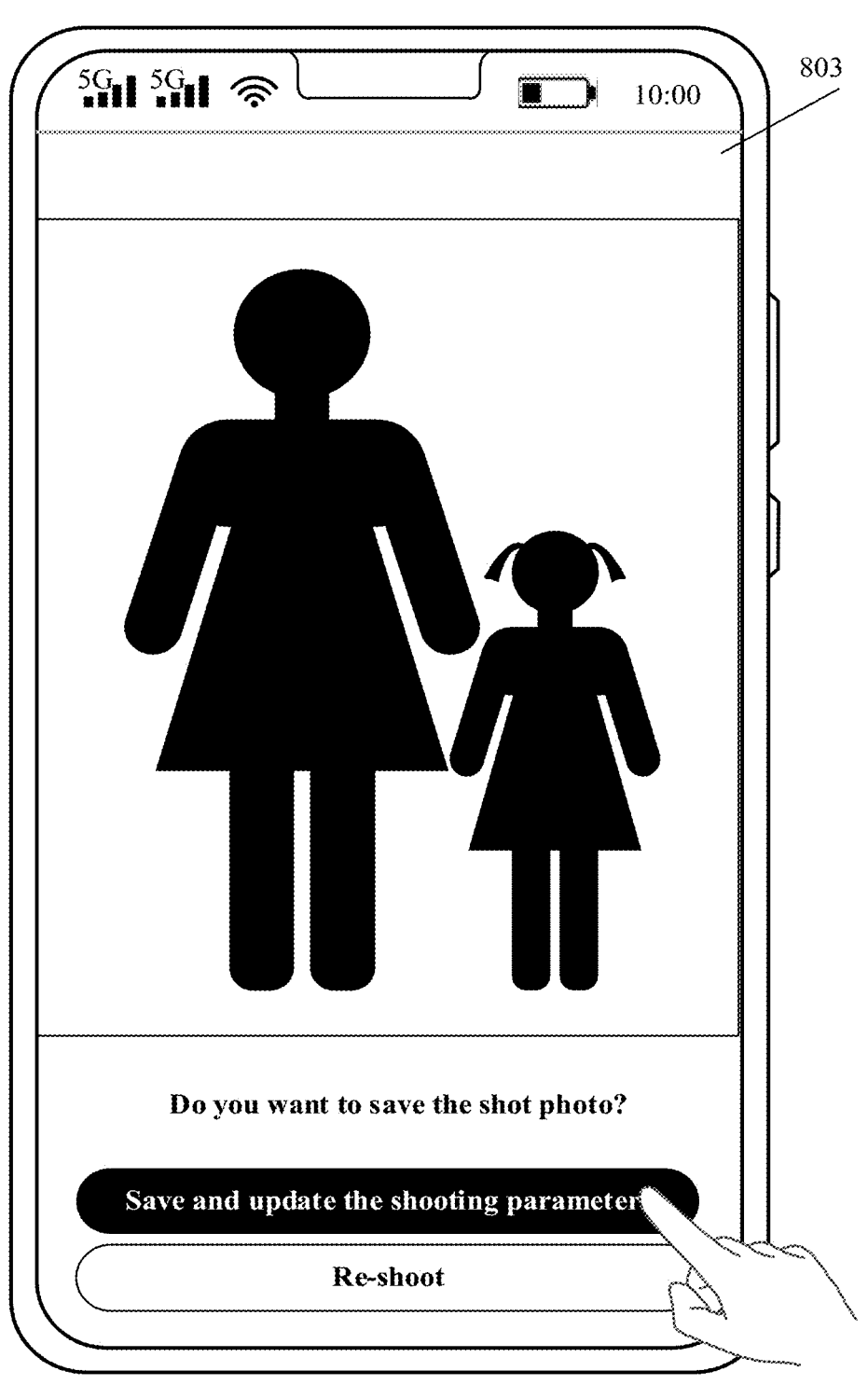

In a possible scenario, when the user views the photo, and the restored photo shot based on a shooting restoration file meets a photo restoration requirement of the user, the user may perform an operation shown in FIG. 8C of tapping a control of "Save and update the shooting parameter", and in response to the operation of the user, the mobile phone may store the photo in the local album, and update a related shooting parameter, editing parameter, and the like that are modified in a shooting restoration process of the photo, to one or more types of parameter information included in the restored shooting file.

In still another possible scenario, when the user taps a "No" control in the prompt window 802-1 of the interface 802, in response to a tapping operation of the user, the mobile phone may continue to return to the shooting preview interface 801 shown in FIG. 8A, and automatically store the shot photo. This is not limited in embodiments of this disclosure.

Figure 8D:
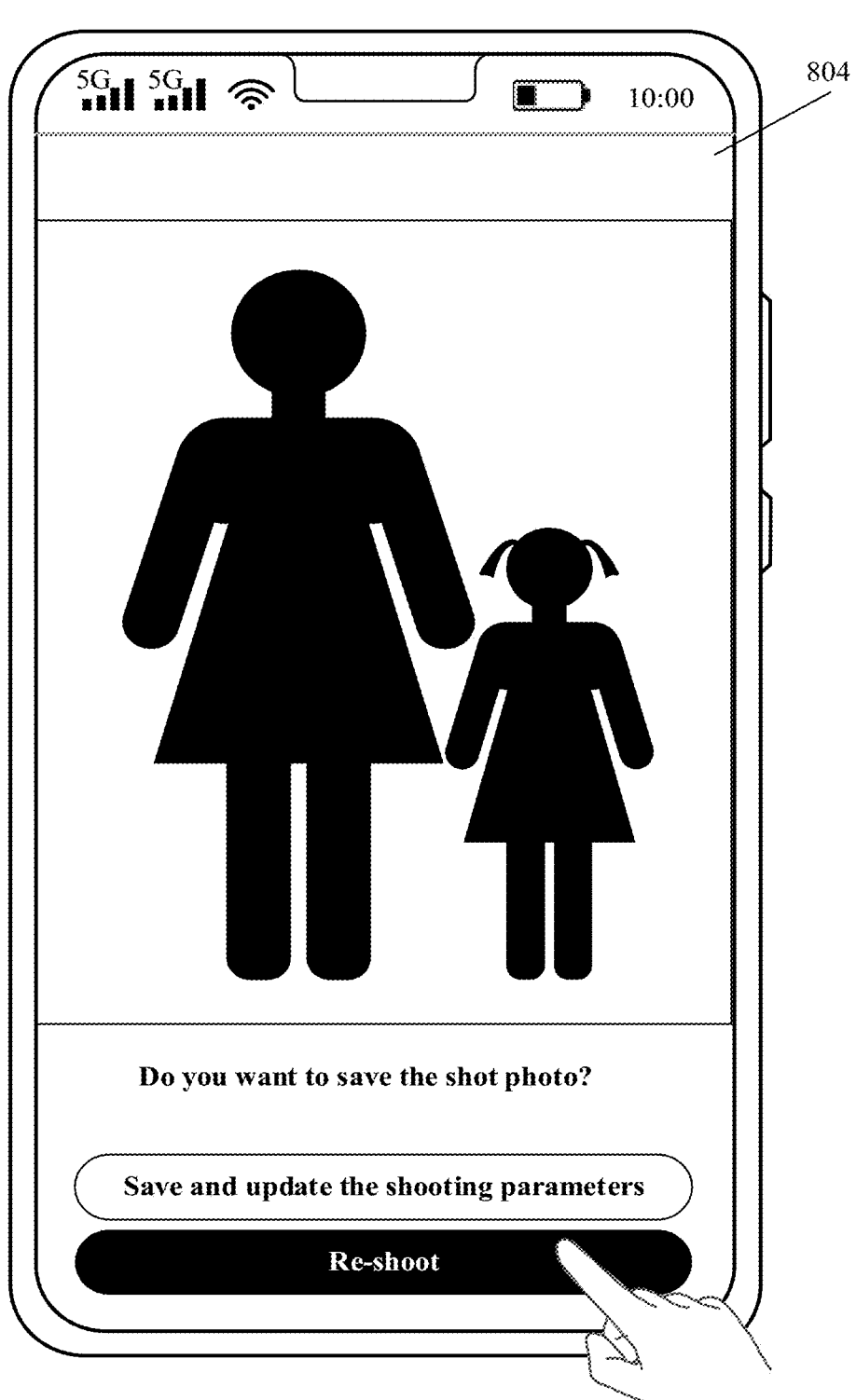
Figure 8E:
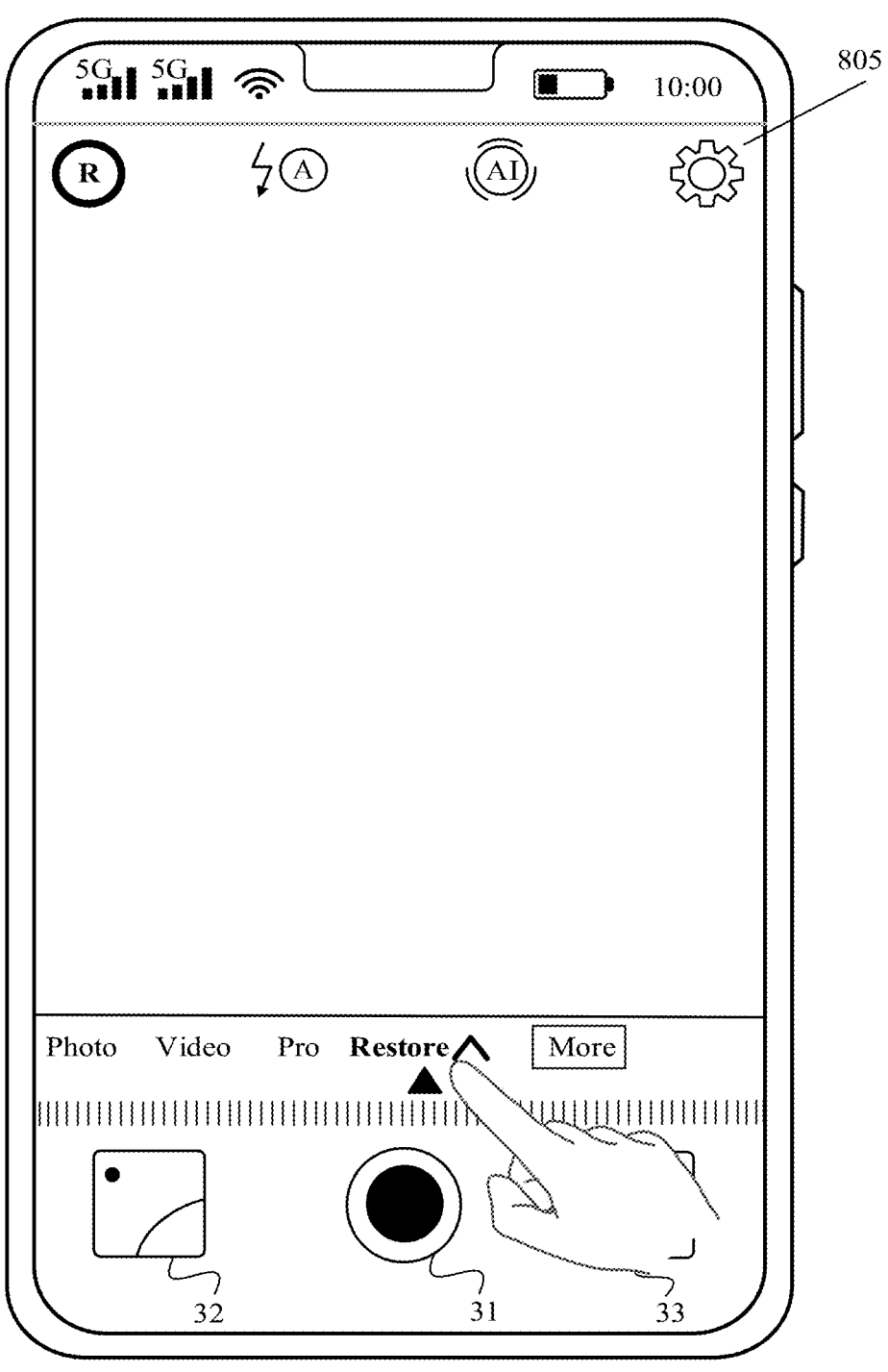
Figure 8F:
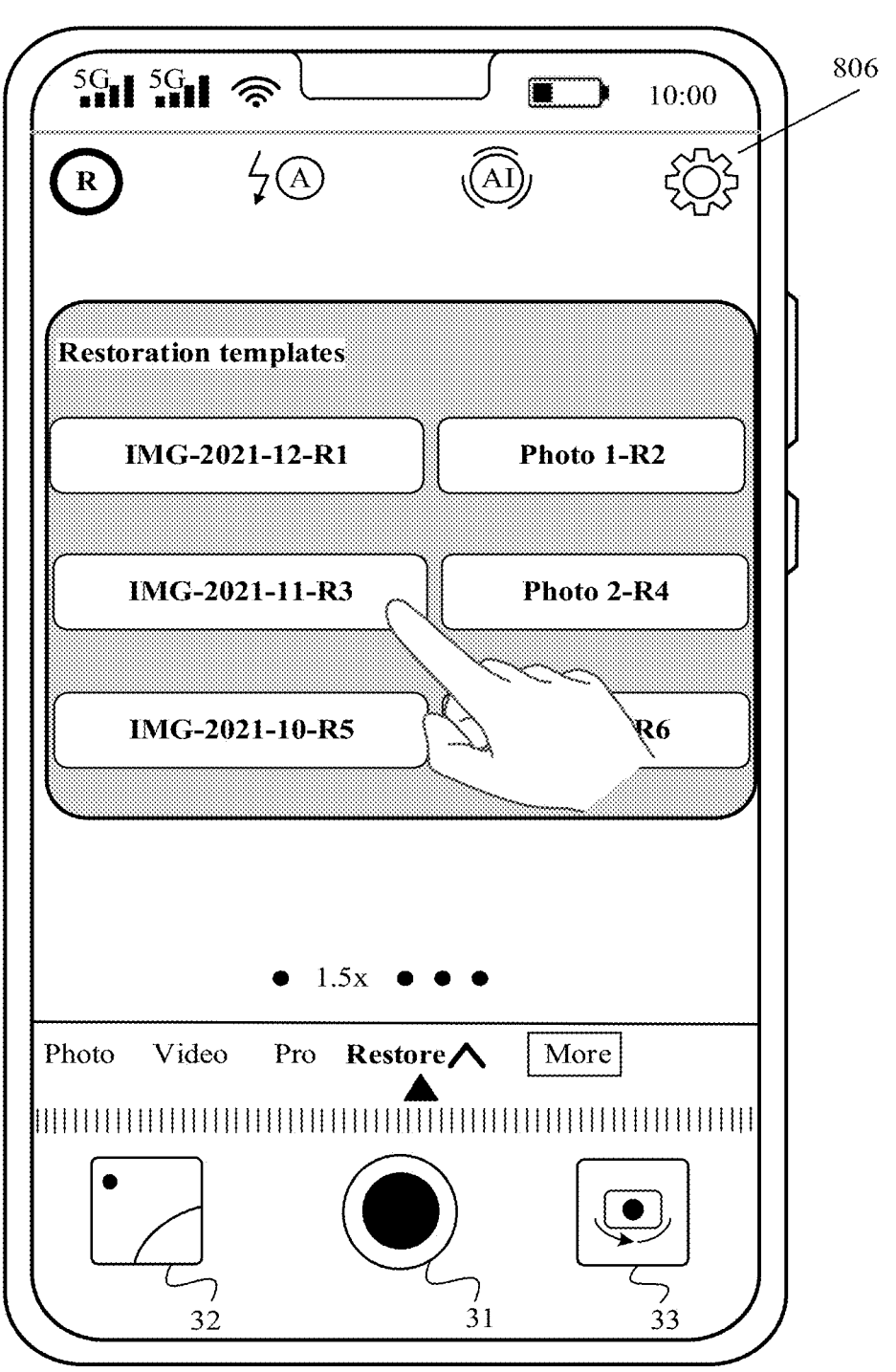

In another possible scenario, when the user views the photo, and the restored photo shot based on a shooting restoration file cannot meet a photo restoration requirement of the user, the user may perform an operation shown in FIG. 8D of tapping a "Re-shoot" control, and in response to the operation of the user, the mobile phone may return to display a shooting preview interface 805 shown in FIG. 8E. On the shooting preview interface 805, the user may tap a "Restore" mode control. In response to an operation of the user, the mobile phone displays a restoration template selection interface 806 shown in FIG. 8F. The user may reselect an expected target restoration template from one or more restoration templates based on a shooting requirement of the user, to perform shooting restoration again. For specific content, refer to the related descriptions in the foregoing embodiments. For brevity, details are not described herein again.

In the foregoing manner, when the user uses the restoration template file to restore the previous photo, a shooting process may be restored to shoot another different object, or a framing range of the previous photo may be accurately determined to restore the previous photo. In addition, in this process, after completing shooting, the user may preview and view the shot photo, and determine whether the restored photo meets a requirement. When the restored photo meets the requirement, the photo is saved, and the corresponding parameter is updated to the restoration template file. When the restored photo does not meet the requirement, re-shooting may be performed, or a restoration template file is re-selected to perform shooting restoration. This process can satisfy different scenarios, and can quickly implement photo restoration. This simplifies a shooting operation, and improves user experience.

In addition, in a process in which the user performs shooting restoration, for one or more restoration template files locally stored in the mobile phone, some restoration template files may be rarely used, or may be evicted by the user. In this case, for this type of restoration template file that is rarely used, embodiments of this disclosure may further support the user in deleting, modifying, editing, customizing, or the like one or more restoration template files.

FIG. 9A to FIG. 9D are a schematic diagram of still other examples of graphical user interfaces in a shooting restoration process according to an embodiment of this disclosure.

Figure 9A:
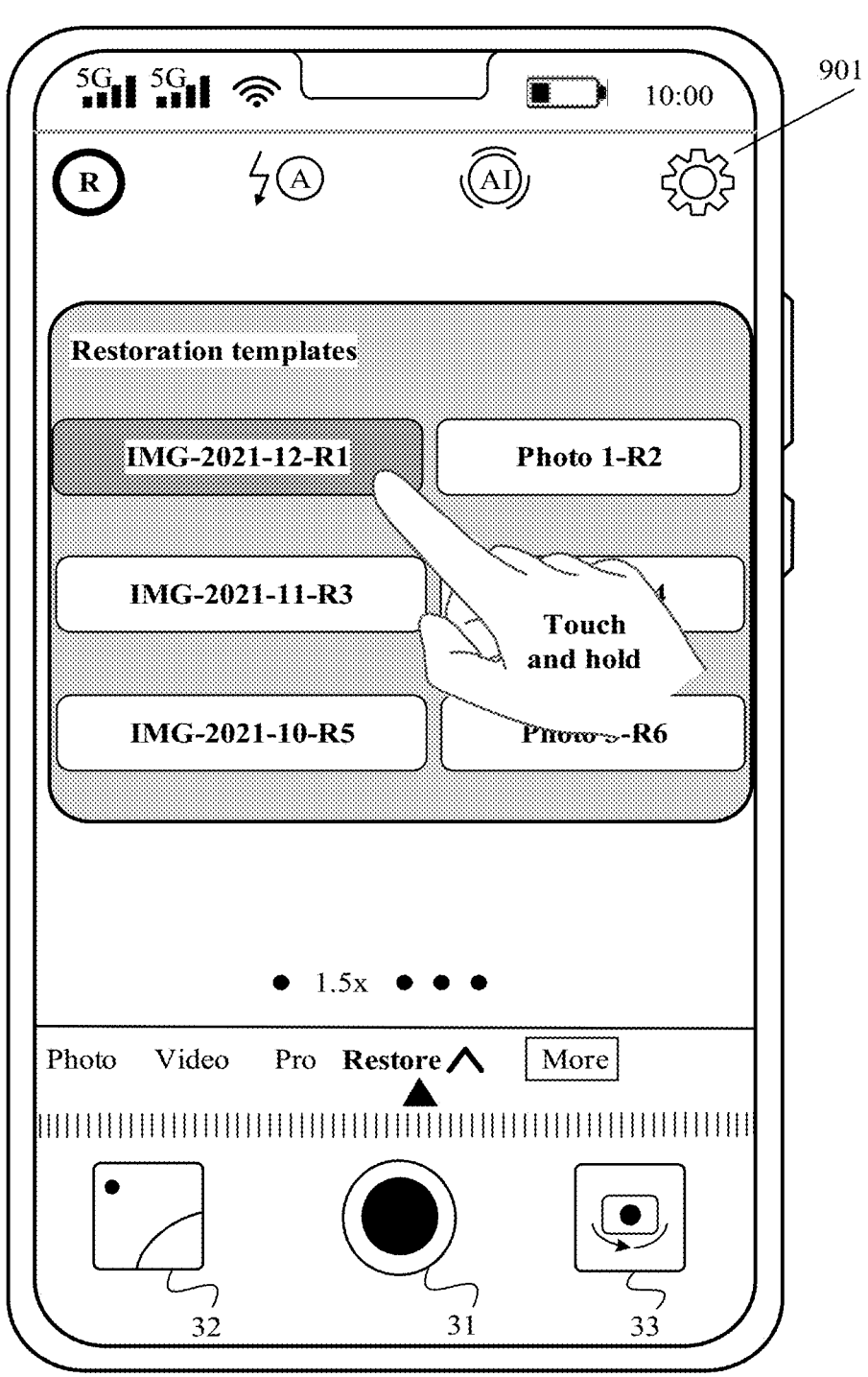
FIG. 9A to FIG. 9D are a schematic diagram of still other examples of graphical user interfaces in a shooting restoration process according to an embodiment of this disclosure.

For example, on a restoration template selection interface 901 shown in FIG. 9A, a plurality of restoration templates are displayed in a floating window on the interface 901 in a form of a list. The user may perform an operation shown in FIG. 9A of touching and holding a control corresponding to the photo named "IMG-2021-12-R1". In response to the operation of the user, the mobile phone automatically pops up an operation window 902-1, and displays an interface 902 shown in FIG. 9B. On the interface 902, options such as View related parameters, Delete, Edit, Customize, and More are displayed in the operation window 902-1. Display content and a quantity of options in the operation window 902-1 are not limited in embodiments of this disclosure.

The user taps the Delete option, and in response to the user operation, the mobile phone automatically pops up a deletion prompt window 903-1, and prompt information "Do you want to delete the restoration template file of IMG-2021-12-R1?" is displayed in the deletion prompt window 903-1. When the user performs an operation shown in FIG. 9C of tapping an "OK" control, in response to the operation of the user, the mobile phone deletes the restoration template file corresponding to the photo named "IMG-2021-12-R1". Correspondingly, the mobile phone no longer displays, in a floating window of a restoration template selection interface 904 shown in FIG. 9D, the deleted restoration template corresponding to the photo named "IMG-2021-12-R1". Details are not described herein.

Figure 9B:
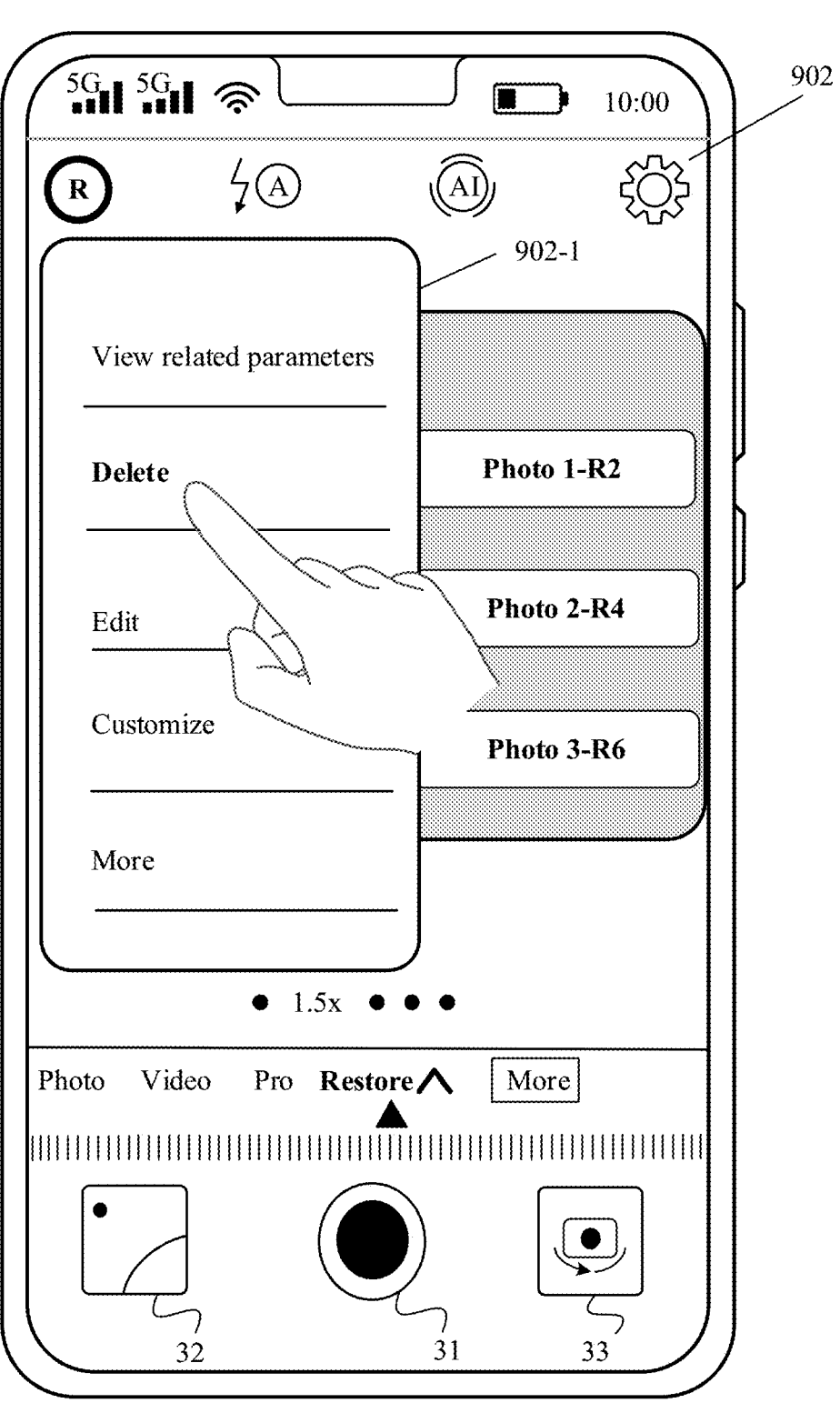
Figure 9C:
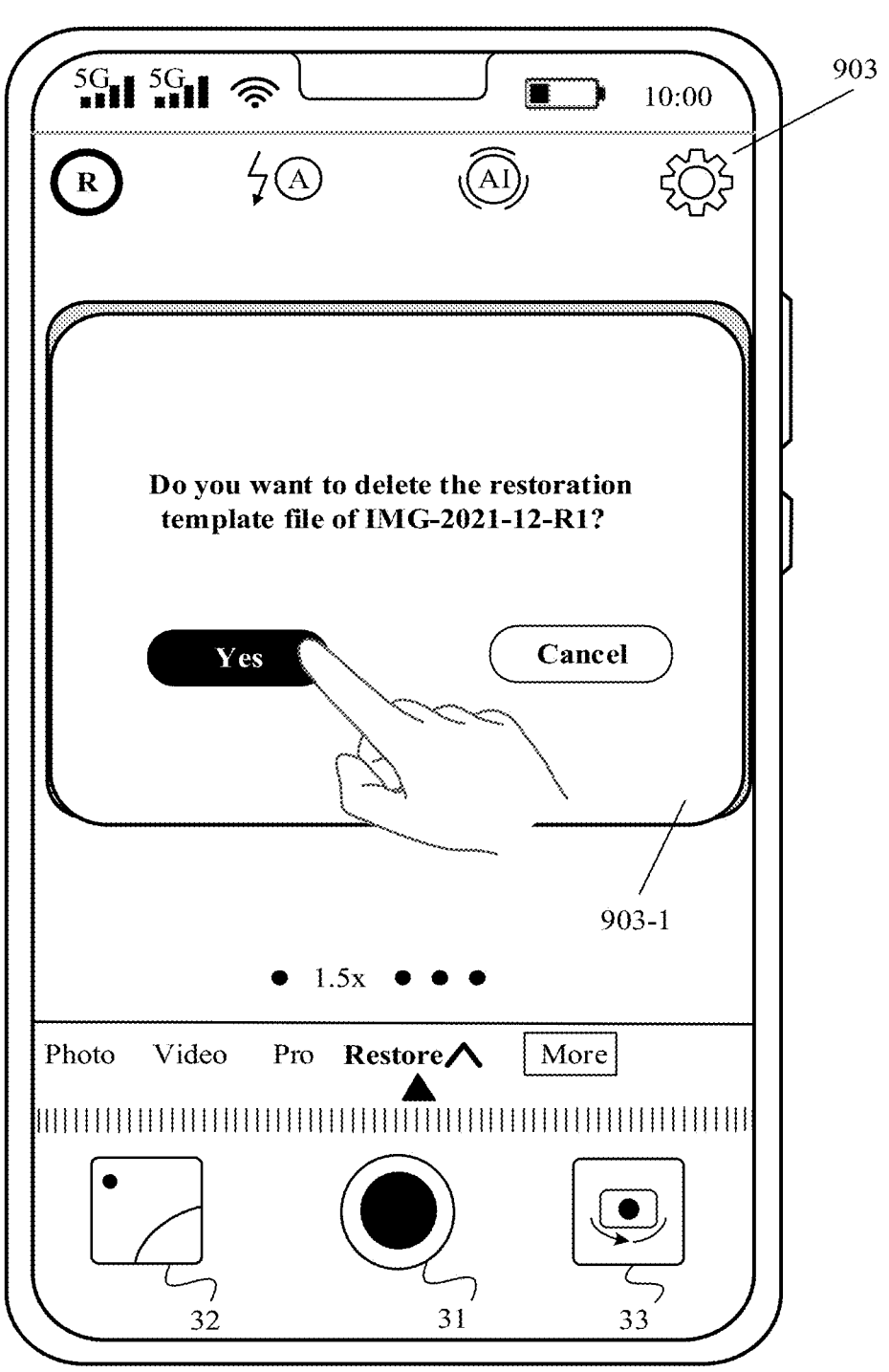
Figure 9D:
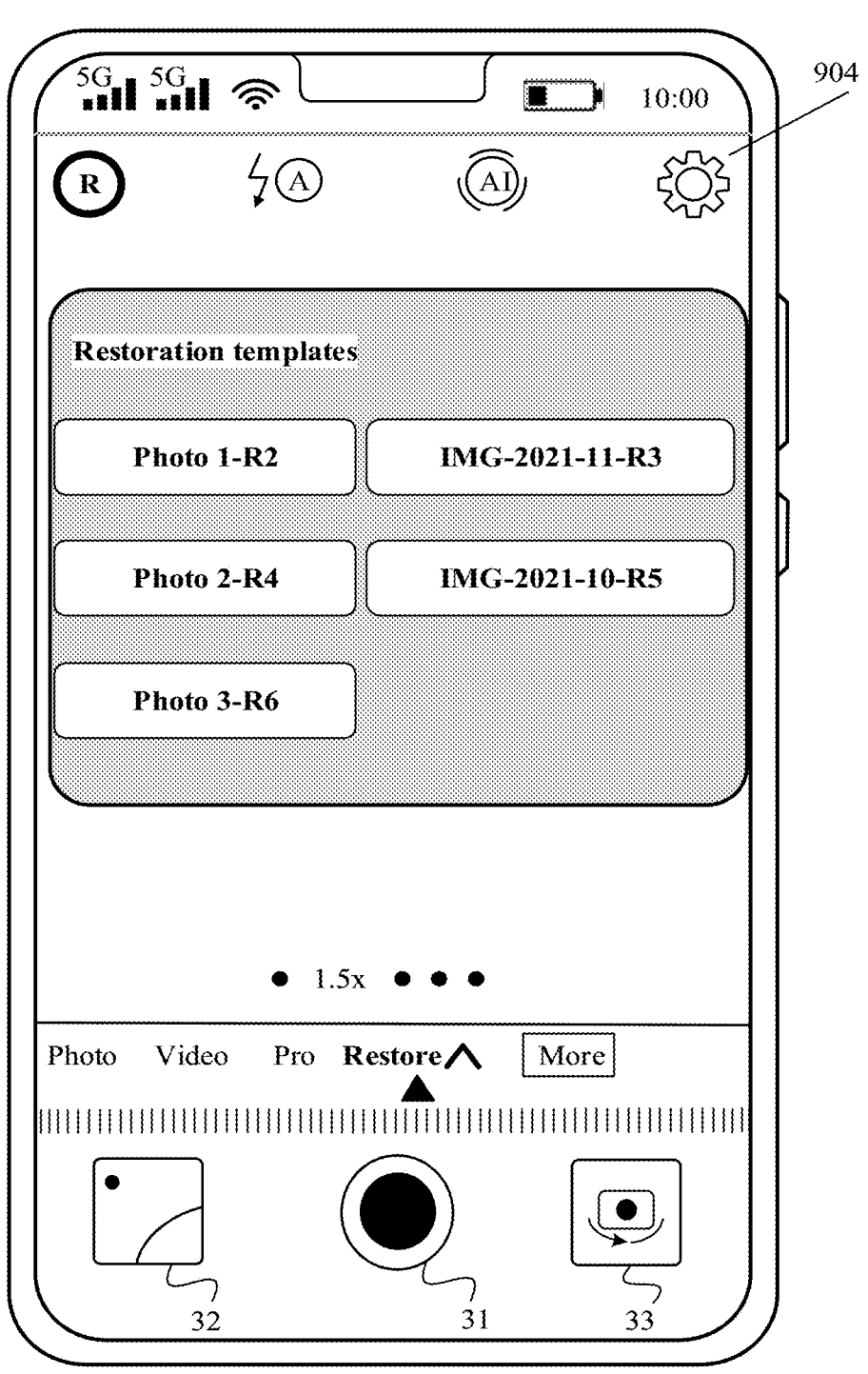

Similarly, the user may further select, based on a personal requirement, the options such as View related parameters, Delete, Edit, Customize, and More in the operation window 902-1 shown in FIG. 9B. Each option may implement a different function, for example, the Edit option may support the user in performing operations such as modifying or replacement on one or more parameters included in the restoration template. Details are not described herein.

In the foregoing embodiments, a photo shooting process of the user is used as an example. When the user shoots a photo, the mobile phone may generate a corresponding "restoration template file" based on content such as the photo shot by the user, one or more shooting parameters in the photo shooting process, and/or an editing parameter in a process of editing the photo by the user after shooting is completed. When the photo shot by the user is lost or mistakenly deleted, the user may perform shooting restoration based on the restoration template file corresponding to the photo, to implement photo restoration, and re-shoot a photo that is the same as or similar to the lost or mistakenly deleted photo.

It should be understood that the shooting restoration capability in embodiments of this disclosure may be a system capability of the electronic device, for example, the mobile phone. Correspondingly, the system capability may be invoked by a plurality of applications that have a shooting capability, for example, the camera application. For example, the shooting restoration process may be implemented based on the camera application configured when the mobile phone is delivered from a factory, or may be implemented based on any other application that can shoot a photo, for example, a beauty camera and Meipai, downloaded and installed by the user, or may be applied to any application that has a photo shooting function, a video recording function, or the like, for example, a TikTok® application and a WeChat® application. This is not limited in embodiments of this disclosure.

It should be further understood that, in addition to the foregoing described method for shooting a photo and restoring shooting, the restoration process provided in embodiments of this disclosure may be further applied to a video recording scenario of the user, for example, other video clip recording scenarios in different shooting modes such as dual-view shooting and multi-view shooting. A scenario in which the restoration process is available is not limited in embodiments of this disclosure.

A scenario in which a video clip is recorded in a dual-view shooting mode is used as an example. FIG. 10A to FIG. 10E are a schematic diagram of yet other examples of graphical user interfaces in a shooting restoration process according to an embodiment of this disclosure.

Figure 10A:
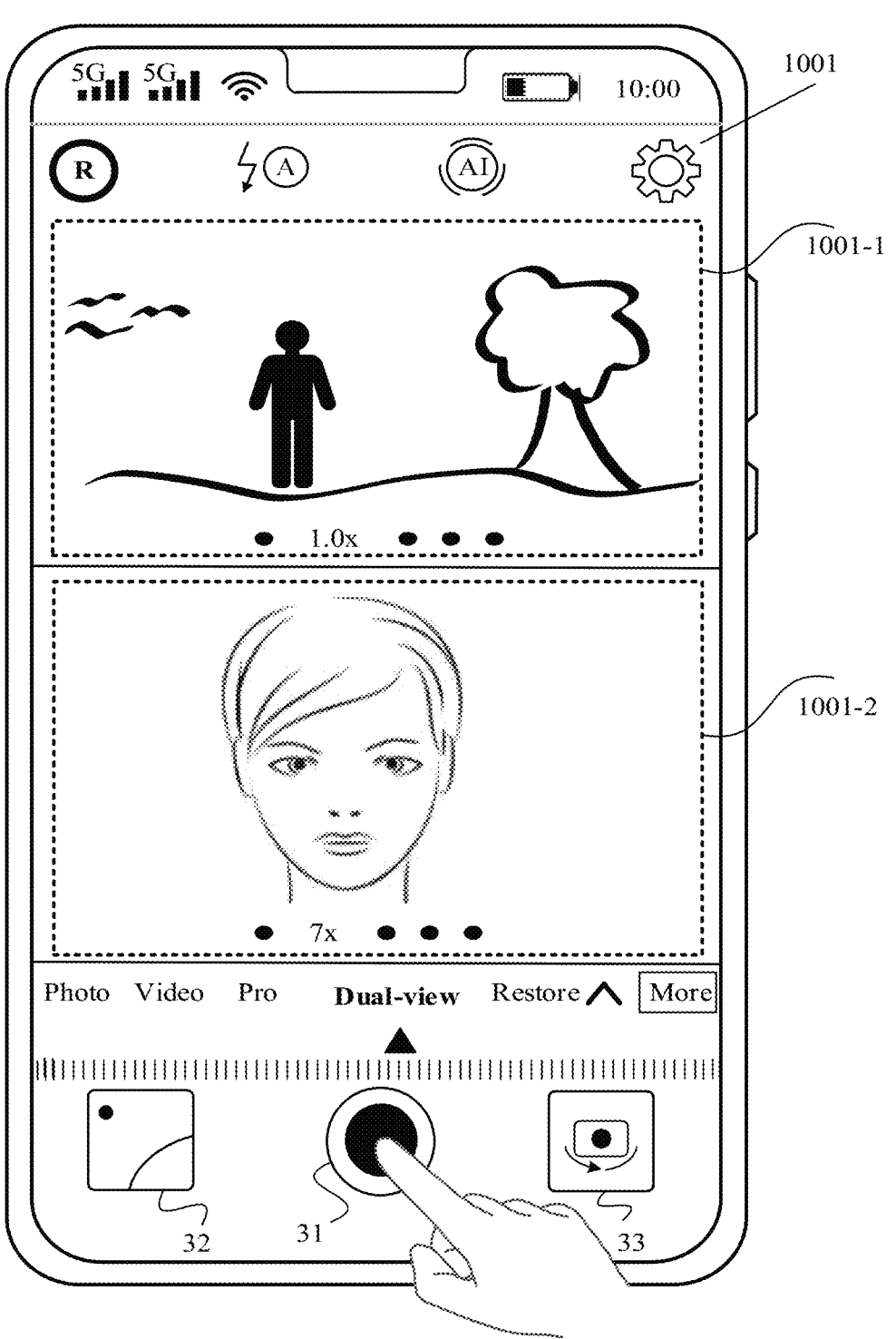
FIG. 10A to FIG. 10E are a schematic diagram of yet other examples of graphical user interfaces in a shooting restoration process according to an embodiment of this disclosure.

For example, FIG. 10A shows a shooting preview interface 1001 of the mobile phone, and the user switches a current shooting mode to a dual-view shooting mode. Correspondingly, a "small black triangle icon" used to locate the current shooting mode may point to a "Dual-view shoot" mode control.

Optionally, two preview windows may be displayed on the shooting preview interface 1001 in the dual-view shooting mode: a preview window 1001-1 and a preview window 1001-2. Optionally, pictures in different preview windows may come from different cameras of the mobile phone. For example, a picture in the preview window 1001-1 may come from a rear-facing wide-angle camera of the mobile phone, and is used to shoot a distant scene, and the picture is referred to as a "background stream" picture. A picture in the preview window 1001-2 may come from a front-facing camera of the mobile phone, and is used to shoot a close-up face of a person, and the picture is referred to as a "foreground stream" picture.

In a recording process of a video clip of a dual-view picture, the user may set different shooting parameters for pictures in different preview windows. For example, the picture in each preview window may be independently shot based on different quantities and/or different types of parameters listed in Table 3.

After setting different shooting parameters for the preview windows, the user performs an operation shown in FIG. 10A of tapping a shooting shutter control 31. In response to the operation of the user, the mobile phone may collect different video pictures by using different cameras, and record the video clip based on the "background stream" picture and the "foreground stream" picture. Similarly, the user may tap the shooting shutter control 31 again to end the recording process of the video clip, and save the recorded video clip locally.

In a possible implementation, for any video clip that is locally stored in the mobile phone and has the dual-view picture, the mobile phone may generate, based on a shooting parameter and/or an editing parameter corresponding to each part of picture included in the video clip of the dual-view picture, one or more restoration template files corresponding to the video clip.

For example, the video clip of the dual-view picture may be understood as a combination of two parts of pictures, and the restoration template files corresponding to the video clip of the dual-view picture may include: a first restoration template file, a second restoration template file, and a third restoration template file. The first restoration template file correspondingly includes one or more parameters corresponding to the "background stream" picture, for example, different camera parameters, and shooting parameters such as a focal length and a beauty level set by the user. The second restoration template file correspondingly includes one or more parameters corresponding to the "foreground stream" picture, for example, different camera parameters, and shooting parameters such as a focal length and a beauty level set by the user. The third restoration template file correspondingly includes all the parameters corresponding to the "background stream+foreground stream" picture.

It should be understood that the first restoration template file and the second restoration template file corresponding to the video clip of the dual-view picture may respectively correspond to different quantities and/or different types of parameters; or the first restoration template file and the second restoration template file corresponding to the video clip of the dual-view picture include a same quantity and/or same types of parameters. This is not limited in embodiments of this disclosure.

Optionally, when the video clip of the dual-view picture is lost or mistakenly deleted, the user may alternatively restore the photo, or restore the video clip, or the like based on the restoration template file (for example, the first restoration template file, the second restoration template file, or the third restoration template file) corresponding to the video clip of the dual-view picture.

Figure 10B:
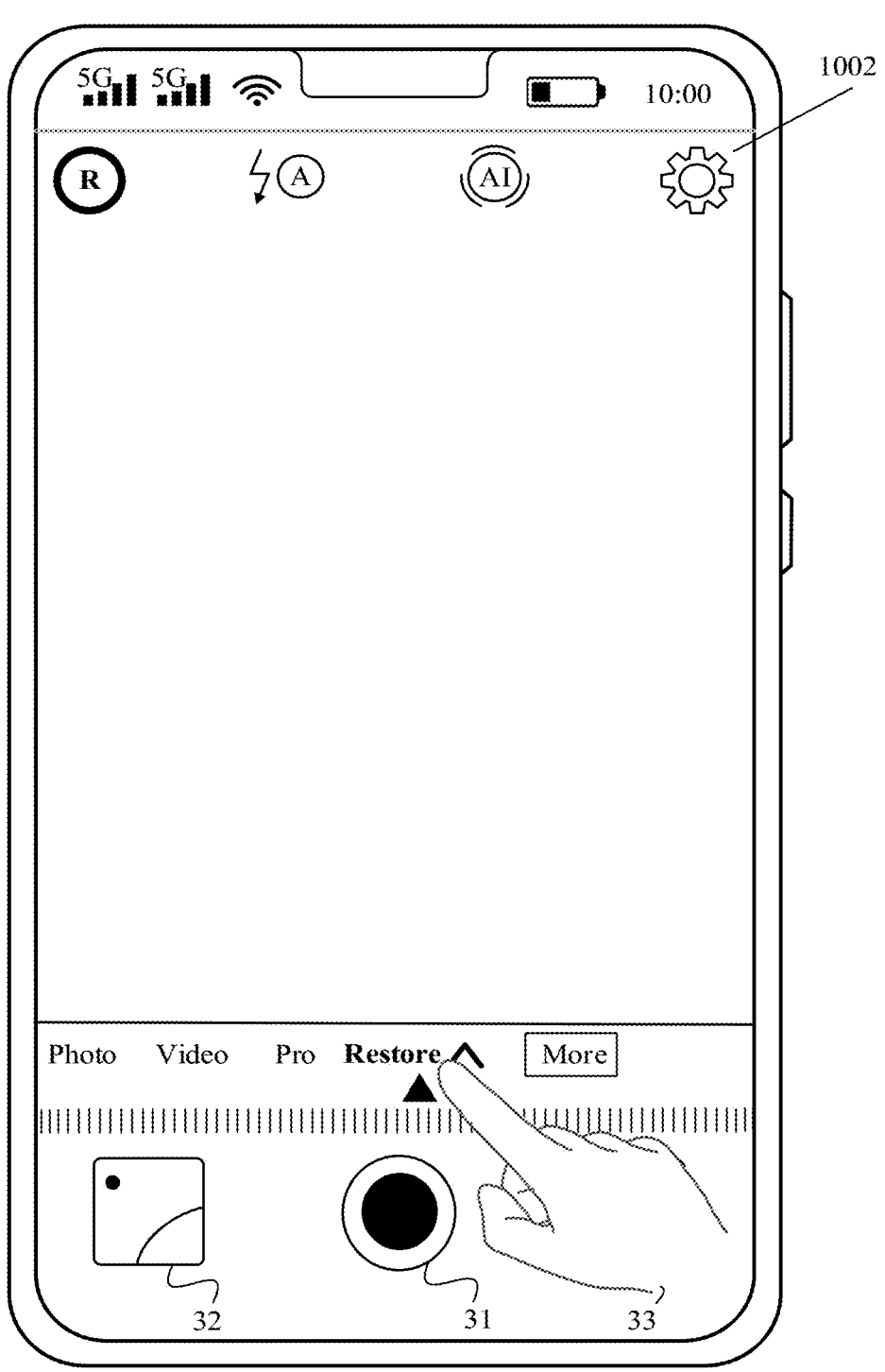

For example, on a shooting preview interface 1002 shown in FIG. 10B, the user switches the current shooting mode to a restoration mode. When the user taps a "Restore" mode control, in response to an operation of the user, the mobile phone displays a restoration template selection interface 1003 shown in FIG. 10C. One or more restoration templates are displayed in a floating window of the restoration template selection interface 1003.

In a possible implementation, the one or more restoration templates displayed in the floating window of the restoration template selection interface 1003 may include restoration templates corresponding to different multimedia files, for example, a restoration template corresponding to a photo, and/or a restoration template corresponding to a video clip, and/or a restoration template corresponding to a dynamic picture, and/or a restoration template corresponding to an audio photo.

Optionally, in the restoration mode of the camera application, the user may perform a photo restoration process, or may perform a video restoration process. Different processes may be determined based on a type of a restoration template file selected by the user, for example, is distinguished based on a suffix or a file name of the restoration template file selected by the user.

Figure 10C:
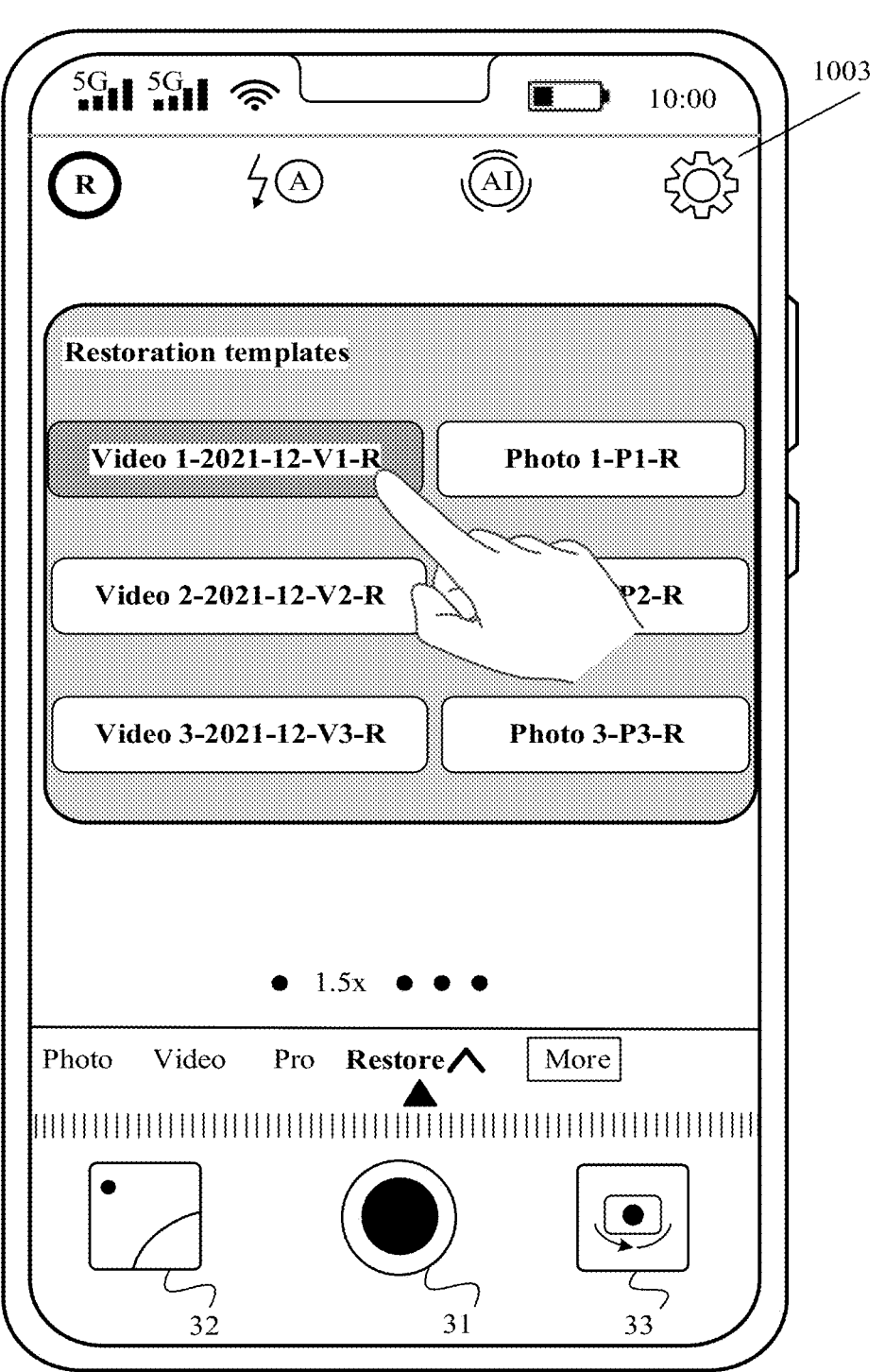
Figure 10D:
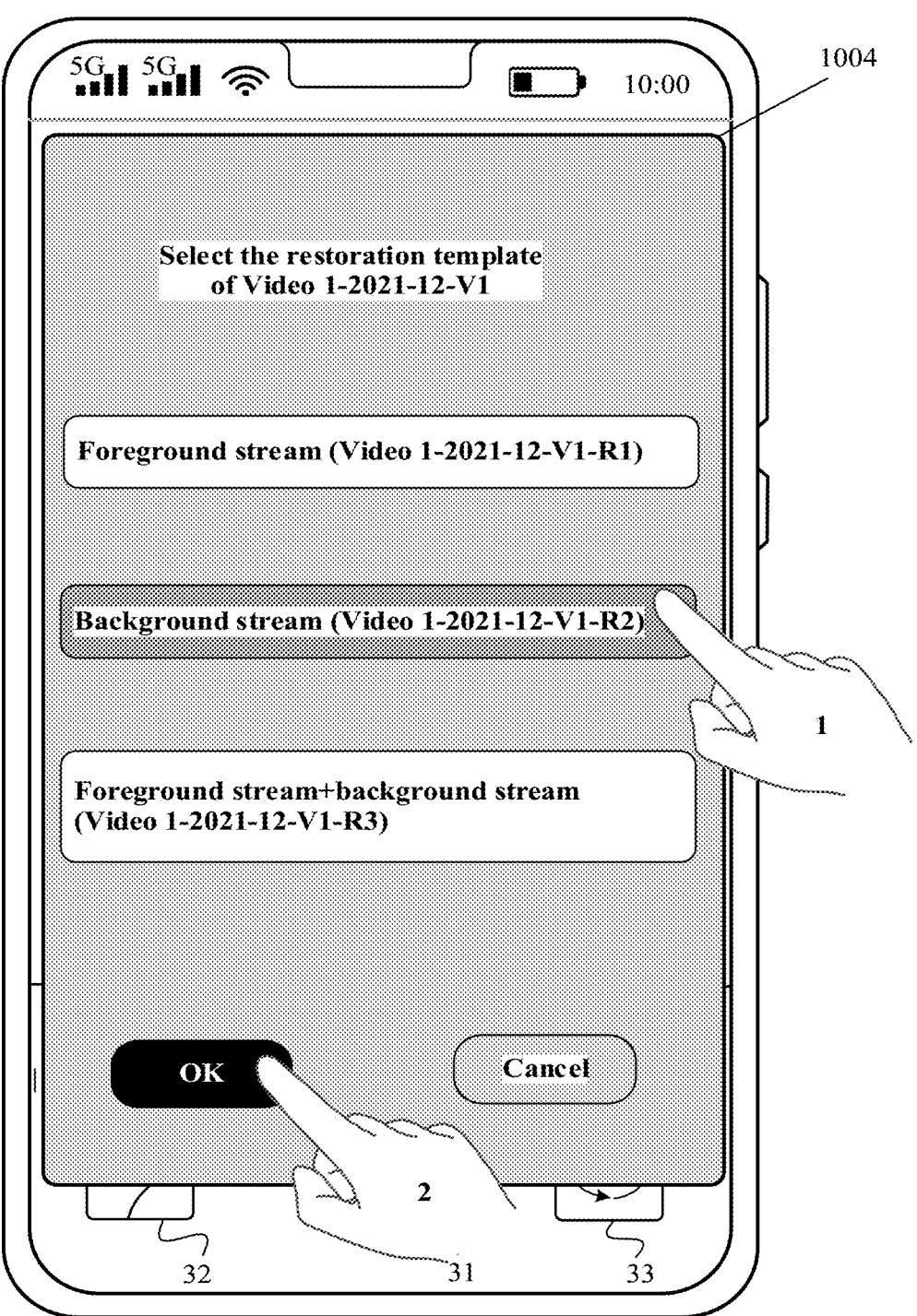
Figure 10E:
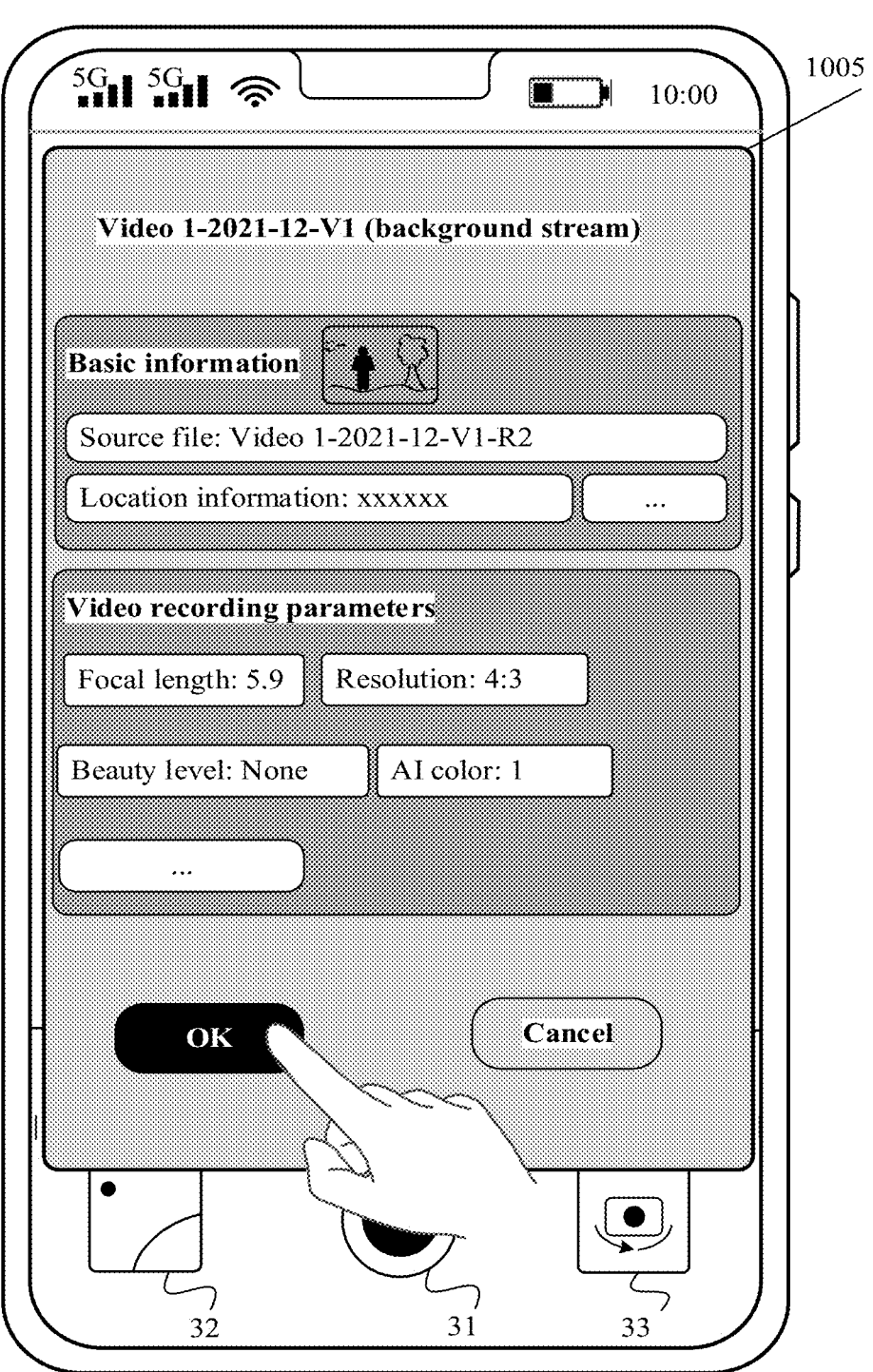

For example, in FIG. 10C, the restoration template selection window may include a restoration template corresponding to a photo, or may include a restoration template corresponding to a video clip. Different restoration templates may be distinguished by using different suffixes, and "-R" identifies a "restoration template". For example, a suffix of a restoration template of a photo carries "-P-R", for example, "Photo 1-P1-R", "Photo 2-P2-R", and "Photo 3-P3-R" respectively correspond to restoration templates of a photo 1, a photo 2, and a photo 3, and a suffix of a restoration template of a video clip carries "-V", for example, "Video 1-2021-12-V1-R", "Video 2-2021-12-V2-R", and "Video 3-2021-12-V3-R" respectively correspond to restoration templates of a video clip 1, a video clip 2, and a video clip 3. This is not limited in embodiments of this disclosure.

When the user taps "Photo 1-P1-R", the mobile phone may determine, based on the suffix of the restoration template selected by the user, that the user uses the current camera application to restore and shoot a photo, and further enable a corresponding shooting mode. When the user taps "Video 1-2021-12-V1-R", the mobile phone may determine, based on the suffix of the restoration template selected by the user, that the user uses the current camera application to restore and record a video, and further enable a corresponding video recording mode.

Optionally, in the restoration mode of the camera application, file names of one or more restoration templates for selection by the user may not be distinguished as different types such as a photo (-P) and a video (-V) based on file type suffixes, but exist only in a form of -R as restoration template files. After selecting one of the restoration template files, the user may determine, by using a source file type corresponding to the restoration template file, whether the restoration template file is currently used to restore a photo, a dynamic picture, a video, or the like. For example, the user selects one of a plurality of files named xxxx-R. If a source file type corresponding to the file xxxx-R is a photo, the user may restore a shooting process of the photo by default in the current restoration mode. This is not limited in embodiments of this disclosure.

Alternatively, in the floating window of the restoration template selection interface 1003, the user may touch and hold and select any one of the one or more restoration templates, and choose, by using the "More" option in the displayed operation window 902-1 shown in FIG. 9B, to restore and shoot a photo, or restore and record a video. For example, the "More" option in the operation window 902-1 shown in FIG. 9B may further include options such as "Photo", "Video clip", "Dynamic picture", and "Audio photo", and the user may select and restore different types of multimedia files based on the restoration template.

Alternatively, a "Change" option is added to the operation window 902-1 shown in FIG. 9B. If the user selects, in the floating window of the restoration template selection interface 1003, a restoration template corresponding to a photo, the option, for example, "Photo", "Video clip", "Dynamic picture", and "Audio photo" may be further selected by using the "Change" option, to restore another type of multimedia file by using the restoration template corresponding to the photo. Details are not described herein. The user performs an operation shown in FIG. 10C of tapping an option named "Video 1-2021-12-V1-R". In response to the operation of the user, the mobile phone determines that the user currently selects a restoration template file corresponding to a video clip named "Video 1-2021-12-V1-R". The mobile phone may further display an interface 1004 shown in FIG. 10D. Three different restoration template options: a Foreground stream option (the second restoration template file: Video 1-2021-12-V1-R1), a Background stream option (the first restoration template file: Video 1-2021-12-V1-R2), and a Foreground stream+background stream option (the third restoration template file: Video 1-2021-12-V1-R3) corresponding to the video clip of the dual-view picture may be displayed on the interface 1004. The user may tap different options to select different types of restoration template files and different parameters to perform shooting restoration.

When the user taps the "Background stream" option, in response to an operation of the user, the mobile phone uses, as a parameter required for restoring a current shooting process, a parameter included in the first restoration template file corresponding to the "background stream" picture. The mobile phone may display an interface 1005 shown in FIG. 10E. A video clip name "Video 1-2021-12-V1 (the background stream)", a cover thumbnail of the "background stream" picture, a storage location (xxxxxx) of the first restoration template file, and one or more video recording parameters such as a shooting focal length, resolution, a beauty level, and an AI color of the "background stream" picture are further displayed in a floating window of the interface 1005. The user may tap an "OK" control to return to the shooting preview interface, and perform shooting restoration based on the first restoration template file corresponding to the "background stream" picture and the one or more video recording parameters.

It should be understood that, in this scenario, the mobile phone restores a video recording process based on the "background stream" picture corresponding to the first restoration template file. In this case, a video clip re-recorded by the mobile phone may be a single picture video or a dual-view picture video, or may set, with reference to the manner of selecting and restoring the photo or the video clip described in the foregoing embodiments, an option that can be manually selected for the user to select, or may automatically match an option for the user. This is not limited in embodiments of this disclosure.

Similarly, if the user taps the "Foreground stream" option, the mobile phone uses, as parameters required in the current shooting restoration process, one or more video recording parameters included in the second restoration template file corresponding to the "foreground stream" picture. For the implementation process, refer to the foregoing implementation process. Details are not described herein again.

When the user taps the "Foreground stream+background stream" option, in response to an operation of the user, the mobile phone uses, as one or more video recording parameters required in the current shooting restoration process, all parameters included in the "third original template file" corresponding to the dual-view picture of "foreground stream+background stream". The mobile phone may display, on the interface 1005, the cover thumbnail of the "background stream" picture, the storage location of the first restoration template file, and one or more video recording parameters such as a focal length, resolution, a beauty level, and an AI color of the "background stream" picture before shooting, and display a cover thumbnail of the "foreground stream" picture, a storage location of the second restoration template file, and one or more video recording parameters such as a focal length, resolution, a beauty level, and an AI color of the "foreground stream" picture before shooting. Details are not described herein. In this scenario, when the user taps the "OK" control, the mobile phone may return to the shooting preview interface, continue to restore shooting based on a dual-view shooting mode similar to that shown in FIG. 10A, and display two preview windows. One preview window is adjusted to the one or more video recording parameters corresponding to the "foreground stream" picture, and the other preview window is adjusted to the one or more video recording parameters corresponding to the "background stream" picture. The user taps the shooting shutter button 31 to record the video clip. Details are not described herein.

The method provided in embodiments of this disclosure may be applied to the dual-view shooting mode, and a restoration template file may also be generated for a video clip recorded in the dual-view shooting mode, to restore a shooting process. Specifically, the restoration template file corresponding to the video clip of the dual-view picture may be used to restore an ordinary video clip of a single picture, or may be used to restore a video clip of a dual-view picture, or may be used to restore different types of multimedia files such as a photo and a dynamic picture. In this implementation, scenarios of this disclosure are enriched, and utilization of a restoration template is improved to some extent. A shooting restoration process is convenient, and a shooting process and/or framing content of a multimedia file can be quickly restored. This improves user experience.

Optionally, in addition to the dual-view shooting scenario described in the foregoing embodiments, another "multi-view shooting" or "multi-stream shooting" scenario may correspond to a plurality of different processing manners.

It should be noted that the foregoing uses the "dual-view shooting" mode as an example to describe a case in which three types of restoration template files may be generated when a video clip is recorded. It should be understood that more than three types of restoration template files may be generated in the "dual-view shooting" mode. Optionally, when the user records a video by using a "multi-view shooting" mode, "multi-stream shooting" mode, or the like, the user may perform an operation of switching a camera midway. When different cameras capture video pictures, different restoration template files may be independently generated, and the restoration template files may be independently stored.

For example, the "multi-view shooting" scenario includes a plurality of shooting pictures, and the scenario may include the following different processing manners:

(1) In the plurality of shooting pictures included in multi-view shooting, a shooting picture of each view corresponds to an independent restoration template file, and the plurality of restoration template files may be associated with each other in a file suffix manner, (2) The plurality of shooting pictures included in multi-view shooting correspond to a unique restoration template file, and specifically, entirety of a multi-view picture may be used as a single-view picture, and the generated unique restoration template file is directly used for restoration.

(3) When the operation of switching the camera by the user is detected, separate restoration template files are generated for videos whose pictures are captured by different cameras, to facilitate independent restoration.

A possible association manner of a plurality of restoration template files is listed in Table 5. As shown in Table 5, a name of a video clip of multi-view shooting is "Video 1-2021-12-V1-R", where the first restoration template file corresponding to a first view shooting picture may be named "Video 1-2021-12-V1-R1", the second restoration template file corresponding to a second view shooting picture may be named "Video 1-2021-12-V1-R 2", and a third restoration template file corresponding to the third view shooting picture may be named "Video 1-2021-12-V1-R 3".

TABLE 5

| Multi-view shooting mode | Restoration template file | Association manner (suffix) |
| --- | --- | --- |
| First view shooting image | First restoration template file | Video 1-2021-12-V1-R1 |
| Second view shooting image | Second restoration template file | Video 1-2021-12-V1-R2 |
| Third view shooting image | Third restoration template file | Video 1-2021-12-V1-R3 |
| . . . | . . . | . . . |

Optionally, when shooting restoration is performed, the three restoration template files may be directly linked together as an entire restoration template file, that is, a multimedia file, for example, a video and a photo of a multi-view picture are restored by using the first restoration template file, the second restoration template file, and the third restoration template file.

Alternatively, the three restoration template files may be used as independent restoration template files. The user may select any one or more of the three restoration template files based on a personal shooting requirement, to restore a multimedia file, for example, a video or a photo of a multi-view picture. This is not limited in embodiments of this disclosure.

Optionally, when one of the three restoration template files is damaged, another intact restoration template file may be used to restore the damaged file.

In the foregoing different implementations, a shooting restoration process may be more flexible, and the user can manually select one or more restoration template files to use based on a shooting requirement of the user. This provides the user with more diversified and more convenient shooting restoration manners, and improves user experience.

Optionally, for any multimedia file, for example, a photo, a video, or a dynamic picture, a restoration template file corresponding to the multimedia file may be used to restore a multimedia file of a same type, and may also be used to restore a multimedia file of a different type.

For example, for any video, a restoration template file corresponding to the video may be used to restore a photo, or may be used to restore a video, or may be used to restore a dynamic picture, or the like, to obtain a multimedia file with same or similar display effect. This is not limited in embodiments of this disclosure.

Optionally, a photo or a video used as a restoration template may be shot by the user by using the mobile phone, or may be downloaded by the user, or may be sent by another device and stored in the local album of the mobile phone.

Specifically, when a photo is saved to a local gallery of the mobile phone, the mobile phone may detect the photo, obtain a shooting parameter corresponding to the photo, for example, a brightness level and a filter color of the photo, and generate a restoration template file of the photo. The restoration template file may also guide the user to shoot another photo based on the shooting restoration file with reference to the foregoing photo restoration process. Similarly, the video may also have a similar implementation process. For brevity, details are not described herein again.

In conclusion, according to the shooting restoration method provided in embodiments of this disclosure, a new shooting solution is provided for the user. When a multimedia file, for example, a photo shot by the user, a dynamic picture, or a recorded video clip is lost or mistakenly deleted, the method can quickly implement shooting restoration based on one or more restoration template files stored in the electronic device.

Specifically, the user may use the restoration template file to restore the shooting process, that is, re-shoot another different object by using one or more shooting parameters included in the restoration template file, and restore a multimedia file, for example, a photo, a dynamic picture, or a recorded video clip with same display effect; or the user may select a same framing range, and restore a multimedia file, for example, a photo, a dynamic picture, or a recorded video clip with same effect and a same framing range. This method can satisfy different scenarios, and can quickly implement photo restoration. This simplifies a shooting operation, and improves user experience.

In addition, in a process in which the user selects the restoration template file, after the user selects the restoration template, the method supports the user in performing operations such as viewing, modifying, editing, or deleting on the one or more parameters in the restoration template, and may update the related parameters in the restoration template file based on the operations such as modifying, editing, and deleting performed by the user, or generate and store a new restoration template based on updated related parameters. This meets shooting requirements of the user in different scenarios.

In addition, according to the foregoing solutions, if a multimedia file, for example, a photo, a dynamic picture, or a video clip shot by the user is lost or mistakenly deleted, when the user switches the current shooting mode to the restoration mode, the mobile phone may automatically detect whether a corresponding multimedia file is lost in a plurality of stored restoration template files. When it is detected that a multimedia file corresponding to a restoration template file is lost, the lost multimedia file may be automatically prompted to the user, for the user to choose whether to restore the lost multimedia file, and the shooting restoration process of the mobile phone is automatically triggered. This method can ensure integrity of a restoration template, and improve user experience.

With reference to FIG. 3A to FIG. 10E, the foregoing embodiments describes the photo restoration process from a user interaction layer. With reference to FIG. 11, the following describes a shooting restoration method according to an embodiment of this disclosure from a software implementation policy layer.

It should be understood that the method may be implemented in an electronic device (for example, a mobile phone or a tablet) with a structure, for example, a display and one or more cameras, shown in FIG. 1 and FIG. 2.

FIG. 11 is a schematic flowchart of an example of a shooting restoration method according to an embodiment of this disclosure. A mobile phone is used as an example. As shown in FIG. 11, the method may include the following steps.

1101: Display a shooting preview interface of the electronic device, where the shooting preview interface includes a picture displayed based on one or more shooting parameters of a first parameter set.

Optionally, a shooting restoration capability in embodiments of this disclosure may be a system capability of the electronic device, for example, the mobile phone. Correspondingly, the system capability may be invoked by a plurality of applications that have a shooting capability, for example, a camera application.

For example, the shooting restoration process may be implemented based on the camera application configured during delivery of the mobile phone. The camera application may be run by a user by using the camera application of the mobile phone, and the shooting preview interface may be displayed. For example, an implementation process of step 1101 may be shown in FIG. 3A.

Alternatively, the shooting restoration process may be implemented based on any other application that can shoot a photo, for example, a beauty camera or Meipai downloaded and installed by the user.

Alternatively, the shooting restoration process may be applied to any application that has functions such as photo shooting and video recording, for example, a TikTok® application or a WeChat® application. This is not limited in embodiments of this disclosure.

Optionally, the "shooting parameter" in embodiments of this disclosure may include one or more of the following parameters listed in Table 2: the focal length, the focusing mode, the resolution, the camera, the geographical location information, the beauty parameter, the filter color, the flash effect, the horizontal level effect, the exposure, and the photosensitivity.

It should be understood that, in embodiments of this disclosure, the electronic device stores one or more restoration templates, that is, stores one or more restoration template files.

Optionally, the one or more restoration templates include a preset restoration template. For example, during delivery of the mobile phone, two fixed restoration templates may be set by a developer. The restoration templates correspond to fixed shooting parameters. The shooting parameters may enable the mobile phone to have high-quality shooting effect. Subsequently, the preset restoration template may be displayed regardless of whether the user restores to shoot a photo, records a video, or the like.

Alternatively, the one or more restoration templates include a restoration template generated by the electronic device based on one or more shooting parameters of an associated multimedia file.

For example, the mobile phone may intelligently detect a shooting environment and a shot object, and intelligently match different shooting templates for the user based on external factors such as the shooting environment and the shot object. For example, when the mobile phone detects that a current shooting environment is a dark night shooting environment, one or more restoration templates displayed in a restoration template selection window may include a parameter suitable for night shooting.

Alternatively, the mobile phone may intelligently display, to the user based on a use frequency, a shooting habit, and the like of the user, one or more restoration templates that are frequently used. For example, a restoration template file corresponding to a photo named "IMG-2021-12-R1" is most frequently used, and is preferably displayed in the restoration template selection window. This is not limited in embodiments of this disclosure.

Optionally, the "shooting restoration function" in embodiments of this disclosure may be enabled or disabled manually by the user by using a setting control, a shortcut control, or the like of the camera application. For example, the user may enable the shooting restoration function of the electronic device in the process described in FIG. 3A to FIG. 3D. Details are not described herein again.

Alternatively, the shooting restoration function may be configured as a default function of the electronic device, that is, a plurality of associated applications such as the camera application and a gallery application of the electronic device may be authorized to invoke the shooting restoration function. This is not limited in embodiments of this disclosure.

1102: Determine a first restoration template from the one or more restoration templates, where the first restoration template is associated with a first multimedia file, and the first multimedia file is any one of a photo, a dynamic picture, or a video clip.

It should be understood that, in embodiments of this disclosure, a multimedia file, for example, the "first multimedia file" or a "second multimedia file" may include any one of a photo, a dynamic picture, or a video clip. The multimedia file may be obtained by the user through shooting by using the camera application of the electronic device, or the like, or may be a multimedia file downloaded by the user from a network, a server, a social platform, or the like, or may be a received multimedia file that is sent by another device and stored locally on the mobile phone.

A photo is used as an example. When the user downloads the photo and saves the photo to a local gallery of the mobile phone, the mobile phone may detect the photo, obtain shooting parameters corresponding to the photo, for example, a brightness level and a filter color of the photo, and generate a restoration template file of the photo. The restoration template file may also be used to guide the user to shoot another multimedia file, for example, a photo, a dynamic picture, or a video. Details are not described herein again.

In a possible implementation, the determining a first restoration template from the one or more restoration templates includes: receiving a manual selection operation of the user, and selecting and determining the first restoration template from the one or more restoration templates.

For example, for the operations shown in FIG. 5A and FIG. 5B, the user may manually select, from the one or more restoration templates displayed in the restoration template selection window, the restoration template corresponding to the photo named "IMG-2021-12-R1" as the first restoration template. In this case, the photo named "IMG-2021-12-R1" is the "first multimedia file".

In another possible implementation, the electronic device may intelligently and automatically match or recommend the first restoration template to the user from the one or more restoration templates. Optionally, a restoration template that has optimal shooting effect in the one or more restoration templates may be automatically determined as the first restoration template based on the shooting environment in which the electronic device is located. Alternatively, a restoration template that has optimal shooting effect in the one or more restoration templates is automatically determined as the first restoration template based on a picture displayed on the shooting preview interface. Alternatively, a restoration template that is most frequently used by the user in the one or more restoration templates is automatically determined as the first restoration template based on the use frequency of the user. Alternatively, a restoration template that is last used by the user in the one or more restoration templates is automatically determined as the first restoration template based on a use record of the user. This is not limited in embodiments of this disclosure.

For example, when the mobile phone detects that the current shooting environment is a dark night shooting environment, the one or more restoration templates displayed in the restoration template selection window may be the first restoration template matched for or recommended to the user, and the first restoration template includes a shooting parameter suitable for night shooting.

Alternatively, the mobile phone may intelligently determine, as the first restoration template based on the use frequency, a shooting habit, and the like of the user, the restoration template file that corresponds to the photo and that is most frequently used and that is named "IMG-2021-

12-R1", and the restoration template file is preferably displayed or selected by default in the restoration template selection window. The user may also cancel or change the restoration template file. This is not limited in embodiments of this disclosure.

1103: Obtain a second parameter set corresponding to the first restoration template, where the second parameter set includes one or more shooting parameters for shooting the first multimedia file.

Optionally, the second parameter set further includes framing information of the first multimedia file. The electronic device may determine a framing range of the first multimedia file based on the framing information of the first multimedia file, and obtain a third multimedia file through shooting based on a shooting operation of the user and the one or more shooting parameters included in the second parameter set. The third multimedia file and the first multimedia file have same display effect and a same framing range.

Optionally, the second parameter set further includes an operation parameter for performing editing processing on the first multimedia file by the user. After the second multimedia file is obtained through shooting, the electronic device may perform editing processing on the second multimedia file based on the operation parameter for editing processing, to obtain a processed second multimedia file. Editing processing includes one or more of ratio cropping, filter color adjustment, beauty parameter adjustment, and brightness level adjustment that are listed in Table 3.

1104: Receive a first operation of the user, and in response to the first operation, obtain the second multimedia file through shooting based on the one or more shooting parameters included in the second parameter set, so that the second multimedia file and the first multimedia file have same display effect, where the second multimedia file is any one of a photo, a dynamic picture, or a video clip.

Optionally, when the second multimedia file is a photo, the "first operation" may include the shooting operation of tapping the shooting shutter control by the user, as shown in FIG. 5F. When the second multimedia file is a video clip, the "first operation" may include the video recording operation of tapping the shooting shutter control at least twice by the user, as shown in FIG. 5F. This is not limited in embodiments of this disclosure.

In a possible implementation, after the user selects the first restoration template file, and after obtaining the second parameter set corresponding to the first restoration template, the electronic device may further present the one or more shooting parameters of the second parameter set to the user, and the user may further modify the one or more parameters in the restoration template file.

Optionally, "modifying the one or more parameters in the restoration template file" may include: The user performs an operation, for example, editing, deleting, adding, or adjusting, on the one or more shooting parameters in the second parameter set.

Optionally, after the user modifies the one or more shooting parameters in the second parameter set, the electronic device may update the first restoration template based on a modified second parameter set, that is, overwrite the original restoration template file, and replace an original parameter in the first restoration template file with a parameter obtained through modification by the user.

Alternatively, the electronic device may generate, based on the modified second parameter set, a second restoration template associated with the first multimedia file, and store the second restoration template. For example, with reference to the modified parameter and the one or more parameters in the original first restoration template file, the electronic device may generate a new restoration template file based on the operation of the user, and automatically store the new restoration template file. For example, the new second restoration template file is named by continuously adding a suffix after a name of the original restoration template file and is stored.

In another possible implementation, each multimedia file may correspond to a unique restoration template file. If a multimedia file is lost or mistakenly deleted, the mobile phone may detect that a source file of the multimedia file is lost. The electronic device may automatically remind the user of the loss of the multimedia file, and the user selects whether to restore the photo.

Specifically, when it is detected that the first multimedia file associated with the first restoration template is lost or damaged, the electronic device may display prompt information in a shooting restoration mode, where the prompt information is used to remind the user to restore the first multimedia file. In this process, the user may be actively reminded to restore the multimedia file, and the user chooses to restore the lost multimedia file, so that integrity of the restoration template can be ensured. In addition, a photo restoration process is convenient, and a previous shooting process can be quickly restored. This improves user experience.

In still another possible implementation, after obtaining the second parameter set corresponding to the first restoration template, the electronic device may further automatically update, based on the one or more shooting parameters included in the second parameter set, the picture displayed on the shooting preview interface of the electronic device.

For example, the shooting preview interface 501 shown in FIG. 5A and the shooting preview interface 506 shown in FIG. 5F are compared. On the shooting preview interface 501 shown in FIG. 5A, the user does not select the resto-ration template file, and a related shooting parameter may be a default shooting parameter of a current camera by default, for example, having a zoom-in multiple "1.0×", or no enabling of beauty level and other effect such as the filter color. On the shooting preview interface 506 shown in FIG. 5F, the user has selected the restoration template file in the process shown in FIG. 5B-FIG. 5C-FIG. 5D, and a related shooting parameter may be automatically adjusted to the one or more parameters included in the restoration template file. For example, a zoom-in multiple "1.5×" is displayed on the shooting preview interface 506, and the beauty level (beauty level 6) and another effect such as the filter color are enabled.

Optionally, in a shooting restoration process of the electronic device, the user may perform a photo restoration process, or may perform a video restoration process. Different processes may be determined based on a type of a restoration template file selected by the user, for example, is distinguished based on a suffix or a file name of the restoration template file selected by the user. The user may select different types of restoration template files and different parameters to perform shooting restoration.

For example, in FIG. 10C, the restoration template selection window may include a restoration template corresponding to a photo, or may include a restoration template corresponding to a video clip. Different restoration templates may be distinguished by using different suffixes, and "-R" identifies a "restoration template".

In addition, the user may select a restoration template file of a photo to restore photo shooting, video clip shooting, or dynamic picture shooting, or may select a restoration template file of a video clip to restore photo shooting, video clip shooting, or dynamic picture shooting. This is not limited in embodiments of this disclosure.

In conclusion, the shooting restoration method in this disclosure provides a new shooting solution for the user. When a multimedia file, for example, a photo shot by the user, a dynamic picture, or a recorded video clip is lost or mistakenly deleted, the method can quickly implement shooting restoration based on one or more restoration template files stored in the electronic device.

Specifically, the user may use the restoration template file to restore the shooting process, that is, re-shoot another different object by using one or more shooting parameters included in the restoration template file, and restore a multimedia file, for example, a photo, a dynamic picture, or a recorded video clip with same display effect; or the user may select a same framing range, and restore a multimedia file, for example, a photo, a dynamic picture, or a recorded video clip with same effect and a same framing range. This method can satisfy different scenarios, and can quickly implement photo restoration. This simplifies a shooting operation, and improves user experience.

In addition, in a process in which the user selects the restoration template file, after the user selects the restoration template, the method supports the user in performing operations such as viewing, modifying, editing, or deleting on the one or more parameters in the restoration template, and may update the related parameter in the restoration template file based on the operations such as modifying, editing, and deleting performed by the user, or generate and store a new restoration template based on an updated related parameter. This meets shooting requirements of the user in different scenarios.

In addition, according to the foregoing solutions, if a multimedia file, for example, a photo, a dynamic picture, or a video clip shot by the user is lost or mistakenly deleted, when the user switches a current shooting mode to the restoration mode, the mobile phone may automatically detect whether a corresponding multimedia file is lost in a plurality of stored restoration template files. When it is detected that a multimedia file corresponding to a restoration template file is lost, the lost multimedia file may be automatically prompted to the user, for the user to choose whether to restore the lost multimedia file, and the shooting restoration process of the mobile phone is automatically triggered. This method can ensure integrity of a restoration template, and improve user experience.

It should be noted that, in descriptions of embodiments of this disclosure, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in embodiments of this disclosure, "a plurality of" means two or more.

It should be understood that, division into manners, cases, categories, and embodiments in embodiments of this disclosure is merely for ease of description, and should not constitute a special limitation. Features in various manners, categories, cases, and embodiments may be combined without contradiction.

It should be further understood that the terms "first", "second", and "third" in embodiments of this disclosure are merely for distinguishing, and should not constitute any limitation on this disclosure. For example, the "first restoration template" and the "second restoration template" in embodiments of this disclosure indicate different restoration templates including different shooting parameters and/or editing parameters.

It should be further understood that sequence numbers of the processes do not mean execution sequences in embodiments of this disclosure. The execution sequences of the processes need be determined based on functions and internal logic of the processes, and should not constitute any limitation on implementation processes of the embodiments of this disclosure.

It should be further noted that, in embodiments of this disclosure, "presetting", "fixed value", or the like may be implemented by pre-storing corresponding code, a table, or another manner that may be used to indicate related information in the electronic device. A specific implementation thereof is not limited in this disclosure, for example, "preset restoration template" in embodiments of this disclosure.

It may be understood that, to implement the foregoing functions, the electronic device includes corresponding hardware and/or software modules for performing the functions. With reference to algorithms and steps in examples described in embodiments disclosed in this specification, this application can be implemented by hardware or a combination of hardware and computer software. Whether a function is implemented by hardware or hardware driven by computer software depends on particular applications and design constraints of the technical solutions. A person skilled in the art may use different methods to implement the described functions for each specific application with reference to embodiments. However, it should not be considered that the implementation goes beyond the scope of this disclosure.

In this embodiment, the electronic device may be divided into function modules based on the foregoing method examples. For example, each function module corresponding to each function may be obtained through division, or two or more functions may be integrated into one processing module. The integrated module may be implemented in a form of hardware. It should be noted that, in this embodiment, the division of the modules is an example, and is merely logical function division. During an actual implementation, another division manner may be used.

When the functional modules are divided according to the corresponding functions, a schematic diagram of a possible composition of the electronic device in the foregoing embodiments may be shown. The electronic device may include a display unit, a detection unit, and a processing unit. The display unit, the detection unit, and the processing unit cooperate with each other, and may be configured to support the electronic device in performing the foregoing steps and the like, and/or used in another process of the technology described in this specification.

It should be noted that all related content of the steps in the foregoing method embodiments may be cited in function descriptions of corresponding functional modules. Details are not described herein again.

The electronic device provided in embodiments is configured to perform the foregoing shooting restoration method, and therefore can achieve same effect as the foregoing implementation method.

When an integrated unit is used, the electronic device may include a processing module, a storage module, and a communication module. The processing module may be configured to control and manage actions of the electronic device, for example, may be configured to support the electronic device in performing the steps performed by the display unit, the detection unit, and the processing unit. The storage module may be configured to support the electronic device to store program code, data, and the like. The communication module may be configured to support communication between the electronic device and another device.

The processing module may be a processor or a controller. The processor may implement or execute various example logical blocks, modules, and circuits described with reference to content disclosed in this disclosure. The processor may alternatively be a combination for implementing a computing function, for example, a combination including one or more microprocessors or a combination of a digital signal processor (DSP) and a microprocessor. The storage module may be a memory. The communication module may be specifically a device that interacts with another electronic device, such as a radio frequency circuit, a Bluetooth chip, or a Wi-Fi chip.

In an embodiment, when the processing module is a processor and the storage module is a memory, the electronic device in embodiments may be a device with the structure shown in FIG. 1.

An embodiment further provides a computer-readable storage medium. The computer-readable storage medium stores computer instructions. When the computer instructions are run on an electronic device, the electronic device is enabled to perform the related method steps, to implement the shooting restoration method in the foregoing embodiment.

An embodiment further provides a computer program product. When the computer program product is run on a computer, the computer is enabled to perform the foregoing related steps, to implement the shooting restoration method in the foregoing embodiments.

In addition, an embodiment of this disclosure further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the shooting restoration method in the foregoing method embodiments.

The electronic device, the computer-readable storage medium, the computer program product, or the chip provided in embodiments is configured to perform the corresponding method provided above. Therefore, for beneficial effects that can be achieved, refer to the beneficial effects of the corresponding method provided above. Details are not described herein.

Based on the foregoing descriptions of the implementations, a person skilled in the art may understand that for the purpose of convenient and brief description, division into the foregoing functional modules is merely used as an example for illustration. During actual application, the foregoing functions can be allocated to different functional modules for implementation based on a requirement, that is, an inner structure of an apparatus is divided into different functional modules to implement all or a part of the functions described above.

In the several embodiments provided in this disclosure, it should be understood that the disclosed apparatuses and methods may be implemented in other manners. For example, the described apparatus embodiment is merely an example. For example, the module or division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this disclosure may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions of embodiments of this disclosure may be implemented in a form of a software product. The software product is stored in a storage medium and includes several instructions for instructing a device (which may be a single-chip microcomputer, a chip, or the like) or a processor to perform all or some of the steps of the methods described in embodiments of this disclosure. The foregoing storage medium includes any medium that can store program code, for example, a USB flash drive, a removable hard disk, a read-only memory (ROM), a random-access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art in the technical scope disclosed in this disclosure shall fall within the protection scope of this disclosure. Therefore, the protection scope of this disclosure shall be subject to the protection scope of the claims.

What is claimed is:

1. A method comprising:
   generating one or more restoration templates based on one or more original shooting parameters extracted from a first multimedia file;
   storing the one or more restoration templates;
   displaying a shooting preview interface of an electronic device based on one or more first shooting parameters of a first parameter set, wherein the shooting preview interface comprises a picture;
   selecting, from the one or more restoration templates, a first restoration template that is associated with the first multimedia file, wherein the first multimedia file comprises a first photo, a first picture, or a first video clip;
   obtaining a second parameter set corresponding to the first restoration template, wherein the second parameter set comprises one or more second shooting parameters for shooting the first multimedia file, wherein the second shooting parameters do not match the first shooting parameters;
   receiving a first operation of a user;
   obtaining, in response to the first operation and through re-shooting, a second multimedia file based on the one or more second shooting parameters, wherein the second multimedia file and the first multimedia file have a same display effect, and wherein the second multimedia file comprises a second photo, a second picture, or a second video clip; and
   storing the second multimedia file as a restored version of the first multimedia file, thereby restoring the first multimedia file.

2. The method according to claim 1, wherein the one or more restoration templates comprise a preset restoration template or a restoration template based on one or more shooting parameters of an associated multimedia file.

3. The method according to claim 1, wherein selecting the first restoration template comprises:
   receiving a second operation of the user, and selecting, in response to the second operation, the first restoration template from the one or more restoration templates; or
   selecting, based on a shooting environment in which the electronic device is located, a restoration template with a highest shooting effect in the one or more restoration templates as the first restoration template.

4. The method according to claim 1, wherein the method further comprises:
   displaying the one or more second shooting parameters;
   receiving a second operation of the user;
   modifying the one or more second shooting parameters in response to the second operation to obtain a modified second parameter set;
   updating the first restoration template based on the modified second parameter set;
   generating, based on the modified second parameter set, a second restoration template associated with the first multimedia file; and
   storing the second restoration template.

5. The method according to claim 1, wherein the method further comprises:
   detecting that the first multimedia file is lost or damaged; and
   displaying, in a shooting restoration mode in response to the detecting, prompt information to prompt the user to restore the first multimedia file.

6. The method according to claim 1, wherein the second parameter set further comprises framing information of the first multimedia file, and wherein the method further comprises:
   obtaining a framing range of the first multimedia file based on the framing information of the first multimedia file;
   receiving a second operation of the user; and
   obtaining, in response to the second operation, a third multimedia file based on the one or more second shooting parameters, wherein the third multimedia file and the first multimedia file have a same display effect and a same framing range.

7. The method according to claim 1, wherein the second parameter set further comprises an operation parameter for performing editing processing on the first multimedia file, and wherein the method further comprises performing editing processing on the second multimedia file based on the operation parameter to obtain a processed second multimedia file, wherein the editing processing comprises ratio cropping, filter color adjustment, beauty parameter adjustment, or brightness level adjustment.

8. The method according to claim 1, wherein the method further comprises updating, based on the one or more second shooting parameters, the picture.

9. The method according to claim 1, wherein the second shooting parameters comprise a focal length, a focusing mode, a resolution, a camera, geographical location information, a beauty parameter, a filter color, a flash effect, a horizontal level effect, an exposure, or a photosensitivity.

10. The method according to claim 1, wherein the method further comprises:

receiving a second operation of the user;

enabling a shooting restoration function of the electronic device in response to the second operation;

receiving a third operation of the user; and enabling, in response to the third operation, the electronic device to enter a shooting restoration mode.

11. An electronic device, comprising:

one or more memories configured to store instructions and one or more restoration templates; and one or more processors coupled to the one or more memories and configured to execute the instructions to cause the electronic device to:

generate the one or more restoration templates based on one or more original shooting parameters extracted from a first multimedia file;

display a shooting preview interface of the electronic device based on one or more first shooting parameters of a first parameter set, wherein the shooting preview interface comprises a picture;

select, from the one or more restoration templates, a first restoration template that is associated with the first multimedia file, wherein the first multimedia file comprises a first photo, a first picture, or a first video clip;

obtain a second parameter set corresponding to the first restoration template, wherein the second parameter set comprises one or more second shooting parameters for shooting the first multimedia file, wherein the second shooting parameters do not match the first shooting parameters;

receive a first operation of a user;

obtain, in response to the first operation and through re-shooting, a second multimedia file based on the one or more second shooting parameters, wherein the second multimedia file and the first multimedia file have a same display effect, and wherein the second multimedia file comprises a second photo, a second picture, or a second video clip; and store the second multimedia file as a restored version of the first multimedia file, thereby restoring the first multimedia file.

12. The electronic device according to claim 11, wherein the one or more restoration templates comprise a preset restoration template, or a restoration template based on one or more shooting parameters of an associated multimedia file.

13. The electronic device according to claim 11, wherein the one or more processors are further configured to execute the instructions to cause the electronic device to:

select, based on the picture, a restoration template with a highest shooting effect in the one or more restoration templates as the first restoration template;

select, based on a use frequency of the user, a restoration template that is most frequently used in the one or more restoration templates as the first restoration template; or select, based on a use record of the user, a restoration template that is last used in the one or more restoration templates as the first restoration template.

14. The electronic device according to claim 11, wherein the one or more processors are further configured to execute the instructions to cause the electronic device to:

display the one or more second shooting parameters;

receive a second operation of the user;

modify the one or more second shooting parameters in response to the second operation to obtain a modified second parameter set;

update the first restoration template based on the modified second parameter set;

generate, based on the modified second parameter set, a second restoration template associated with the first multimedia file; and store the second restoration template.

15. The electronic device according to claim 11, wherein the one or more processors are further configured to execute the instructions to cause the electronic device to:

detect that the first multimedia file is lost or damaged; and display, in a shooting restoration mode in response to detecting that the first multimedia file is lost or damaged, prompt information to prompt the user to restore the first multimedia file.

16. The electronic device according to claim 11, wherein the second parameter set further comprises framing information of the first multimedia file, and wherein the one or more processors are further configured to execute the instructions to cause the electronic device to:

obtain a framing range of the first multimedia file based on the framing information of the first multimedia file;

receive a second operation of the user; and obtain, in response to the second operation, a third multimedia file based on the one or more second shooting parameters, wherein the third multimedia file and the first multimedia file have a same display effect and a same framing range.

17. The electronic device according to claim 11, wherein the second parameter set further comprises an operation parameter for performing editing processing on the first multimedia file, and wherein the one or more processors are further configured to execute the instructions to cause the electronic device to perform editing processing on the second multimedia file based on the operation parameter to obtain a processed second multimedia file, wherein the editing processing comprises ratio cropping, filter color adjustment, beauty parameter adjustment, or brightness level adjustment.

18. The electronic device according to claim 11, wherein the one or more processors are further configured to execute the instructions to cause the electronic device to update, based on the one or more second shooting parameters, the picture.

19. A computer program product comprising computer-executable instructions that are stored on a non-transitory computer-readable storage medium and that, when executed by one or more processors, cause an electronic device to:

generate one or more restoration templates based on one or more original shooting parameters extracted from a first multimedia file;

store the one or more restoration templates;

display a shooting preview interface of the electronic device based on one or more first shooting parameters of a first parameter set, wherein the shooting preview interface comprises a picture;

select, from the one or more restoration templates, a first restoration template that is associated with the first multimedia file, wherein the first multimedia file comprises a first photo, a first dynamic picture, or a first video clip;

obtain a second parameter set corresponding to the first restoration template, wherein the second parameter set comprises one or more second shooting parameters for shooting the first multimedia file, wherein the second shooting parameters do not match the first shooting parameters;

receive a first operation of a user;

obtain, in response to the first operation and through re-shooting by using a camera, a second multimedia file based on the one or more second shooting parameters, wherein the second multimedia file and the first multimedia file have same display effect, and wherein the second multimedia file comprises a second photo, a second picture, or a second video clip; and store the second multimedia file as a restored version of the first multimedia file, thereby restoring the first multimedia file.

20. The computer program product according to claim 19, wherein the one or more restoration templates comprise a preset restoration template or a restoration template based on one or more shooting parameters of an associated multimedia file.

* * * * *